US010296895B2

(12) United States Patent
Llach et al.

(10) Patent No.: US 10,296,895 B2
(45) Date of Patent: May 21, 2019

(54) SYSTEM FOR PROCESSING, ACTIVATING AND REDEEMING VALUE ADDED PREPAID CARDS

(71) Applicant: Blackhawk Network, Inc., Pleasanton, CA (US)

(72) Inventors: Teri Llach, Palo Alto, CA (US); J. DuWayne Milner, Edwardsville, IL (US)

(73) Assignee: BLACKHAWK NETWORK, INC., Pleasanton, CA (US)

( * ) Notice: Subject to any disclaimer, the term of this patent is extended or adjusted under 35 U.S.C. 154(b) by 169 days.

(21) Appl. No.: 14/213,448

(22) Filed: Mar. 14, 2014

(65) Prior Publication Data

US 2014/0214567 A1 Jul. 31, 2014

Related U.S. Application Data

(63) Continuation-in-part of application No. 13/617,751, filed on Sep. 14, 2012, which is a continuation of
(Continued)

(51) Int. Cl.
*G06Q 20/20* (2012.01)
*G06Q 20/28* (2012.01)
(Continued)

(52) U.S. Cl.
CPC ......... *G06Q 20/342* (2013.01); *G06Q 20/204* (2013.01); *G06Q 20/28* (2013.01);
(Continued)

(58) Field of Classification Search
CPC .............. G06Q 20/342; G06Q 20/204
(Continued)

(56) References Cited

U.S. PATENT DOCUMENTS 4,359,631 A 11/1982 Lockwood et al.
4,567,359 A 1/1986 Lockwood
(Continued)

FOREIGN PATENT DOCUMENTS

DE 4017264 A1 12/1991
EP 0863537 A1 9/1998
(Continued)

OTHER PUBLICATIONS

Office Action (Final) dated Dec. 28, 2012 (12 pages), U.S. Appl. No. 12/538,083, filed Aug. 7, 2009.
(Continued)

*Primary Examiner* — A. Hunter Wilder
(74) *Attorney, Agent, or Firm* — Wick Phillips Gould & Martin LLP; Jerry C. Harris, Jr.

(57) ABSTRACT

A computer implemented method for adding value to a stored value card in excess of the purchase price for the stored value card is provided. In one embodiment a stored value card transaction processor receives an activation or redemption request for a stored value card from a point of sale terminal. The activation or redemption request comprises at least one of a card identification, a point of sale terminal identification, a merchant identification, and a time of activation which is compared to data stored in a stored value card datastore to determine if the stored value card to be activated is eligible for a value added award. The processor then determines the value added award and modifies the request to include the value added award. The processor then transmits the modified request to the card issuer authorization system and receives a response which is forwarded to the point of sale terminal.

17 Claims, 13 Drawing Sheets

Related U.S. Application Data application No. 13/520,849, filed as application No. PCT/US2011/020570 on Jan. 7, 2011.

(60) Provisional application No. 61/781,667, filed on Mar. 14, 2013, provisional application No. 61/293,413, filed on Jan. 8, 2010.

(51) Int. Cl.
G06Q 20/34 (2012.01)
G06Q 30/02 (2012.01)

(52) U.S. Cl.
CPC ......... *G06Q 20/349* (2013.01); *G06Q 20/354* (2013.01); *G06Q 20/355* (2013.01); *G06Q 30/0207* (2013.01)

(58) Field of Classification Search
USPC .......................................................... 705/17
See application file for complete search history.

(56) References Cited

U.S. PATENT DOCUMENTS

| | | |
|---|---|---|
| RE32,115 E | 4/1986 | Lockwood et al. |
| 4,694,397 A | 9/1987 | Grant et al. |
| 4,951,196 A | 8/1990 | Jackson |
| 5,220,501 A | 6/1993 | Lawlor et al. |
| 5,291,017 A | 3/1994 | Wang et al. |
| 5,309,355 A | 5/1994 | Lockwood |
| 5,334,823 A | 8/1994 | Noblett, Jr. |
| 5,350,906 A | 9/1994 | Brody et al. |
| 5,468,958 A | 11/1995 | Franzen et al. |
| 5,477,038 A | 12/1995 | Levine et al. |
| 5,500,514 A | 3/1996 | Veeneman et al. |
| 5,534,683 A | 7/1996 | Rankl et al. |
| 5,557,516 A | 9/1996 | Hogan |
| 5,569,917 A | 10/1996 | Buttrill, Jr. et al. |
| 5,576,951 A | 11/1996 | Lockwood |
| 5,577,100 A | 11/1996 | McGregor et al. |
| 5,577,109 A | 11/1996 | Stimson et al. |
| 5,578,808 A | 11/1996 | Taylor |
| 5,621,787 A | 4/1997 | McKoy et al. |
| 5,645,434 A | 7/1997 | Leung |
| 5,650,604 A | 7/1997 | Marcous et al. |
| 5,689,100 A | 11/1997 | Carrithers et al. |
| 5,693,941 A | 12/1997 | Barlow et al. |
| 5,696,908 A | 12/1997 | Muehlberger et al. |
| 5,701,301 A | 12/1997 | Weisser, Jr. |
| 5,714,755 A | 2/1998 | Wells et al. |
| 5,722,067 A | 2/1998 | Fougnies et al. |
| 5,744,787 A | 4/1998 | Teicher |
| 5,748,737 A | 5/1998 | Daggar |
| 5,763,878 A | 6/1998 | Franzen |
| 5,778,313 A | 7/1998 | Fougnies |
| 5,796,832 A | 8/1998 | Kawan |
| 5,812,773 A | 9/1998 | Norin |
| 5,815,657 A | 9/1998 | Williams et al. |
| 5,826,185 A | 10/1998 | Wise et al. |
| 5,828,740 A | 10/1998 | Khuc et al. |
| 5,845,259 A | 12/1998 | West et al. |
| 5,854,975 A | 12/1998 | Fougnies et al. |
| 5,868,236 A | 2/1999 | Rademacher |
| 5,884,292 A | 3/1999 | Baker et al. |
| 5,892,827 A | 4/1999 | Beach et al. |
| 5,897,625 A | 4/1999 | Gustin et al. |
| 5,903,633 A | 5/1999 | Lorsch |
| 5,915,007 A | 6/1999 | Klapka |
| 5,920,847 A | 7/1999 | Kolling et al. |
| 5,937,396 A | 8/1999 | Konya |
| 5,943,424 A | 8/1999 | Berger et al. |
| 5,945,653 A | 8/1999 | Walker et al. |
| 5,953,398 A | 9/1999 | Hill |
| 5,969,318 A | 10/1999 | Mackenthun |
| 5,984,180 A | 11/1999 | Albrecht |
| 5,987,438 A | 11/1999 | Nakano et al. |
| 5,991,380 A | 11/1999 | Bruno et al. |
| 5,991,381 A | 11/1999 | Bouanaka et al. |
| 5,991,413 A | 11/1999 | Arditti et al. |
| 5,991,749 A | 11/1999 | Morrill, Jr. |
| 5,991,809 A | 11/1999 | Kriegsman |
| 6,000,608 A | 12/1999 | Dorf |
| 6,012,048 A | 1/2000 | Gustin et al. |
| 6,035,025 A | 3/2000 | Hanson |
| 6,044,360 A | 3/2000 | Picciallo |
| 6,049,774 A | 4/2000 | Roy |
| 6,058,300 A | 5/2000 | Hanson |
| 6,064,990 A | 5/2000 | Goldsmith |
| 6,081,791 A | 6/2000 | Clark |
| 6,081,840 A | 6/2000 | Zhao |
| 6,157,823 A | 12/2000 | Fougnies et al. |
| 6,169,975 B1 | 1/2001 | White et al. |
| 6,182,138 B1 | 1/2001 | Aoki |
| 6,185,545 B1 | 2/2001 | Resnick et al. |
| 6,188,752 B1 | 2/2001 | Lesley |
| 6,191,699 B1 | 2/2001 | Sawada |
| 6,209,032 B1 | 3/2001 | Dutcher et al. |
| 6,264,104 B1 | 7/2001 | Jenkins et al. |
| 6,269,343 B1 | 7/2001 | Pallakoff |
| 6,289,319 B1 | 9/2001 | Lockwood |
| 6,289,320 B1 | 9/2001 | Drummond et al. |
| 6,294,780 B1 | 9/2001 | Wells et al. |
| 6,299,062 B1 | 10/2001 | Hwang |
| 6,315,195 B1 | 11/2001 | Ramachandran |
| 6,317,754 B1 | 11/2001 | Peng |
| 6,320,947 B1 | 11/2001 | Joyce et al. |
| 6,323,980 B1 | 11/2001 | Bloom |
| 6,327,363 B1 | 12/2001 | Henderson et al. |
| 6,330,978 B1 | 12/2001 | Molano et al. |
| 6,386,457 B1 | 5/2002 | Sorie |
| 6,453,162 B1 | 9/2002 | Gentry |
| 6,467,684 B2 | 10/2002 | Fite et al. |
| 6,502,191 B1 | 12/2002 | Smith et al. |
| 6,510,983 B2 | 1/2003 | Horowitz et al. |
| 6,526,130 B1 | 2/2003 | Paschini |
| 6,526,275 B1 | 2/2003 | Calvert |
| 6,574,617 B1 | 6/2003 | Immerman et al. |
| 6,581,827 B2 | 6/2003 | Welton |
| 6,596,990 B2 | 7/2003 | Kasten et al. |
| 6,615,189 B1 | 9/2003 | Phillips et al. |
| 6,628,766 B1 | 9/2003 | Hollis et al. |
| 6,651,885 B1 | 11/2003 | Arias |
| 6,742,023 B1 | 5/2004 | Fanning et al. |
| 6,759,899 B2 | 7/2004 | Lennartson et al. |
| 6,827,260 B2 | 12/2004 | Stoutenburg et al. |
| 6,829,596 B1 | 12/2004 | Frazee |
| 6,842,749 B2 | 1/2005 | Zara et al. |
| 6,910,053 B1 | 6/2005 | Pauly et al. |
| 6,934,529 B2 | 8/2005 | Bagoren et al. |
| 6,941,285 B2 | 9/2005 | Sarcanin |
| 6,965,667 B2 | 11/2005 | Trabandt et al. |
| 6,973,172 B1 | 12/2005 | Bitove et al. |
| 6,999,943 B1 | 2/2006 | Johnson et al. |
| 7,003,499 B2 | 2/2006 | Arditti et al. |
| 7,006,993 B1 | 2/2006 | Cheong et al. |
| 7,014,108 B2 | 3/2006 | Sorenson et al. |
| 7,031,693 B2 | 4/2006 | Öhrström et al. |
| 7,069,251 B1 | 6/2006 | Bartz et al. |
| 7,083,084 B2 | 8/2006 | Graves et al. |
| 7,089,209 B1 | 8/2006 | Kolls |
| 7,092,916 B2 | 8/2006 | Diveley et al. |
| 7,093,761 B2 | 8/2006 | Smith et al. |
| 7,103,575 B1 | 9/2006 | Linehan |
| 7,106,843 B1 | 9/2006 | Gainsboro et al. |
| 7,118,030 B2 | 10/2006 | Phillips et al. |
| 7,127,426 B1 | 10/2006 | Coyle |
| 7,131,578 B2 | 11/2006 | Paschini et al. |
| 7,131,582 B2 | 11/2006 | Welton |
| 7,181,416 B2 | 2/2007 | Arias |
| 7,191,939 B2 | 3/2007 | Beck et al. |
| 7,197,662 B2 | 3/2007 | Bullen et al. |
| 7,206,769 B2 | 4/2007 | Laurent et al. |
| 7,209,890 B1 | 4/2007 | Peon et al. |
| 7,210,620 B2 | 5/2007 | Jones |
| 7,210,624 B1 | 5/2007 | Birjandi et al. |

(56) References Cited

U.S. PATENT DOCUMENTS

| | | |
|---|---|---|
| 7,212,976 B2 | 5/2007 | Scheer |
| 7,216,091 B1 | 5/2007 | Blandina et al. |
| 7,248,855 B2 | 7/2007 | Joyce et al. |
| 7,255,268 B2 | 8/2007 | Dentlinger |
| 7,260,557 B2 | 8/2007 | Chavez |
| 7,268,901 B2 | 9/2007 | Brewster et al. |
| 7,280,644 B2 | 10/2007 | Tamari et al. |
| 7,280,645 B1 | 10/2007 | Allen et al. |
| 7,308,087 B2 | 12/2007 | Joyce et al. |
| 7,325,722 B2 | 2/2008 | Hosnedl et al. |
| 7,333,955 B2 | 2/2008 | Graves et al. |
| 7,363,265 B2 | 4/2008 | Horgan |
| 7,401,049 B2 | 7/2008 | Hobbs et al. |
| 7,404,011 B2 | 7/2008 | Hansmann et al. |
| 7,413,117 B2 | 8/2008 | Caven et al. |
| 7,433,212 B2 | 10/2008 | Igarashi et al. |
| 7,440,922 B1 * | 10/2008 | Kempkes ............... G06Q 20/04 705/39 |
| 7,454,200 B2 | 11/2008 | Cai et al. |
| 7,477,731 B2 | 1/2009 | Tamari et al. |
| 7,483,858 B2 | 1/2009 | Foran et al. |
| 7,522,716 B2 | 4/2009 | Paschini |
| 7,529,563 B1 | 5/2009 | Pitroda |
| 7,562,051 B1 | 7/2009 | Donner |
| 7,574,376 B1 | 8/2009 | Berman et al. |
| 7,577,613 B2 | 8/2009 | Tramontano et al. |
| 7,578,439 B2 | 8/2009 | Graves et al. |
| 7,580,859 B2 | 8/2009 | Economy et al. |
| 7,580,892 B1 | 8/2009 | Blosser et al. |
| 7,581,674 B2 | 9/2009 | Cohen et al. |
| 7,594,855 B2 | 9/2009 | Meyerhofer |
| 7,603,316 B1 | 10/2009 | Fife et al. |
| 7,607,574 B2 | 10/2009 | Kingsborough et al. |
| 7,613,284 B2 | 11/2009 | New |
| 7,614,549 B2 | 11/2009 | Hogg et al. |
| 7,617,152 B2 | 11/2009 | Chai et al. |
| 7,630,926 B2 | 12/2009 | Chakiris et al. |
| 7,647,627 B2 | 1/2010 | Maida-Smith et al. |
| 7,669,758 B2 | 3/2010 | Erikson |
| 7,676,030 B2 | 3/2010 | New et al. |
| 7,698,231 B2 | 4/2010 | Clinesmith et al. |
| 7,707,113 B1 | 4/2010 | DiMartino et al. |
| 7,739,162 B1 | 6/2010 | Pettay et al. |
| 7,740,170 B2 | 6/2010 | Singh et al. |
| 7,797,233 B2 | 9/2010 | Sobek |
| 7,813,822 B1 | 10/2010 | Hoffberg |
| 7,822,640 B2 | 10/2010 | Arthur et al. |
| 7,865,432 B2 | 1/2011 | Doran et al. |
| 7,890,422 B1 | 2/2011 | Hirka et al. |
| 7,891,563 B2 | 2/2011 | Oder, II et al. |
| 7,909,242 B2 | 3/2011 | Paschini et al. |
| 7,922,082 B2 | 4/2011 | Muscato |
| 7,925,531 B1 | 4/2011 | Cunningham et al. |
| 7,945,238 B2 | 5/2011 | Baker et al. |
| 7,945,512 B2 | 5/2011 | Scipioni et al. |
| 7,966,496 B2 | 6/2011 | Ellmore |
| 7,991,694 B2 | 8/2011 | Takayama |
| 8,020,754 B2 | 9/2011 | Schwarz, Jr. |
| 8,041,338 B2 | 10/2011 | Chen et al. |
| 8,041,642 B2 | 10/2011 | Lenard et al. |
| 8,060,413 B2 | 11/2011 | Castell et al. |
| 8,086,530 B2 | 12/2011 | Resnick et al. |
| 8,090,792 B2 | 1/2012 | Dubnicki et al. |
| 8,095,113 B2 | 1/2012 | Kean et al. |
| 8,109,436 B1 | 2/2012 | Hopkins, III |
| 8,135,640 B2 | 3/2012 | Bayne |
| 8,195,565 B2 | 6/2012 | Bishop et al. |
| 8,245,910 B2 | 8/2012 | Sullivan et al. |
| 8,271,343 B2 | 9/2012 | Schorr et al. |
| 8,297,498 B2 | 10/2012 | Vrheas et al. |
| 8,306,912 B2 | 11/2012 | Galit |
| 8,321,270 B2 * | 11/2012 | Antonucci ................... 705/14.3 |
| 8,341,045 B2 | 12/2012 | Kravitz et al. |
| 8,355,982 B2 | 1/2013 | Hazel et al. |
| 8,359,239 B1 | 1/2013 | Cook et al. |
| 8,371,502 B1 | 2/2013 | Galit et al. |
| 8,452,880 B2 | 5/2013 | Jain |
| 8,458,016 B1 * | 6/2013 | Medina et al. ............ 705/14.31 |
| 8,472,594 B2 | 6/2013 | New et al. |
| 8,479,980 B2 | 7/2013 | Paschini et al. |
| 8,523,054 B2 | 9/2013 | Yankovich et al. |
| 8,594,286 B2 | 11/2013 | New et al. |
| 8,595,074 B2 | 11/2013 | Sharma et al. |
| 8,626,617 B1 | 1/2014 | Bhatt |
| 8,682,715 B1 | 3/2014 | Cedeno |
| 8,762,236 B1 | 6/2014 | Shirey et al. |
| 8,768,817 B2 | 7/2014 | Takeo et al. |
| 9,031,880 B2 | 5/2015 | Bishop et al. |
| 9,542,553 B1 | 1/2017 | Burger et al. |
| 9,558,484 B2 | 1/2017 | Paschini et al. |
| 9,852,414 B2 | 12/2017 | Llach |
| 2001/0021927 A1 | 9/2001 | Laurent et al. |
| 2001/0027446 A1 | 10/2001 | Metcalfe |
| 2001/0037291 A1 | 11/2001 | Allen, II |
| 2001/0039535 A1 | 11/2001 | Tsiounis et al. |
| 2001/0042784 A1 | 11/2001 | Fite et al. |
| 2002/0010659 A1 | 1/2002 | Cruse et al. |
| 2002/0046122 A1 | 4/2002 | Barber et al. |
| 2002/0059114 A1 | 5/2002 | Cockrill et al. |
| 2002/0077973 A1 | 6/2002 | Ronchi et al. |
| 2002/0099667 A1 | 7/2002 | Diamandis et al. |
| 2002/0116280 A1 | 8/2002 | Boies et al. |
| 2002/0128938 A1 | 9/2002 | Schofield et al. |
| 2002/0152124 A1 | 10/2002 | Guzman et al. |
| 2002/0152175 A1 | 10/2002 | Armstrong et al. |
| 2002/0156696 A1 | 10/2002 | Teicher |
| 2002/0161650 A1 | 10/2002 | Buchanan et al. |
| 2002/0165820 A1 | 11/2002 | Anvekar et al. |
| 2002/0169648 A1 | 11/2002 | Zara et al. |
| 2002/0174034 A1 | 11/2002 | Au et al. |
| 2002/0181600 A1 | 12/2002 | Matsuura et al. |
| 2003/0028481 A1 | 2/2003 | Flitcroft |
| 2003/0046231 A1 | 3/2003 | Wu |
| 2003/0046249 A1 | 3/2003 | Wu |
| 2003/0050041 A1 | 3/2003 | Wu |
| 2003/0083946 A1 | 5/2003 | Nishiyama |
| 2003/0110104 A1 | 6/2003 | King et al. |
| 2003/0126075 A1 | 7/2003 | Mascavage, III et al. |
| 2003/0144910 A1 | 7/2003 | Flaherty et al. |
| 2003/0177028 A1 | 9/2003 | Cooper et al. |
| 2003/0191945 A1 | 10/2003 | Keech |
| 2003/0200179 A1 | 10/2003 | Kwan |
| 2003/0200465 A1 | 10/2003 | Bhat et al. |
| 2003/0212595 A1 | 11/2003 | Antonucci |
| 2003/0236755 A1 | 12/2003 | Dagelet, Jr. |
| 2004/0011866 A1 | 1/2004 | Saad |
| 2004/0019571 A1 | 1/2004 | Hurwitz et al. |
| 2004/0049598 A1 | 3/2004 | Tucker et al. |
| 2004/0078332 A1 | 4/2004 | Ferguson et al. |
| 2004/0086098 A1 | 5/2004 | Craft |
| 2004/0088250 A1 | 5/2004 | Bartter et al. |
| 2004/0128508 A1 | 7/2004 | Wheeler et al. |
| 2004/0133511 A1 | 7/2004 | Smith et al. |
| 2004/0153410 A1 | 8/2004 | Nootebos et al. |
| 2004/0185827 A1 | 9/2004 | Parks |
| 2004/0205023 A1 | 10/2004 | Hafer et al. |
| 2004/0210489 A1 | 10/2004 | Jackson et al. |
| 2004/0215560 A1 | 10/2004 | Amalraj et al. |
| 2004/0230489 A1 | 11/2004 | Goldthwaite et al. |
| 2004/0254891 A1 | 12/2004 | Blinn et al. |
| 2005/0008132 A1 | 1/2005 | Paschini et al. |
| 2005/0010452 A1 | 1/2005 | Lusen |
| 2005/0018824 A1 | 1/2005 | Richardson |
| 2005/0038714 A1 | 2/2005 | Bonet et al. |
| 2005/0038718 A1 | 2/2005 | Barnes et al. |
| 2005/0086168 A1 | 4/2005 | Alvarez et al. |
| 2005/0192893 A1 | 9/2005 | Keeling et al. |
| 2005/0229003 A1 | 10/2005 | Paschini et al. |
| 2006/0026073 A1 | 2/2006 | Kenny, Jr. et al. |
| 2006/0043171 A1 | 3/2006 | New et al. |
| 2006/0045244 A1 | 3/2006 | New |
| 2006/0064344 A1 | 3/2006 | Lidow |
| 2006/0074783 A1 | 4/2006 | Agarwal et al. |
| 2006/0074799 A1 | 4/2006 | Averyt et al. |

(56) References Cited

U.S. PATENT DOCUMENTS

| | | |
|---|---|---|
| 2006/0078100 A1 | 4/2006 | Risafi et al. |
| 2006/0129419 A1 | 6/2006 | Flaxer et al. |
| 2006/0184613 A1 | 8/2006 | Stienessen et al. |
| 2006/0202012 A1 | 9/2006 | Grano et al. |
| 2006/0242087 A1 | 10/2006 | Naehr et al. |
| 2006/0248017 A1 | 11/2006 | Koka et al. |
| 2006/0253335 A1 | 11/2006 | Keena et al. |
| 2006/0269722 A1 | 11/2006 | Yamada |
| 2007/0023504 A1 | 2/2007 | Blankenship et al. |
| 2007/0073586 A1 | 3/2007 | Dev et al. |
| 2007/0090183 A1* | 4/2007 | Hursta .......... G06Q 20/027 705/37 |
| 2007/0101351 A1 | 5/2007 | Bagsby et al. |
| 2007/0125838 A1 | 6/2007 | Law et al. |
| 2007/0125840 A1 | 6/2007 | Law et al. |
| 2007/0198437 A1 | 8/2007 | Eisner et al. |
| 2007/0210152 A1 | 9/2007 | Read |
| 2007/0255662 A1 | 11/2007 | Tumminaro |
| 2007/0272743 A1 | 11/2007 | Christie et al. |
| 2007/0276765 A1 | 11/2007 | Hazel et al. |
| 2007/0293309 A1* | 12/2007 | Jorasch .......... A44C 21/00 463/25 |
| 2008/0040284 A1 | 2/2008 | Hazel et al. |
| 2008/0059302 A1* | 3/2008 | Fordyce, III et al. .......... 705/14 |
| 2008/0059379 A1 | 3/2008 | Ramaci et al. |
| 2008/0078831 A1 | 4/2008 | Johnson et al. |
| 2008/0099551 A1 | 5/2008 | Harper et al. |
| 2008/0114696 A1 | 5/2008 | Singh et al. |
| 2008/0147546 A1 | 6/2008 | Weichselbaumer et al. |
| 2008/0147552 A1 | 6/2008 | Morsillo et al. |
| 2008/0162360 A1 | 7/2008 | Bantz et al. |
| 2008/0169344 A1 | 7/2008 | Huh |
| 2008/0177655 A1 | 7/2008 | Zalik |
| 2008/0189214 A1 | 8/2008 | Mueller et al. |
| 2008/0195499 A1 | 8/2008 | Meredith et al. |
| 2008/0208748 A1 | 8/2008 | Ozment et al. |
| 2008/0222417 A1 | 9/2008 | Downes et al. |
| 2008/0223920 A9 | 9/2008 | Duke |
| 2008/0228637 A1 | 9/2008 | Scipioni et al. |
| 2008/0255992 A1 | 10/2008 | Lin |
| 2008/0270246 A1 | 10/2008 | Chen |
| 2008/0270253 A1 | 10/2008 | Huang |
| 2008/0283590 A1* | 11/2008 | Oder et al. .......... 235/380 |
| 2008/0288405 A1 | 11/2008 | John |
| 2008/0319914 A1 | 12/2008 | Carrott |
| 2009/0030836 A1 | 1/2009 | Blandina et al. |
| 2009/0031407 A1 | 1/2009 | Kuang |
| 2009/0037326 A1 | 2/2009 | Chitti et al. |
| 2009/0037333 A1 | 2/2009 | Flitcroft et al. |
| 2009/0048953 A1 | 2/2009 | Hazel et al. |
| 2009/0048963 A1 | 2/2009 | Bishop et al. |
| 2009/0050688 A1 | 2/2009 | Kon et al. |
| 2009/0084842 A1 | 4/2009 | Vriheas et al. |
| 2009/0106160 A1 | 4/2009 | Skowronek |
| 2009/0119190 A1 | 5/2009 | Realini |
| 2009/0164320 A1 | 6/2009 | Galit |
| 2009/0177563 A1 | 7/2009 | Bernstein et al. |
| 2009/0234751 A1 | 9/2009 | Chan et al. |
| 2009/0254441 A1 | 10/2009 | Ahlers et al. |
| 2009/0288012 A1 | 11/2009 | Hertel et al. |
| 2009/0299841 A1 | 12/2009 | Bishop et al. |
| 2009/0319348 A1 | 12/2009 | Khosravy et al. |
| 2009/0319784 A1 | 12/2009 | Faith et al. |
| 2009/0327067 A1 | 12/2009 | Berger et al. |
| 2010/0036743 A1 | 2/2010 | Tamari et al. |
| 2010/0043008 A1 | 2/2010 | Marchand |
| 2010/0076877 A1* | 3/2010 | Lenahan .......... G06Q 30/02 705/32 |
| 2010/0094674 A1 | 4/2010 | Marriner et al. |
| 2010/0114731 A1 | 5/2010 | Kingston et al. |
| 2010/0114773 A1 | 5/2010 | Skowronek |
| 2010/0125510 A1 | 5/2010 | Smith et al. |
| 2010/0154027 A1 | 6/2010 | Sobel et al. |
| 2010/0200652 A1 | 8/2010 | Wolfe et al. |
| 2010/0268645 A1 | 10/2010 | Martino et al. |
| 2010/0293093 A1 | 11/2010 | Karpenko |
| 2010/0299194 A1 | 11/2010 | Snyder et al. |
| 2010/0299195 A1 | 11/2010 | Nix et al. |
| 2010/0299221 A1 | 11/2010 | Paschini et al. |
| 2010/0299733 A1 | 11/2010 | Paschini et al. |
| 2010/0325006 A1 | 12/2010 | White |
| 2011/0035446 A1 | 2/2011 | Goermer et al. |
| 2011/0041006 A1 | 2/2011 | Fowler |
| 2011/0068170 A1* | 3/2011 | Lehman .......... G06Q 30/02 705/14.38 |
| 2011/0099055 A1* | 4/2011 | Khalil .......... G06Q 30/0207 705/14.1 |
| 2011/0101093 A1 | 5/2011 | Ehrensvärd |
| 2011/0125645 A1 | 5/2011 | Benkert et al. |
| 2011/0131275 A1 | 6/2011 | Maida-Smith et al. |
| 2011/0161229 A1 | 6/2011 | Mastrangelo et al. |
| 2011/0208656 A1 | 8/2011 | Alba et al. |
| 2011/0218911 A1 | 9/2011 | Spodak |
| 2011/0226620 A1 | 9/2011 | Tadayoni-Rebek et al. |
| 2011/0231272 A1 | 9/2011 | Englund et al. |
| 2011/0302646 A1 | 12/2011 | Ronda et al. |
| 2011/0307377 A1 | 12/2011 | Nelsen et al. |
| 2012/0150553 A1 | 6/2012 | Wade |
| 2012/0221468 A1 | 8/2012 | Kumnick et al. |
| 2012/0259718 A1 | 10/2012 | Miller et al. |
| 2012/0265681 A1 | 10/2012 | Ross |
| 2012/0317028 A1 | 12/2012 | Ansari |
| 2013/0013510 A1 | 1/2013 | Ansari |
| 2013/0018783 A1 | 1/2013 | Ansari |
| 2013/0018793 A1 | 1/2013 | Wong et al. |
| 2013/0030941 A1 | 1/2013 | Meredith et al. |
| 2013/0036019 A1 | 2/2013 | Tamari et al. |
| 2013/0041768 A1 | 2/2013 | Llach |
| 2013/0054470 A1 | 2/2013 | Campos et al. |
| 2013/0066735 A1 | 3/2013 | Llach |
| 2013/0091060 A1 | 4/2013 | Kundu |
| 2013/0117138 A1 | 5/2013 | Hazel et al. |
| 2013/0185214 A1 | 7/2013 | Azen et al. |
| 2013/0191136 A1 | 7/2013 | Apshago et al. |
| 2013/0191213 A1 | 7/2013 | Beck et al. |
| 2013/0036048 A1 | 8/2013 | Campos et al. |
| 2013/0262316 A1 | 10/2013 | Hruska |
| 2013/0268437 A1 | 10/2013 | Desai et al. |
| 2013/0304642 A1 | 11/2013 | Campos |
| 2014/0019352 A1 | 1/2014 | Shrivastava |
| 2014/0025519 A1 | 1/2014 | Thomas |
| 2014/0108170 A1 | 4/2014 | Tamari et al. |
| 2014/0143089 A1 | 5/2014 | Campos et al. |
| 2014/0214656 A1 | 7/2014 | Williams et al. |
| 2015/0302394 A1 | 10/2015 | Harper |
| 2015/0348018 A1 | 12/2015 | Campos et al. |
| 2017/0236117 A1 | 8/2017 | Paschini et al. |

FOREIGN PATENT DOCUMENTS

| | | |
|---|---|---|
| EP | 1286317 A2 | 2/2003 |
| EP | 1829352 A2 | 9/2007 |
| EP | 1829354 A2 | 9/2007 |
| EP | 2521999 A1 | 11/2012 |
| GB | 2215897 A | 9/1989 |
| GB | 2287565 A | 9/1995 |
| JP | 5225221 A | 9/1993 |
| JP | 10155040 A | 6/1998 |
| JP | 10174009 A | 6/1998 |
| JP | 11259576 A | 9/1999 |
| JP | 2003016368 A | 1/2003 |
| KR | 20020020773 A | 3/2002 |
| WO | 9641462 A1 | 12/1996 |
| WO | 9746961 A1 | 12/1997 |
| WO | 9847112 A1 | 10/1998 |
| WO | 0111857 A1 | 2/2001 |
| WO | 0116905 A1 | 3/2001 |
| WO | 03071386 A2 | 8/2003 |
| WO | 03083792 A2 | 10/2003 |
| WO | 2004107280 A2 | 12/2004 |
| WO | 2004107280 A3 | 12/2004 |
| WO | 2006062832 A2 | 6/2006 |
| WO | 2006062832 A3 | 6/2006 |
| WO | 2006062842 A2 | 6/2006 |

(56) References Cited

FOREIGN PATENT DOCUMENTS

| WO | 2006062842 A3 | 6/2006 |
|---|---|---|
| WO | 2007127729 A2 | 11/2007 |
| WO | 2008008671 A2 | 1/2008 |
| WO | 2011085241 A1 | 7/2011 |
| WO | 2011159571 A1 | 12/2011 |
| WO | 2011159579 A2 | 12/2011 |
| WO | 2011159579 A3 | 12/2011 |
| WO | 2012027664 A1 | 3/2012 |
| WO | 2012166790 A1 | 12/2012 |
| WO | 2013123438 A1 | 8/2013 |
| WO | 2014081822 A2 | 5/2014 |
| WO | 2014081822 A3 | 5/2014 |
| WO | 2014107594 A2 | 7/2014 |
| WO | 2014107594 A3 | 7/2014 |

OTHER PUBLICATIONS

Office Action dated Apr. 9, 2012 (19 pages), U.S. Appl. No. 12/538,083, filed Aug. 7, 2009.
Advisory Action dated Jun. 6, 2013 (3 pages), U.S. Appl. No. 13/495,986, filed Jun. 13, 2012.
Office Action (Final) dated Mar. 25, 2013 (13 pages), U.S. Appl. No. 13/495,986, filed Jun. 13, 2012.
Office Action dated Dec. 11, 2012 (15 pages), U.S. Appl. No. 13/495,986, filed Jun. 13, 2012.
Advisory Action dated May 31, 2013 (3 pages), U.S. Appl. No. 13/619,226, filed Sep. 14, 2012.
Office Action (Final) dated Mar. 25, 2013 (13 pages), U.S. Appl. No. 13/619,226, filed Sep. 14, 2012.
Office Action dated Dec. 11, 2012 (15 pages), U.S. Appl. No. 13/619,226, filed Sep. 14, 2012.
"Outsourcing the ATM business," Abstract, Electronic Payments International No. 102, Nov. 1995, 1 page, Ref. 5, EDS (Electronic Data Systems), 1994-1997, Lexis/Nexis Database.
Panurach, Patiwat, "Money in Electronic Commerce: Digital Cash, Electronic Fund Transfer, and Ecash," Communications of the ACM, Jun. 1996, pp. 45-50, vol. 39, No. 6, ACM.
Patent Application entitled "Systems and Methods for Distributing Personal Identification Numbers (PINs) Over Computer Networks," by Miles Paschini, filed Apr. 16, 2009 as U.S. Appl. No. 12/425,259.
Patent application entitled "Prepaid Card with Saving Feature," by Kellie D. Harper, filed Feb. 27, 2013 as U.S. Appl. No. 13/819,469.
Cover sheet and specification for provisional patent application entitled "System and Method for Electronic Prepaid Account Replenishment," by Miles Paschini, et al., filed May 28, 2003 as U.S. Appl. No. 60/473,685.
Piskora, Beth, "EDS' inroads into ATMs give banks pause," Abstract, American Banker, Jun. 29, 1995, 1 page, vol. 18, No. 1, Ref. 8, EDS (Electronic Data Systems), 1994-1995, Lexis/Nexis Database.
Q Comm International, Inc. product information entitled, "Q Comm's Qxpress System; On-Demand Retail Phone Cards," http://web.archive.org/web/20000302140250/www.qcomm.com/products/ondemand.asp, Mar. 2000, 2 pages.
Smart Card Alliance Report PT-03002, "Contactless Payment and the Retail Point of Sale: Applications, Technologies and Transaction Models," Mar. 2003, pp. 1-50.
Splendore, Maurizio, et al., "A new ion ejection method employing an asymmetric trapping field to improve the mass scanning performance of an electrodynamic ion trap," International Journal of Mass Spectrometry, 1999, pp. 129-143, vol. 190/191, Elsevier Science B.V.
Ter Maat, Mike, "The economics of e-cash," IEEE Spectrum, Feb. 1997, pp. 68-73, IEEE.
"The future of money: hearing before the Subcommittee on Domestic and International Monetary Policy of the Committee on Banking and Financial Services, House of Representatives, One Hundred Fourth Congress, first session," The Future of Money, Part 4, http://www.archive.org/stream/futureofmoneyhea04unit/futureofmoneyhea04unit_djvu.txt, Jun. 11, 1996, 5 pages.

"US West Launches Christmas Prepaid Calling Card With Card Pioneer Innovative Telecom;—Sixty Minute Holiday Card Available Now—," Abstract, PR Newswire, Dec. 5, 1997, 1 page, Section: Financial News, Ref. 1, Inovative Telecom, 1994-1997, Lexis/Nexis Database.
"VENDAPIN Model 5004 Four Selection Cellular and IP, Phone Calling Card, Lottery or Admissions Ticket Printer Vending Machine with Optional Two Selection Cellular Phone Dispenser Console," http://www.vendapin.com/5008.html, Apr. 3, 2000, pp. 1-4, VENDAPIN.
Visa press release entitled "Visa Unveils Next Generation Electronic Payments and Services," http://corporate.visa.com/newsroom/press-releases/press1124.jsp, May 11, 2011, 3 pages.
Wenninger, John, et al., "The Electronic Purse," Current Issues in Economics and Finance, Apr. 1995, pp. 1-5 plus one information page, vol. 1, No. 1, Federal Reserve Bank of New York.
White, Ron, "How Computers Work," Millennium Edition, 1999, 83 pages, Que Corporation, A Division of Macmillan Computer Publishing, USA.
Office Action dated Jul. 31, 2013 (13 pages), U.S. Appl. No. 13/520,849, filed Jul. 6, 2012.
Office Action (Final) dated Dec. 6, 2013 (16 pages), U.S. Appl. No. 10/821,815, filed Apr. 9, 2004.
Office Action dated Aug. 6, 2013 (37 pages), U.S. Appl. No. 12/538,083, filed Aug. 7, 2009.
Office Action (Final) dated Dec. 27, 2013 (19 pages), U.S. Appl. No. 12/538,083, filed Aug. 7, 2009.
Office Action dated Mar. 3, 2014 (69 pages), U.S. Appl. No. 13/704,084, filed Dec. 13, 2012.
Filing receipt and specification for patent application entitled "Systems and Methods for Personal Identification Number Distribution and Delivery," by Darren New, et al., filed Oct. 28, 2013 as U.S. Appl. No. 14/065,189.
Foreign communication from a related counterpart application—Examination Report, New Zealand Application No. 605666, dated Aug. 9, 2013, 2 pages.
Foreign communication from a related counterpart application—Examination Report, New Zealand Application No. 607755, dated Dec. 4, 2013, 2 pages.
Office Action (Final) dated Feb. 20, 2014 (61 pages), U.S. Appl. No. 13/520,849, filed Jul. 6, 2012.
Office Action dated Mar. 10, 2014 (64 pages), U.S. Appl. No. 13/617,751, filed Sep. 14, 2012.
Advisory Action dated Mar. 10, 2014 (3 pages), U.S. Appl. No. 10/821,815, filed Apr. 9, 2004.
Office Action dated Mar. 7, 2014 (15 pages), U.S. Appl. No. 12/786,403, filed May 24, 2010.
Advisory Action dated Sep. 30, 2013 (4 pages), U.S. Appl. No. 12/711,211, filed Feb. 23, 2010.
Office Action dated Jan. 16, 2013 (6 pages), U.S. Appl. No. 13/619,176, filed Sep. 14, 2012.
Office Action (Final) dated Feb. 7, 2014 (51 pages), U.S. Appl. No. 13/619,176, filed Sep. 14, 2012.
Office Action dated Oct. 23, 2013 (72 pages), U.S. Appl. No. 13/621,331, filed Sep. 17, 2012.
Office Action dated Feb. 19, 2014 (9 pages), U.S. Appl. No. 14/065,189, filed Oct. 28, 2013.
Filing receipt and specification for provisional patent application entitled "Systems and Methods for Proxy Card and/or Wallet Redemption Card Transactions," by Tushar Vaish, et al., filed Mar. 11, 2013 as U.S. Appl. No. 61/776,594.
Advisory Action dated Mar. 25, 2014 (3 pages), U.S. Appl. No. 12/538,083, filed Aug. 7, 2009.
Examiner's Answer dated Oct. 22, 2013 (12 pages), U.S. Appl. No. 13/495,986, filed Jun. 13, 2012.
Filing receipt and specification for International application entitled "System and Method for Providing a Security Code," filed Jan. 3, 2014 as International application No. PCT/US2014/010206.
Foreign communication from a related counterpart application—Examination Report, New Zealand Application No. 601208, dated Mar. 5, 2014, 2 pages.
Office Action (Final) dated Mar. 31, 2014 (31 pages), U.S. Appl. No. 13/621,331, filed Sep. 17, 2012.

(56) References Cited

OTHER PUBLICATIONS

Filing receipt and specification for patent application entitled "System and Method for Providing a Security Code," by Tushar Vaish, et al., filed Jan. 3, 2014 as U.S. Appl. No. 14/147,330.
Filing receipt and specification for provisional patent application entitled "Client Directed Pre-Paid Card," by J. DuWayne Milner, filed Mar. 14, 2013 as U.S. Appl. No. 61/781,667.
Filing receipt and specification for provisional patent application entitled "Systems and Methods for Proxy Card and/or Wallet Redemption Card Transactions," by Pranav Sheth, et al., filed Mar. 13, 2013 as U.S. Appl. No. 61/779,334.
Filing receipt and specification for patent application entitled "Systems and Methods for Proxy Card and/or Wallet Redemption Card Transactions," by Tomas Ariel Campos, et al., filed Mar. 11, 2014 as U.S. Appl. No. 14/205,065.
Foreign communication from a related counterpart application—Invitation to Pay Additional Fees, PCT/US2014/010206, dated Mar. 27, 2014, 2 pages.
Office Action dated May 19, 2014 (52 pages), U.S. Appl. No. 14/106,494, filed Dec. 13, 2013.
Office Action dated May 9, 2014 (58 pages), U.S. Appl. No. 13/914,360, filed Jun. 10, 2013.
Filing receipt and specification for patent application entitled "System for Payment via Electronic Wallet," by Tomas Ariel Campos, filed Aug. 6, 2014 as U.S. Appl. No. 14/452,829.
Filing receipt and specification for provisional patent application entitled "Endless Endcap," by Tomas Ariel Campos, filed Nov. 20, 2012 as U.S. Appl. No. 61/728,597.
Foreign communication from a related counterpart application—Australian Examination Report, Application No. 2011293250, dated Jun. 2, 2014, 3 pages.
Foreign communication from a related counterpart application—International Search Report and Written Opinion, PCT/US2014/010206, dated Jun. 23, 2014, 10 pages.
Foreign communication from a related counterpart application—International Preliminary Report on Patentability, PCT/US2013/026501, dated Aug. 19, 2014, 12 pages.
Foreign communication from a related counterpart application—International Search Report and Written Opinion, PCT/US2013/070991, dated May 22, 2014, 11 pages.
Notice of Allowance dated Jul. 2, 2014 (41 pages), U.S. Appl. No. 14/065,189, filed Oct. 28, 2013.
Office Action dated Jul. 15, 2014 (19 pages), U.S. Appl. No. 13/619,176, filed Sep. 14, 2012.
Office Action dated Jul. 31, 2014 (38 pages), U.S. Appl. No. 13/621,331, filed Sep. 17, 2012.
Office Action dated Aug. 6, 2014 (30 pages), U.S. Appl. No. 13/704,084, filed Dec. 13, 2012.
Foreign communication from a related counterpart application—Mexican Office Action, Application No. MX/a/2012/007926, dated Nov. 26, 2013, 14 pages.
Foreign communication from a related counterpart application—Mexican Office Action, Application No. MX/a/2012/007926, dated Apr. 25, 2014, 11 pages.
Office Action dated Sep. 26, 2014 (31 pages), U.S. Appl. No. 13/520,849, filed Jul. 6, 2012.
Office Action dated Oct. 1, 2014 (16 pages), U.S. Appl. No. 10/821,815, filed Apr. 9, 2004.
Office Action dated Sep. 9, 2014 (10 pages), U.S. Appl. No. 12/711,211, filed Feb. 23, 2010.
Office Action dated Sep. 15, 2014 (63 pages), U.S. Appl. No. 13/619,226, filed Sep. 14, 2012.
Foreign communication from a related counterpart application—International Search Report and Written Opinion, PCT/US2013/026501, dated Jun. 19, 2013, 15 pages.
Foreign communication from a related counterpart application—Examination Report, New Zealand Application No. 605666, dated Nov. 3, 2014, 4 pages.
Office Action dated Nov. 19, 2014 (27 pages), U.S. Appl. No. 13/617,751, filed Sep. 14, 2012.
Office Action dated Nov. 13, 2014 (12 pages), U.S. Appl. No. 12/786,403, filed May 24, 2010.
Notice of Allowance dated Oct. 24, 2014 (18 pages), U.S. Appl. No. 13/914,360, filed Jun. 10, 2013.
Office Action dated Dec. 4, 2014 (61 pages), U.S. Appl. No. 14/085,394, filed Nov. 20, 2013.
Office Action dated Dec. 5, 2014 (12 pages), U.S. Appl. No. 14/106,494, filed Dec. 13, 2013.
Foreign communication from a related counterpart application—Examination Report, New Zealand Application No. 605612, dated Nov. 18, 2014, 4 pages.
Foreign communication from a related counterpart application—Examination Report, Australian Application No. 2011268018, dated Nov. 24, 2014, 4 pages.
Foreign communication from a related counterpart application—Examination Report, Australian Application No. 2011268026, dated Nov. 26, 2014, 4 pages.
Foreign communication from a related counterpart application—Australian Examination Report, Application No. 2011203954, dated Nov. 28, 2014, 4 pages.
Foreign communication from a related counterpart application—Search Report, European Application No. 11732229.7, dated Dec. 8, 2014, 8 pages.
Foreign communication from a related counterpart application—Mexican Office Action, Application No. MX/a/2012/007926, dated Nov. 21, 2014, 10 pages.
Office Action dated Dec. 22, 2014 (31 pages), U.S. Appl. No. 12/538,083, filed Aug. 7, 2009.
Office Action dated Jan. 5, 2015 (72 pages), U.S. Appl. No. 14/452,829, filed Aug. 6, 2014.
Office Action (Final) dated Jan. 14, 2015 (38 pages), U.S. Appl. No. 13/704,084, filed Dec. 13, 2012.
Office Action (Final) dated Feb. 4, 2015 (16 pages), U.S. Appl. No. 13/619,226, filed Sep. 14, 2012.
Office Action (Final) dated Mar. 18, 2015 (18 pages), U.S. Appl. No. 13/619,176, filed Sep. 14, 2012.
Office Action (Final) dated Mar. 5, 2015 (43 pages), U.S. Appl. No. 13/621,331, filed Sep. 17, 2012.
Office Action dated Mar. 17, 2015 (80 pages), U.S. Appl. No. 13/483,711, filed May 30, 2012.
Advisory Action dated Apr. 3, 2015 (3 pages), U.S. Appl. No. 13/704,084, filed Dec. 13, 2012.
Filing receipt and specification for patent application entitled "System and Method for Electronic Prepaid Account Replenishment," by Miles Paschini, et al., filed Mar. 2, 2015 as U.S. Appl. No. 14/636,092.
Foreign communication from a related counterpart application—International Preliminary Report on Patentability, PCT/US2012/039981, dated Dec. 2, 2013, 31 pages.
Office Action dated Mar. 25, 2015 (9 pages), U.S. Appl. No. 12/711,211, filed Feb. 23, 2010.
Office Action (Final) dated Apr. 7, 2015 (23 pages), U.S. Appl. No. 12/538,083, filed Aug. 7, 2009.
Advisory Action dated Apr. 14, 2015 (3 pages), U.S. Appl. No. 13/619,226, filed Sep. 14, 2012.
Foreign communication from a related counterpart application—International Preliminary Report on Patentability, PCT/US2011/039996, dated Dec. 14, 2012, 7 pages.
Foreign communication from a related counterpart application—International Search Report and Written Opinion, PCT/US2011/040055, dated Jan. 27, 2012, 12 pages.
Foreign communication from a related counterpart application—International Preliminary Report on Patentability, PCT/US2011/040055, dated Dec. 14, 2012, 8 pages.
Foreign communication from a related counterpart application—Invitation to Pay Additional Fees, PCT/US2011/040055, dated Nov. 16, 2011, 2 pages.
Foreign communication from a related counterpart application—International Search Report and Written Opinion, PCT/US2011/049338, dated Jan. 24, 2012, 7 pages.
Foreign communication from a related counterpart application—International Preliminary Report on Patentability, PCT/US2011/049338, dated Mar. 5, 2013, 6 pages.

(56) References Cited

OTHER PUBLICATIONS

Foreign communication from a related counterpart application—Invitation to Pay Additional Fees, PCT/US2013/026501, dated Apr. 16, 2013, 2 pages.
Foreign communication from a related counterpart application—Office Action, Mexican Patent Application No. MX/a/2007/006924, dated Jul. 28, 2010, 3 pages.
Gill, Lynn A., et al., "In Situ Optimization of the Electrode Geometry of the Quadrupole Ion Trap," International Journal of Mass Spectrometry, 1999, pp. 87-93, vol. 188, Elsevier Science B.V.
Gralla, Preston, "How the Internet Works," Millennium Edition, 1999, 35 pages, Que Corporation, A Division of Macmillan Computer Publishing, USA.
Harrop, Peter, "The Electronic Purse," IEE Review, Jun. 1992, pp. 227-231, IEE.
"Innovative Telecom Corp. and Catalina Marketing Corporation to Make Prepaid Long Distance Certificates Available to 120 Million Shoppers," Abstract, PR Newswire, Sep. 28, 1995, 3 pages, Section: Financial News, Ref. 4, Catalina Marketing, 1994-1997, Lexis/Nexis Database.
"Innovative Telecom Corporation Receives Contract from NYNEX to Provide Prepaid Phone Card Services," Abstract, PR Newswire, Sep. 28, 1995, 1 page, Section: Financial News, Ref. 4, Innovative Telecom, 1994-1997, Lexis/Nexis Database.
Knowles, Francine, "ATMs to Dispense Calling Cards; Ameritech, Cash Station in Venture," Abstract, Financial Section, Chicago Sun-Times, Oct. 18, 1995, 2 pages, Ref. 1, Ameritech & ATM, PINs, or Prepaid Cards, 1994-1997, Lexis/Nexis Database.
Kreyer, Nina, et al., "Standardized Payment Procedures as Key Enabling Factor for Mobile Commerce," Preceedings of the Third International Conference on E-Commerce and Web Technologies, 2002, pp. 400-409, Springer-Verlag Berlin Heidelberg.
Levy, Steven, "E-Money (That's What I Want)," Wired, 1994, 11 pages, © The Condé Nast Publications Inc., © Wired Digital, Inc.
Lilge, Manfred, "Evolution of Prepaid Service Towards a Real-Time Payment System," 2001, pp. 195-198, IEEE.
Lin, Yi-Bing, et al., "Mobile Prepaid Phone Services," IEEE Personal Communications, Jun. 2000, pp. 6-14, IEEE.
"Loose Change," Abstract, U.S. Banker, Sep. 1995, 1 page, National Edition, Section USB News, Industry, p. 12, Ref. 1, EDS (Electronic Data Systems), 1994-1997, Lexis/Nexis Database.
Marcous, Neil P., et al., Abstract, U.S. Pat. No. 5,650,604, Jul. 22, 1997, 1 page, Ref. 10, EDS (Electronic Data Systems), 1994-1997, Lexis/Nexis Database.
"Model 5008C Eight Selection Card Vending Machine," http://www.vendapin.com/5008.html, downloaded from Internet on May 9, 2013, 1 page.
Muller, Nathan J., "Desktop Encyclopedia of the Internet," 1999, 51 pages, Artech House Inc., Norwood, MA.
Office Action (Final) dated Nov. 23, 2009 (21 pages), U.S. Appl. No. 10/821,405, filed Apr. 9, 2004.
Office Action dated Jan. 14, 2009 (19 pages), U.S. Appl. No. 10/821,405, filed Apr. 9, 2004.
Advisory Action dated Apr. 12, 2013 (3 pages), U.S. Appl. No. 10/821,815, filed Apr. 9, 2004.
Advisory Action dated Apr. 19, 2012 (3 pages), U.S. Appl. No. 10/821,815, filed Apr. 9, 2004.
Advisory Action dated Apr. 28, 2009 (3 pages), U.S. Appl. No. 10/821,815, filed Apr. 9, 2004.
Office Action (Final) dated Jan. 25, 2013 (15 pages), U.S. Appl. No. 10/821,815, filed Apr. 9, 2004.
Office Action dated Jul. 16, 2012 (15 pages), U.S. Appl. No. 10/821,815, filed Apr. 9, 2004.
Office Action (Final) dated Feb. 1, 2012 (15 pages), U.S. Appl. No. 10/821,815, filed Apr. 9, 2004.
Office Action dated May 9, 2011 (12 pages), U.S. Appl. No. 10/821,815, filed Apr. 9, 2004.
Office Action dated Aug. 4, 2010 (14 pages), U.S. Appl. No. 10/821,815, filed Apr. 9, 2004.
Office Action dated Aug. 5, 2009 (11 pages), U.S. Appl. No. 10/821,815, filed Apr. 9, 2004.
Office Action (Final) dated Feb. 4, 2009 (9 pages), U.S. Appl. No. 10/821,815, filed Apr. 9, 2004.
Office Action dated May 14, 2008 (10 pages), U.S. Appl. No. 10/821,815, filed Apr. 9, 2004.
Advisory Action dated Apr. 11, 2013 (3 pages), U.S. Appl. No. 12/786,403, filed May 24, 2010.
Advisory Action dated May 8, 2012 (2 pages), U.S. Appl. No. 12/786,403, filed May 24, 2010.
Office Action (Final) dated Jan. 16, 2013 (15 pages), U.S. Appl. No. 12/786,403, filed May 24, 2010.
Office Action dated Jun. 6, 2012 (14 pages), U.S. Appl. No. 12/786,403, filed May 24, 2010.
Office Action (Final) dated Feb. 14, 2012 (13 pages), U.S. Appl. No. 121786,403, filed May 24, 2010.
Office Action dated May 12, 2011 (15 pages), U.S. Appl. No. 12/786,403, filed May 24, 2010.
Advisory Action dated Jan. 8, 2013 (3 pages), U.S. Appl. No. 12/711,211, filed Feb. 23, 2010.
Advisory Action dated Feb. 15, 2012 (3 pages), U.S. Appl. No. 12/711,211, filed Feb. 23, 2010.
Office Action (Final) dated May 22, 2013 (12 pages), U.S. Appl. No. 12/711,211, filed Feb. 23, 2010.
Office Action (Final) dated Oct. 26, 2012 (11 pages), U.S. Appl. No. 12/711,211, filed Feb. 23, 2010.
Office Action dated Apr. 11, 2012 (11 pages), U.S. Appl. No. 12/711,211, filed Feb. 23, 2010.
Office Action (Final) dated Dec. 8, 2011 (12 pages), U.S. Appl. No. 12/711,211, filed Feb. 23, 2010.
Office Action dated Oct. 1, 2010 (10 pages), U.S. Appl. No. 12/711,211, filed Feb. 23, 2010.
Advisory Action dated Mar. 12, 2013 (3 pages), U.S. Appl. No. 12/538,083, filed Aug. 7, 2009.
Office Action (Final) dated Jun. 18, 2015 (32 pages), U.S. Appl. No. 13/617,751, filed Sep. 14, 2012.
Office Action dated Jun. 29, 2015 (37 pages), U.S. Appl. No. 13/704,084, filed Dec. 13, 2012.
Advisory Action dated Jul. 9, 2015 (8 pages), U.S. Appl. No. 12/538,083, filed Aug. 7, 2009.
Office Action dated Jul. 15, 2015 (8 pages), U.S. Appl. No. 13/619,176, filed Sep. 14, 2012.
AFX-Asia, Company News, "Tata Hydro-Electric Q2 to Sept net profit 265.8 min rupees vs 212.4," Oct. 28, 1999, pp. 1-2, AFX News Limited.
Ameritech Corp., "Ameritech debuts its prepaid cellular," Abstract, RCR Radio Communications Report 15, No. 31, Ref. 7, Aug. 5, 1996, 1 page, Ameritech & ATM, PINS, or Prepaid Cards, 1994-1997, Lexis/Nexis Database.
Ameritech Corp., et al., "Ameritech in Prepaid Card Venture," Abstract, American Banker CLX, No. 205, Ref. 9, Oct. 24, 1995, 1 page, Ameritech & ATM, PINs, or Prepaid Cards, 1994-1997, Lexis/Nexis Database.
Ameritech Corp., "Phone Cards Meet ATMs," Abstract, Bank Technology News 8, No. 12, Ref. 8, Dec. 1995, 2 pages, Ameritech & ATM, PINs, or Prepaid Cards, 1994-1997, Lexis/Nexis Database.
Beach, Kirk W., et al., U.S. Pat. No. 5,892,827, Abstract, Ref. 7, Apr. 6, 1999, 1 page, Catalina Marketing International, Inc., 1994-1997, Lexis/Nexis Database.
Bernkopf, Mark, "Electronic Cash and Monetary Policy," http://ojphi.org/htbin/cgiwrap/bin/ojs/index.php/fm/article/viewFile/465/822, May 6, 1996, pp. 1-6, vol. 1, No. 1, First Monday.
Browne, F. X., et al., "Payments Technologies, Financial Innovation, and Laissez-Faire Banking," The Cato Journal, http://www.cato.org/pubs/journal/cj15n1-6.html, Spring/Summer 1995, 12 pages, vol. 15, No. 1, Cato Institute.
Business Wire entitled "The Winner's Edge.com Announces Purchase Agreement," Nov. 1, 1999, pp. 1-2, West.
Business Wire entitled "Easy Wireless Unveils Its New Internet Powered Accessory Express Kiosk Station," Feb. 25, 2000, pp. 1-2, West.
Business Wire entitled "Easy Wireless Unveils Its Revolutionary Pre-Paid PIN Dispensing Kiosk," Feb. 28, 2000, pp. 1-2, West.

(56) References Cited

OTHER PUBLICATIONS

"Card Briefs: Sprint is Using EDS for Phone-Card Plan," Abstract, The American Banker, Section: Credit/Debit/ATMs: p. 19, Mar. 13, 1995, 1 page, Ref. 4, EDS (Electronic Data Systems), 1994-1997, Lexis/Nexis Database.
"Codax Activation System," http://www.carkleen.co.nz/Products/Codax, Car Kleen—Leaders in Vehicle Wash Technology, 2 pages. (no date is available).
Congressional Budget Office Study entitled "Emerging Electronic Methods for Making Retail Payments," Jun. 1996, 63 pages, The Congress of the United States.
Derfler, Jr., Frank J., et al., "How Networks Work," Bestseller Edition, 1996, 69 pages, Ziff-Davis Press, an imprint of Macmillan Computer Publishing, USA.
Filing receipt and specification for provisional patent application entitled "System for Processing, Activating and Redeeming Value Added Prepaid Cards," by Teri Llach, filed Jan. 8, 2010 as U.S. Appl. No. 61/293,413.
Filing receipt and specification for provisional patent application entitled "Efficient Stored-Value Card Transactions," by Ansar Ansari, filed Jun. 14, 2010 as U.S. Appl. No. 61/354,469.
Filing receipt and specification for provisional patent application entitled "Efficient Stored-Value Card Transactions," by Ansar Ansari, filed Jun. 14, 2010 as U.S. Appl. No. 61/354,470.
Filing receipt and specification for provisional patent application entitled "System and Method for Configuring Risk Tolerance in Transaction Cards," by Arindam Kundu, filed Jun. 14, 2010 as U.S. Appl. No. 61/354,474.
Filing receipt and specification for provisional patent application entitled "System and Method for Configuring Risk Tolerance in Transaction Cards," by Arindam Kundu, filed Jun. 30, 2010 as U.S. Appl. No. 61/360,326.
Filing receipt and specification for provisional patent application entitled "Efficient Stored-Value Card Transactions," by Ansar Ansari, filed Jun. 30, 2010 asU.S. Appl. No. 61/360,327.
Filing receipt and specification for provisional patent application entitled "Prepaid Card with Savings Feature," by Kellie D. Harper, filed Aug. 27, 2010 as U.S. Appl. No. 61/377,800.
Filing receipt and specification for provisional patent application entitled "System for Payment via Electronic Wallet," by Tomas Ariel Campos, filed May 31, 2011 as U.S. Appl. No. 61/491,791.
Filing receipt and specification for provisional patent application entitled "System for Payment via Electronic Wallet," by Tomas Ariel Campos, filed May 31, 2011 as U.S. Appl. No. 61/491,813.
Filing receipt and specification for provisional patent application entitled "System, Method, and Apparatus for Creating and Distributing a Transaction Credit," by Ansar Ansari, filed Jun. 13, 2011 as U.S. Appl. No. 61/496,397.
Filing receipt and specification for provisional patent application entitled "System, Method, and Apparatus for Creating and Distributing a Transaction Credit," by Ansar Ansari, filed Jun. 13, 2011 as U.S. Appl. No. 61/496,404.
Filing receipt and specification for provisional patent application entitled "Stored-Value Card Transaction Systems and Methods," by Ansar Ansari, filed Aug. 31, 2011 as U.S. Appl. No. 61/529,813.
Filing receipt and specification for provisional patent application entitled "Universal Interactive eGift Registration Button aka The Digital Sticker," by Tomas Ariel Campos, filed Feb. 15, 2012 as U.S. Appl. No. 61/599,249.
Filing receipt and specification for provisional patent application entitled "Universal Interactive eGift Registration Button aka The Digital Sticker," by Tomas Ariel Campos, filed Feb. 22, 2012 as U.S. Appl. No. 61/601,911.
Filing receipt and specification for provisional patent application entitled "eWallet with QR Code," by Tomas Ariel Campos, filed Apr. 4, 2012 as U.S. Appl. No. 61/620,173.
Filing receipt and specification for provisional patent application entitled System for Manging CVV Information in Electronic Wallet, by Tushar Vaish, filed Jan. 3, 2012 as U.S. Appl. No. 61/748,679.
Filing receipt and specification for provisional patent application entitled "System and Method for Providing a Security Code," by Tushar Vaish, et al., filed Mar. 15, 2013 as U.S. Appl. No. 61/799,500.
Filing receipt and specification for provisional patent application entitled "System and Method for Using QR Codes in Conjunction with Electronic Stored-Value Cards," by Tomas Ariel Campos, et al., filed Mar. 15, 2013 as U.S. Appl. No. 61/800,704.
Filing receipt and specification for patent application entitled "Transaction Processing Platform for Facilitating Electronic Distribution of Plural Prepaid Services," by Roni Dolev Tamari, et al., filed Dec. 18, 2008 as U.S. Appl. No. 12/338,854.
Filing receipt and specification for patent application entitled "System and Method for Using Intelligent Codes to Add a Stored-Value Card to an Electronic Wallet," by Tomas Ariel Campos, filed Apr. 4, 2013 as U.S. Appl. No. 13/857,048.
Filing receipt and specification for patent application entitled "System and Method for Electronic Prepaid Account Replenishment," by Miles Paschini, filed Jun. 10, 2013 as U.S. Appl. No. 13/914,360.
Foreign communication from a related counterpart application—Search Report, European Application No. 05825880.7, dated Jun. 8, 2011, 6 pages.
Foreign communication from a related counterpart application—Communication, European Application No. 05825880.7, dated Jun. 27, 2011, 1 page.
Foreign communication from a related counterpart application—Search Report, European Application No. 05852818.3, dated Jan. 22, 2009, 9 pages.
Foreign communication from a related counterpart application—Communication, European Application No. 05852818.3, dated May 11, 2009, 1 page.
Foreign communication from a related counterpart application—International Search Report and Written Opinion, PCT/US2004/015658, dated Jun. 22, 2005, 8 pages.
Foreign communication from a related counterpart application—International Preliminary Examination Report, PCT/US2004/015658, dated Mar. 17, 2006, 6 pages.
Foreign communication from a related counterpart application—International Search Report and Written Opinion, PCT/US2005/043705, dated Aug. 10, 2006, 7 pages.
Foreign communication from a related counterpart application—International Preliminary Report on Patentability, PCT/US2005/043705, dated Jun. 13, 2007, 6 pages.
Foreign communication from a related counterpart application—International Search Report and Written Opinion, PCT/US2005/043756, dated Oct. 3, 2006, 6 pages.
Foreign communication from a related counterpart application—International Preliminary Report on Patentability, PCT/US2005/043756, dated Jun. 13, 2007, 6 pages.
Foreign communication from a related counterpart application—International Search Report and Written Opinion, PCT/US2011/020570, dated Mar. 7, 2011, 11 pages.
Foreign communication from a related counterpart application—International Preliminary Report on Patentability, PCT/US2011/020570, dated Jul. 10, 2012, 8 pages.
Foreign communication from a related counterpart application—International Search Report and Written Opinion, PCT/US2012/039981, dated Nov. 5, 2012, 35 pages.
Foreign communication from a related counterpart application—Invitation to Pay Additional Fees, PCT/US2012/039981, dated Aug. 28, 2012, 2 pages.
Foreign communication from a related counterpart application—International Search Report and Written Opinion, PCT/US2011/039996, dated Oct. 24, 2011, 8 pages.
Advisory Action dated May 21, 2015 (6 pages), U.S. Appl. No. 13/621,331, filed Sep. 17, 2012.
Foreign communication from a related counterpart application—Mexican Office Action, Application No. MX/a/2013/013903, dated Apr. 23, 2015, 9 pages.
Office Action (Final) dated May 6, 2015 (13 pages), U.S. Appl. No. 14/106,494, filed Dec. 13, 2013.
Office Action (Final) dated Jun. 2, 2015 (33 pages), U.S. Appl. No. 13/520,849, filed Jul. 6, 2012.

(56) References Cited

OTHER PUBLICATIONS

Office Action (Final) dated Jun. 3, 2015 (32 pages), U.S. Appl. No. 10/821,815, filed Apr. 9, 2004.
Patent application entitled "System and Method of Registering Stored-Value Cards into Electronic Wallets," by Tomas Ariel Campos, et al., filed Aug. 15, 2014 as U.S. Appl. No. 14/379,210.
Office Action (Final) dated Jun. 9, 2015 (26 pages), U.S. Appl. No. 14/085,394, filed Nov. 20, 2013.
Foreign communication from a related counterpart application—International Preliminary Report on Patentability, PCT/US2014/010206, dated Jul. 7, 2015, 7 pages.
Foreign communication from a related counterpart application—International Preliminary Report on Patentability, PCT/US2013/070991, dated May 26, 2015, 8 pages.
Advisory Action dated Jul. 24, 2015 (13 pages), U.S. Appl. No. 14/106,494, filed Dec. 13, 2013.
Advisory Action dated Aug. 19, 2015 (3 pages), U.S. Appl. No. 14/085,394, filed Nov. 20, 2013.
Office Action dated Jul. 29, 2015 (36 pages), U.S. Appl. No. 14/452,829, filed Aug. 6, 2014.
Office Action dated Oct. 5, 2015 (17 pages), U.S. Appl. No. 13/520,849, filed Jul. 6, 2012.
Office Action dated Oct. 5, 2015 (15 pages), U.S. Appl. No. 13/617,751, filed Sep. 14, 2012.
Advisory Action dated Sep. 23, 2015 (4 pages), U.S. Appl. No. 10/821,815, filed Apr. 9, 2004.
Office Action dated Dec. 31, 2015 (17 pages), U.S. Appl. No. 10/821,815, filed Apr. 9, 2004.
Office Action (Final) dated Sep. 9, 2015 (73 pages), U.S. Appl. No. 12/786,403, filed May 24, 2010.
Advisory Action dated Dec. 16, 2015 (3 pages), U.S. Appl. No. 12/786,403, filed May 24, 2010.
Office Action (Final) dated Oct. 20, 2015 (34 pages), U.S. Appl. No. 12/711,211, filed Feb. 23, 2010.
Office Action dated Sep. 15, 2015 (78 pages), U.S. Appl. No. 14/636,092, filed Mar. 2, 2015.
Office Action dated Oct. 2, 2015 (20 pages), U.S. Appl. No. 12/538,083, filed Aug. 7, 2009.
Office Action (Final) dated Jan. 13, 2016 (45 pages), U.S. Appl. No. 13/704,084, filed Dec. 13, 2012.
Office Action dated Sep. 29, 2015 (104 pages), U.S. Appl. No. 13/819,469, filed Jul. 1, 2013.
Office Action dated Oct. 1, 2015 (29 pages), U.S. Appl. No. 13/619,226, filed Sep. 14, 2012.
Office Action dated Nov. 5, 2015 (111 pages), U.S. Appl. No. 13/857,048, filed Apr. 4, 2013.
Office Action dated Nov. 17, 2015 (15 pages), U.S. Appl. No. 14/085,394, filed Nov. 20, 2013.
Filing receipt and specification for patent application entitled "System and Method for Electronic Prepaid Account Replenishment," by Miles Paschini, et al., filed Dec. 19, 2016 as U.S. Appl. No. 15/383,680.
Filing receipt and specification for provisional patent application entitled "Mimicking Post-Paid User Experience with Stored-Value Card Accounts," by Richard Gotlieb, filed Oct. 26, 2015 as U.S. Appl. No. 62/246,126.
Filing receipt and specification for patent application entitled "Systems and Methods for Mimicking Post-Paid User Experience with Stored-Value Card Accounts," by Richard Gotlieb, filed Oct. 26, 2016 as U.S. Appl. No. 15/335,086.
Advisory Action dated Dec. 15, 2016 (3 pages), U.S. Appl. No. 13/520,849, filed Jul. 6, 2012.
Office Action dated Jan. 11, 2017 (27 pages), U.S. Appl. No. 10/821,815, filed Apr. 9, 2004.
Advisory Action dated Mar. 1, 2017 (3 pages), U.S. Appl. No. 12/538,083, filed Aug. 7, 2009.
Office Action (Final) dated Jan. 13, 2017 (21 pages), U.S. Appl. No. 13/619,176, filed Sep. 14, 2012.
Advisory Action dated Mar. 21, 2017 (3 pages), U.S. Appl. No. 13/619,176, filed Sep. 14, 2012.
Office Action dated Mar. 20, 2017 (31 pages), U.S. Appl. No. 13/819,469, filed Jul. 1, 2013.
Office Action (Final) dated Dec. 22, 2016 (13 pages), U.S. Appl. No. 13/483,711, filed May 30, 2012.
Advisory Action dated Mar. 17, 2017 (3 pages), U.S. Appl. No. 13/483,711, filed May 30, 2012.
Office Action dated Mar. 7, 2017 (131 pages), U.S. Appl. No. 14/147,330, filed Oct. 4, 2016.
Office Action dated Mar. 16, 2017 (131 pages), U.S. Appl. No. 14/205,065, filed Mar. 11, 2014.
Office Action (Final) dated Apr. 4, 2017 (85 pages), U.S. Appl. No. 13/704,084, filed Dec. 13, 2012.
Office Action (Final) dated Apr. 20, 2016 (27 pages), U.S. Appl. No. 13/617,751, filed Sep. 14, 2012.
Office Action (Final) dated Apr. 20, 2016 (23 pages), U.S. Appl. No. 12/711,211, filed Feb. 23, 2010.
Office Action dated Apr. 25, 2016 (31 pages), U.S. Appl. No. 12/538,083, filed Aug. 7, 2009.
Examiner's Answer dated Mar. 30, 2016 (6 pages), U.S. Appl. No. 14/106,494, filed Dec. 13, 2013.
Advisory Action dated Mar. 23, 2016 (4 pages), U.S. Appl. No. 13/704,084, filed Dec. 13, 2012.
Office Action (Final) dated Apr. 26, 2016 (29 pages), U.S. Appl. No. 13/819,469, filed Jul. 1, 2013.
Office Action (Final) dated Mar. 24, 2016 (26 pages), U.S. Appl. No. 14/452,829, filed Aug. 6, 2014.
Office Action (Final) dated Mar. 8, 2016 (26 pages), U.S. Appl. No. 13/619,226, filed Sep. 14, 2012.
Office Action (Final) dated May 9, 2016 (26 pages), U.S. Appl. No. 14/085,394, filed Nov. 20, 2013.
Office Action (Final) dated Aug. 8, 2016 (31 pages), U.S. Appl. No. 10/821,815, filed Apr. 9, 2004.
Advisory Action dated Jun. 29, 2016 (3 pages), U.S. Appl. No. 12/711,211, filed Feb. 23, 2010.
Office Action (Final) dated Jan. 29, 2016 (21 pages), U.S. Appl. No. 13/619,176, filed Sep. 14, 2012.
Advisory Action dated Jul. 27, 2016 (3 pages), U.S. Appl. No. 13/819,469, filed Jul. 1, 2013.
Office Action (Final) dated Jul. 12, 2016 (36 pages), U.S. Appl. No. 13/483,711, filed May 30, 2012.
Office Action (Final) dated May 18, 2016 (32 pages), U.S. Appl. No. 13/857,048, filed Apr. 4, 2013.
Advisory Action dated Aug. 10, 2016 (2 pages), U.S. Appl. No. 13/857,048, filed Apr. 4, 2013.
Advisory Action dated Jul. 15, 2016 (3 pages), U.S. Appl. No. 14/085,394, filed Nov. 20, 2013.
Office Action (Final) dated Sep. 26, 2016 (37 pages), U.S. Appl. No. 13/520,849, filed Jul. 6, 2012.
Advisory Action dated Oct. 20, 2016, (3 pages), U.S. Appl. No. 10/821,815, filed Apr. 9, 2004.
Examiner's Answer dated Oct. 19, 2016 (9 pages), U.S. Appl. No. 12/786,403, filed May 24, 2010.
Office Action dated Oct. 5, 2016 (19 pages), U.S. Appl. No. 12/711,211, filed Feb. 23, 2010.
Notice of Allowance dated Sep. 29, 2016 (7 pages), U.S. Appl. No. 14/636,092, filed Mar. 2, 2015.
Office Action (Final) dated Nov. 29, 2016 (25 pages), U.S. Appl. No. 12/538,083, filed Aug. 7, 2009.
Office Action dated Oct. 19, 2016 (54 pages), U.S. Appl. No. 13/704,084, filed Dec. 13, 2012.
Advisory Action dated Oct. 13, 2016 (3 pages), U.S. Appl. No. 13/483,711, filed May 30, 2012.
Examiner's Answer dated Nov. 25, 2016 (16 pages), U.S. Appl. No. 13/619,226, filed Sep. 14, 2012.
Office Action dated Nov. 2, 2016 (33 pages), U.S. Appl. No. 13/857,048, filed Apr. 4, 2013.
Office Action dated Sep. 30, 2016 (27 pages), U.S. Appl. No. 14/085,394, filed Nov. 20, 2013.
Office Action dated Apr. 20, 2017 (30 pages), U.S. Appl. No. 13/520,849, filed Jul. 6, 2012.
Notice of Allowance dated Sep. 18, 2017 (12 pages), U.S. Appl. No. 13/520,849, filed Jul. 6, 2012.

(56) References Cited

OTHER PUBLICATIONS

Office Action dated May 30, 2017 (40 pages), U.S. Appl. No. 13/617,751, filed Sep. 14, 2012.
Office Action (Final) dated Oct. 16, 2017 (16 pages), U.S. Appl. No. 13/617,751, filed Sep. 14, 2012.
Advisory Action dated Aug. 1, 2016 (2 pages), U.S. Appl. No. 13/617,751, filed Sep. 14, 2012.
Office Action (Final) dated Jul. 11, 2017 (26 pages), U.S. Appl. No. 10/821,815, filed Apr. 9, 2004.
Advisory Action dated Sep. 20, 2017, (3 pages), U.S. Appl. No. 10/821,815, filed Apr. 9, 2004.
Office Action (Final) dated May 3, 2017 (26 pages), U.S. Appl. No. 12/711,211, filed Feb. 23, 2010.
Advisory Action dated Sep. 1, 2017 (3 pages), U.S. Appl. No. 12/711,211, filed Feb. 23, 2010.
Office Action dated May 18, 2017 (10 pages), U.S. Appl. No. 15/383,680, filed Dec. 19, 2016.
Office Action (Final) dated Sep. 6, 2017 (5 pages), U.S. Appl. No. 15/383,680, filed Dec. 19, 2016.
Notice of Allowance dated Oct. 10, 2017 (7 pages), U.S. Appl. No. 15/383,680, filed Dec. 19, 2016.
Office Action dated Jun. 29, 2017 (26 pages), U.S. Appl. No. 12/538,083, filed Aug. 7, 2009.
Office Action (Final) dated Jan. 2, 2018 (25 pages), U.S. Appl. No. 12/538,083, filed Aug. 7, 2009.
Office Action dated Jul. 20, 2017 (21 pages), U.S. Appl. No. 13/619,176, filed Sep. 14, 2012.
Advisory Action dated Jun. 16, 2017 (5 pages), U.S. Appl. No. 13/704,084, filed Dec. 13, 2012.
Office Action dated Nov. 13, 2017 (82 pages), U.S. Appl. No. 13/704,084, filed Dec. 13, 2012.
Office Action (Final) dated Aug. 31, 2017 (27 pages), U.S. Appl. No. 13/819,469, filed Jul. 1, 2013.
Office Action dated Nov. 20, 2017 (24 pages), U.S. Appl. No. 13/483,711, filed May 30, 2012.
Advisory Action dated Nov. 7, 2017 (3 pages), U.S. Appl. No. 13/819,469, filed Jul. 1, 2013.
Office Action dated Apr. 3, 2017 (38 pages), U.S. Appl. No. 14/452,829, filed Aug. 6, 2014.
Office Action (Final) dated Oct. 17, 2017 (21 pages), U.S. Appl. No. 14/452,829, filed Aug. 6, 2014.
Advisory Action dated Dec. 8, 2017 (3 pages), U.S. Appl. No. 14/452,829, filed Aug. 6, 2014.
Office Action dated Sep. 29, 2017 (21 pages), U.S. Appl. No. 14/379,210, filed Aug. 15, 2014.
Office Action (Final) dated May 17, 2017 (45 pages), U.S. Appl. No. 13/857,048, filed Apr. 4, 2013.
Office Action (Final) dated Feb. 15, 2017 (23 pages), U.S. Appl. No. 14/085,394, filed Nov. 20, 2013.
Advisory Action dated Apr. 21, 2017 (3 pages), U.S. Appl. No. 14/085,394, filed Nov. 20, 2013.
Office Action dated Sep. 29, 2017 (24 pages), U.S. Appl. No. 14/085,394, filed Nov. 20, 2013.
Office Action (Final) dated Sep. 7, 2017 (34 pages), U.S. Appl. No. 14/205,065, filed Mar. 11, 2014.
Advisory Action dated Nov. 16, 2017 (3 pages), U.S. Appl. No. 14/205,065, filed Mar. 11, 2014.
Office Action (Final) dated Jun. 27, 2017 (27 pages), U.S. Appl. No. 14/147,330, filed Jan. 3, 2014.
Advisory Action dated Sep. 20, 2017 (3 pages), U.S. Appl. No. 14/147,330, filed Jan. 3, 2014.

* cited by examiner

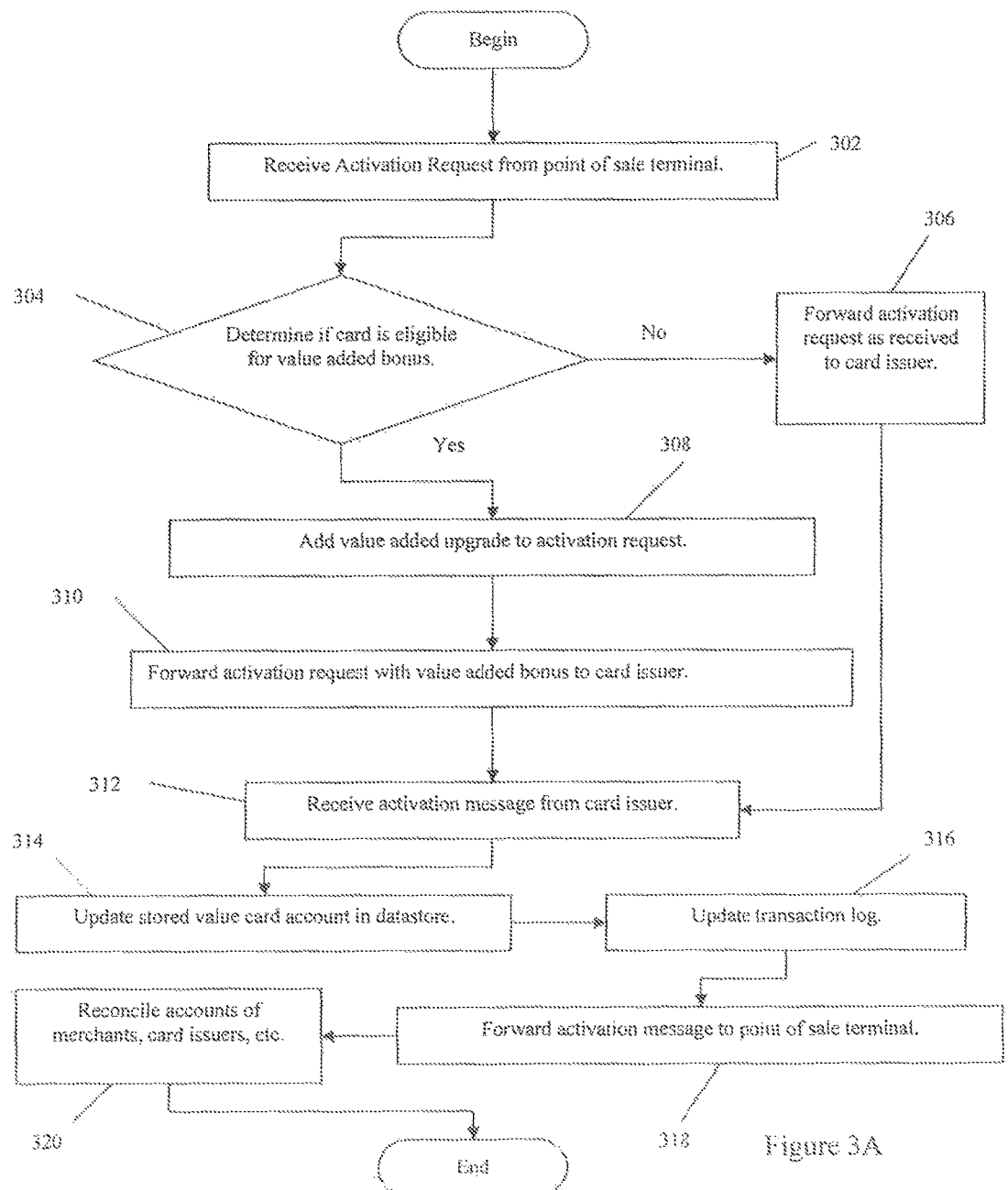

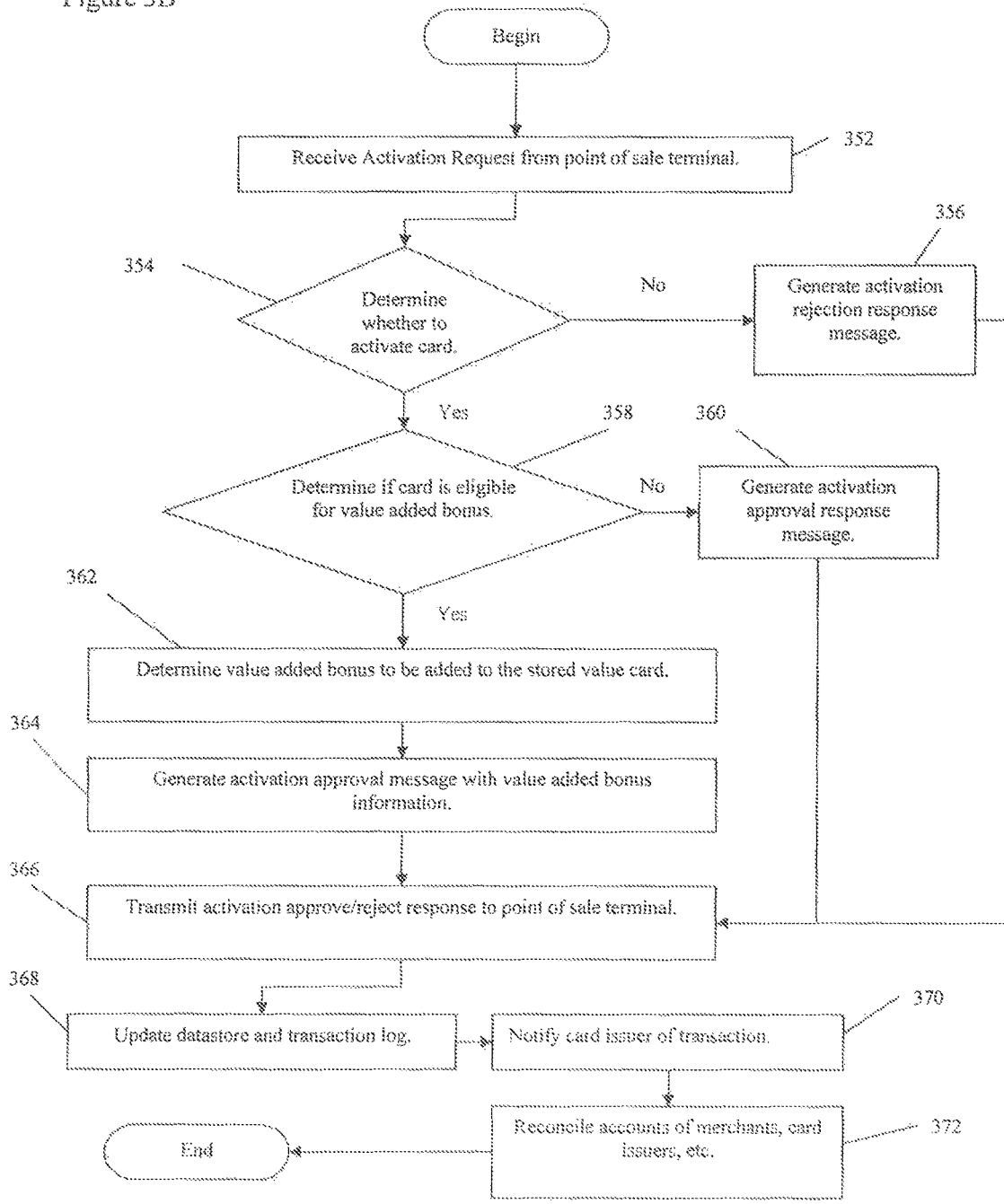

SYSTEM FOR PROCESSING, ACTIVATING AND REDEEMING VALUE ADDED PREPAID CARDS

CROSS-REFERENCE TO RELATED APPLICATIONS

This application claims priority to: U.S. Provisional Application Ser. No. 61/781,667, filed Mar. 14, 2013, entitled "Client Directed Pre-Paid Card"; this application is also a continuation in part of and claims priority to U.S. patent application Ser. No. 13/617,751 filed on Sep. 14, 2012, entitled "System for Processing, Activating and Redeeming Value Added Prepaid Cards," which is a continuation of and claims priority to U.S. patent application Ser. No. 13/520,849 filed on Jul. 6, 2012, entitled "System for Processing, Activating and Redeeming Value Added Prepaid Cards," which is a filing under 35 U.S.C. 371 of International Application Serial No. PCT/US2011/020570 filed Jan. 7, 2011, entitled "A System for Processing, Activating and Redeeming Value Added Prepaid Cards," which claims priority to U.S. Provisional Patent Application No. 61/293,413 filed Jan. 8, 2010, entitled "A System for Processing, Activating and Redeeming Value Added Prepaid Cards," each of which is incorporated by reference herein in their entirety.

BACKGROUND

The present invention generally relates to a processing and activation system providing consumers with the ability to purchase a stored value card, i.e., a gift card, of various affiliated or non-affiliated service providers with additional value added beyond the purchase price.

The market for stored value cards such as merchant gift cards continues to grow. The marketplace is currently filled with many types of stored value cards offered by numerous card issuers. Some of the cards are tailored to be redeemed from a single merchant while others may be redeemed by several merchants. Because the consumer has numerous choices in selecting a stored value card, such as a gift card, it is becoming increasingly difficult for card issuers to distinguish themselves in the marketplace from other issuers of stored value cards. Therefore, it would be desirable to have a method and system that provided card issuers and redeeming merchants a mechanism for promoting their card and/or store in order to encourage a consumer to purchase a stored value card from them or redeem a stored value card with them.

Clients such as corporate clients and other larger buyers have significant leverage and buying power. As a result, such clients can command discounts from certain merchants selling goods or services. Thus, the clients direct their entities (buyers) purchasing on their behalf to purchase from the certain merchants that have agreed to provide a discount. As an example, an insurer has significant leverage and buying power and can command discounts from certain merchants selling goods or services provided to an insured. When fulfilling a claim for their insured entity (e.g., buyer or their representative), an insurer directs their insured entity to purchase from the certain merchants that have agreed to provide to the insurer a discount. There is a need for systems, methods and a tangible computer readable storage medium which facilitate, implement, control and monitor the above.

SUMMARY

Disclosed herein is a computer implemented method and system for adding value to a stored value card in excess of the purchase price for the stored value card. In one embodiment a stored value card transaction processor receives an activation or redemption request for a stored value card from a point of sale terminal. The request comprises an activation or redemption amount and at least one of a card identification, a point of sale terminal identification, a merchant identification, and a time of activation. The stored value card transaction processor compares at least one of the card identification, the point of sale terminal identification, the merchant identification, and the time of activation to data stored in a stored value card datastore to determine if the stored value card to be activated or redeemed is eligible for a value added award. The processor then determines the value added award to be added to an account associated with the stored value card to be activated or redeemed when the stored value card is determined to be eligible for the value added award and modifies the request to include the value added award. The processor then transmits the modified request to the card issuer authorization system and receives a response from the card issuer authorization system. The processor transmits the response to the point of sale terminal wherein the response includes a value added award reference when the stored value card has been determined to be eligible for the value added award and the value added award has been authorized.

Also disclosed herein is a system used by a client that implements transactions between a buyer and merchants providing a discount to the client. In a preferred embodiment the transactions are funded by the client. In another embodiment, the transactions are partially funded by the client and partially funded by the buyer.

Also disclosed herein is a method used by a client that implements transactions between a buyer and merchants providing a discount to the client. In a preferred embodiment the transactions are funded by the client. In another embodiment the transactions are partially funded by the client and partially funded by the buyer. The method includes computer-executable instructions executed by a processor.

Also disclosed herein is a tangible computer readable storage medium used by a client implements transactions between a buyer and merchants providing one or more discounts to the client. In a preferred embodiment the transactions are funded by the client. In another embodiment, the transactions are partially funded by the client and partially funded by the buyer. The tangible computer readable storage medium includes computer executable instructions executable by a processor.

As used herein, a discount may be monetary or may be another form of value differentiation, including points, rebates, cost reductions, coupons, ad-on merchandise, credits, and the like.

BRIEF DESCRIPTION OF THE DRAWINGS

FIGS. 3A and 3B are flowcharts depicting exemplary processes utilized by a stored value card transaction computer for activating a stored value card with a value added bonus.

DETAILED DESCRIPTION

Figure 1:
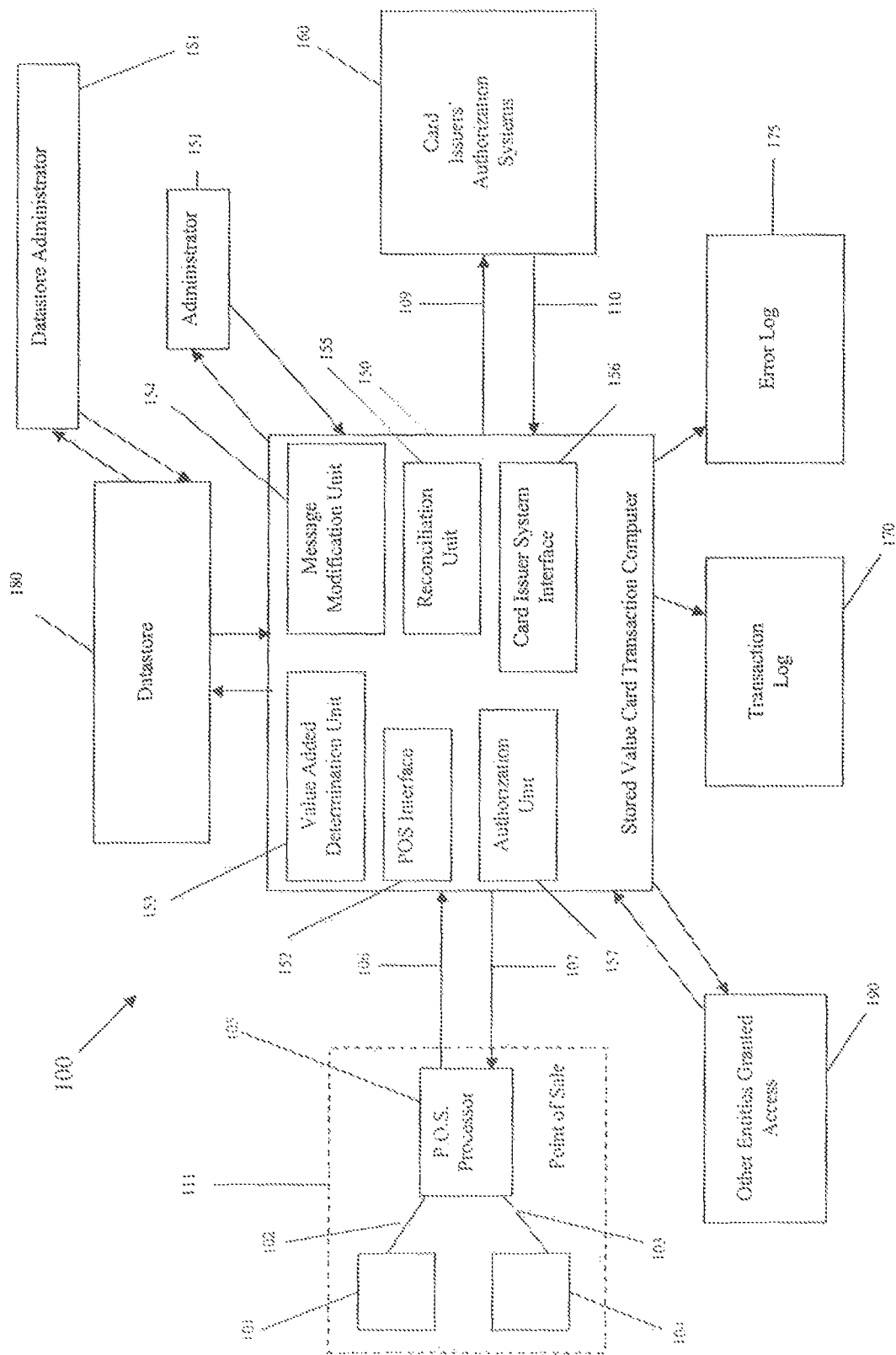
FIG. 1 is a schematic representation of the stored value card transaction system.

As used herein, stored value card refers to a card that may be used to transact business with a party willing to accept the card, for example as tender for a purchase. Examples of such cards include gift cards, prepaid telephone cards, loyalty cards, membership cards, ticket cards, entertainment cards, sports cards, prepaid cards, and the like. Typically, such cards are wallet-sized and made of plastic but may also be in electronic form. In various embodiments, the transaction card may be a type of card such as a gift or prepaid card that requires activation at a point of sale. For example, a stored value card may be purchased and activated at a point of sale by a consumer and subsequently used by the consumer or another (e.g., the recipient of the card as a gift) to transact business.

Consumer use of stored value cards typically involves a card vendor, a redeeming merchant, and a card issuer. In various embodiments, the card vendor, redeeming merchant and card issuer may be the same, different, or related entities. The point of sale where stored value cards are purchased and activated may be referred to as the card vendor or simply vendor. An entity that will accept a stored value card for business transactions, for example as tender for a purchase, may be referred to as a redeeming merchant. An entity that provides the financial backing and/or payment processing accessed via the stored value card may be referred to as the card issuer or simply issuer.

Typically, the issuer is identified on the stored value card and associates a unique issuer account code with each stored value card. Card issuers include direct issuers of cards such as store-branded cards, and in some embodiments the card vendor may also be the card issuer and/or the redeeming merchant. Card issuers also include banks, financial institutions, and transaction processors such as VISA, Mastercard, American Express, etc., and cards issued by such institutions may be readily accepted by a number of redeeming merchants to conduct transactions such as purchases. In some instances, the redeeming merchant may be identified on the stored value card (for example, a retailer branded card such as Store X), and such cards may be sold at the same or different card vendor (e.g., card vendor is Store X or a different or unrelated Store Z). In such instances, the Store X branded stored value card may be issued by Store X, by Store Z, or by a third party such as bank or financial institution.

Customers (which can be used interchangeably with buyers, herein) may be offered incentives to purchase and/or redeem a card (or cards) via value differentiation between the purchase and redemption values of said card (or cards).

In an embodiment, a card with a face value of $25 may be purchased by a customer for $25, but the card may be activated for $30—the $25 purchase price plus an additional $5 added as an incentive to purchase the card. Alternatively, rather than adding cash value to the card, the card may be encoded, in addition to the face value of the card, with a redemption coupon for a specific product or service. For example, a $15 gift card to a coffee house may have an electronic redemption coupon for a free shot of the customer's syrup of choice to be added to any coffee purchased at the coffee house. The free shot of syrup may be redeemed in connection with redeeming a portion or all of the gift card amount or the free shot of syrup may be redeemed separately.

In another embodiment, a card vendor is able to offer customers incentives to redeem a stored value card, such as a gift card, by adding value in addition to the value of the stored value card at the time the customer redeems the stored value card. For example, a merchant could run a promotion in which it offers customers an additional $5 credit when the customer uses a gift card for a purchase at one of the merchant's retail stores during a specified period of time.

FIG. 1 illustrates an exemplary stored value card transaction system 100 in accordance with one embodiment of the present invention. In one embodiment, the stored value card transaction system comprises: (a) at least one point of sale component 111; (b) a stored value card transaction computer 150; (c) a datastore 180 containing stored value card identifiers, stored value card account information, value added award conditions (herein "value added award" is synonymous with "value added bonus," "value added bonus award," "value added award bonus," and "value differentiation"), and other information related to activating, redeeming, and managing stored value cards; (d) at least one individual card issuers' authorization system 160; and (e) any other component included in the system by the stored-value card transaction computer administrator 151. In one embodiment, the stored value card transaction computer 150 comprises a value added determination component 153, a POS interface 152, a message modification component 154, a reconciliation component 155, a card issuer system interface 156, and an authorization component 157. The POS Interface 152 provides a means for the stored value card transaction computer 150 to communicate with the point of sale component 111 via, for example, the Internet, a Public Switched Telephone Network (PSTN), or an independent dedicated network. Likewise, the stored value card transaction computer 150 may communicate with the card issuers' authorization system 160 via, for example, the Internet, a Public Switched Telephone Network (PSTN), or an independent dedicated network. Communications 106, 107 between the POS interface 152 and the point of sale component 111 and communications 109, 110 between the card issuer system interface 156 and the card issuers' authorization systems 160 may be encrypted for added security and/or may utilize a virtual private network (VPN).

As can be seen in FIG. 1, at the point of sale component 111 (typically located at a vendor and/or redeeming merchant), the card identifier on the stored value card is interpreted 102 by a point of sale interpretation component 101 (e.g., a card reader). The point of sale interpretation component 101 can comprise a human, a bar code scanner, magnetic strip reader, optical character recognition device, or other device configured to interpret the data encoded in the card identifier on the stored value card.

Contemporaneously with the interpretation of the card identifier, a request for activation, deactivation, or redemption 103 by a point of sale transaction component 104 is made. The point of sale transaction component 104 can comprise a human, an electronic input device, a register, a computer processing unit ("CPU"), or other means of requesting the activation or deactivation of the stored value card identifier interpreted by the point of sale interpretation component 101. In some embodiments, the actions performed by the point of sale interpretation component 101 and the point of sale transaction component 104 may be performed by one component capable of performing both actions that would be performed by the individual components.

The point of sale interpretation component 101 and the point of sale transaction component 104 communicate with the point of sale processing component 105. The point of sale processing component 105 can comprise a CPU or other type of processing device accepted for use in the industry. The point of sale interpretation component 101 communicates the card identifier to the point of sale processing component 105. The point of sale transaction component 104 communicates the request for activation or deactivation of the card identifier interpreted by the point of sale interpretation component 101 to the point of sale processing component 105. The point of sale processing component 105 communicates 106 with the stored value card transaction computer 150 (e.g., transmits a message requesting card activation, deactivation or redemption). In some embodiments, the actions performed by the point of sale interpretation component 101, the point of sale transaction component 104, and the point of sale processing component 105 may all be performed by one component (e.g., an integrated POS device such as a computerized register) capable of performing all the actions that would be performed by the individual components.

The point of sale processing component 105 is connectable to the stored value card transaction computer 150 via a suitable network, such as the Internet, the public switched telephone network (PSTN), or an independent dedicated network. Each point of sale processing component 105 has an associated identifier that may be transmitted to the stored value card transaction computer 150 during the course of connecting the point of sale processing component 105 to the stored value card transaction computer 150. Each point of sale processing component 105 may include multiple point of sale transaction components 101, 104 corresponding to individual terminals each with its own terminal identification.

As depicted in FIG. 1, the stored value card transaction computer 150 is configured to: (a) form a secure connection with the card vendor (e.g., via the point of sale component 111), the card issuers' authorization systems 160, and any other entities 190 authorized to access the stored value card transaction computer 150 by the stored value card transaction computer administrator 151; (b) to communicate with card issuers' authorization systems 160 to request and receive activation or deactivation of stored value cards as well as receive value added information for stored-value cards that are eligible for incentives; (c) to communicate with card issuers' authorization systems 160 to redeem all or a portion of the value, services, or products associated with the stored-value card; (d) generate and maintain a transaction log 170 of all activities performed; (e) generate and maintain an error log 175 of all activities unsuccessfully completed and reasons therefor; (f) communicate to the card vendor (e.g., via the POS component 111) the activation or deactivation of the stored value card and any information concomitant with the activation or deactivation of individual stored value card, i.e. the communication of PINS associated with activated stored value cards; and (g) communicate to the card vendor (e.g., via the POS component 111) any reasons why requested transactions cannot not be completed.

The stored value card transaction computer 150 may comprise a singular processing unit (e.g., a centralized server or data center), a plurality of processing units (e.g., a distributed computing system with various components distributed and in communication with each other), or combinations thereof, with concomitant storage capabilities, each capable of or designated for: accessing the datastore 180; creating a transaction log 170; creating and maintaining an error log 175; communicating with card vendors; communicating with the individual card issuers' authorization systems 160; processing individual transaction card activation and or deactivation requests; processing stored value card redemption requests, processing value added functions to add additional cash value or add an electronic redemption coupon for a specific product(s) or service(s), processing redemption request for electronic redemption coupons for specific product(s) and/or service(s), and communicating with other systems 190 capable of and authorized to communicate with the stored value card transaction computer 150.

Datastore 180 maintains records of accounts associated with each stored value card indicating: (a) whether each individual card has been activated or deactivated, (b) whether the card has been redeemed, (c) records and details of each individual redemption request, (d) the amount remaining on the card, (e) conditions required for activation and redeeming the card, (f) identity of the card issuer, (f) value added bonus awards, (g) conditions for redeeming value added bonus awards, and (h) any combination thereof. The datastore may also maintain records of conditions required for granting a value added bonus award to a stored value card.

The stored value card transaction computer 150 is also configured to generate and maintain a transaction log 170 of all activity involving the stored value card transaction computer 150. The transaction log may comprise a detailed summary of: (a) requested stored-value card activations; (b) requested stored-value card deactivations; (c) the monetary amount ascribed to card activations; (d) the monetary amount ascribed to card deactivations; (e) the value added amounts, products, or services ascribed card activations; (f) the value added amounts, products, or services ascribed to card deactivations; (g) the time the cards were activated; (h) the time the cards were deactivated; (i) the transaction or communication performed with the card issuer to activate the cards; (j) the transaction or communication performed with the card issuer to deactivate the cards; (k) the PIN communicated to the card vendor in response to a request to activate a card requiring the input of a PIN for use; (l) any other information the stored value card transaction computer administrator 151 directs the stored value card transaction computer 150 to maintain as a log entry; and (m) any combination thereof.

The information contained in the transaction log 170 may be used to generate reconciliation reports, settlement reports, payment reports, audit reports, or other forms of information aggregation for the benefit of, use by, or for provision to, the stored value card transaction administrator 151, the datastore administrator 181, card vendors, card issuers, card issuers' authorization systems 160, redeeming merchants, or other interested parties. For example, the transaction log 170 contains information about each transaction performed by stored value card transaction computer 150 and may be also utilized by the reconciliation component 155 when reconciling accounts belonging to various vendors, merchants, card issuers and the stored value card transaction system administrator.

Oversight and maintenance of the stored value card transaction computer is performed by the stored value card transaction computer administrator 151. Although not required, in an alternative embodiment, the stored value card transaction computer administrator 151 may also function as the datastore administrator 181. The stored value card transaction computer 150 is configured to generate and maintain an error log of all transactions that were not completed and reasons therefor. In some embodiments, the error log is administered by the stored value card transaction computer administrator 151.

As noted above, the stored value card transaction computer 150 communicates with the datastore 180 and/or the card issuers' authorization systems 160 to determine whether the stored value card to be activated is eligible for a value added award. The stored value card transaction computer 150 may compare one or more of the card identification, the terminal identification, vendor identification, and the time and date of the activation request contained within the activation request to data contained in the datastore 180 to determine whether the stored value card to be activated is eligible for a value added award. For example, a particular card issuer may run a promotion to encourage customers to purchase its stored value card in which cards issued by that card issuer that are purchased within a specified period of time receive a $5 bonus added to the stored value card in addition to the purchase price for the card. Thus, a $25 gift card may be purchased for $25, but be authorized for $30. In another example, a vendor may run a promotion to encourage customers to purchase a stored value card, wherein stored value cards purchased within a specified period of time may be purchased for a price less than the value designated by the stored value card's markings and/or packaging. Thus, a customer could purchase a $25 gift card for some amount less than $25, e.g., $20. In either of the above examples, the value differentiators, e.g., bonus added to a redemption value of a stored value card and reduction of purchase price for a designated value of a stored value card, may be applicable to bundled stored value card packages and the value differentiators distributed amongst and/or across the cards, either equally or disproportionately.

Upon receipt of an activation or deactivation request for a stored-value card from the card vendor, the stored value card transaction computer 150 accesses the datastore 180 of stored value card identifier data. The stored value card transaction computer 150 processes the information contained in the datastore 180 and communicates 109, 110 with the individual card issuers' authorization systems 160 to effectuate activation or deactivation of the transaction cards secured by the package as well as to effectuate the addition of a value added service, product, or cash value amount. The stored value card transaction computer's 150 communication with the individual card issuers' authorization systems 160 may occur simultaneously or independently. The stored value card transaction computer 150 is connectable to the individual card issuers' authorization systems as via a suitable network, such as the PSTN, the Internet, or an independent dedicated network. The stored value card transaction computer 150 is configured to receive communication 110 from the card issuers' authorization systems 160 concerning the status of the activation or deactivation of individual transaction cards.

The stored value card transaction computer 150 is also configured to communicate to the card vendor 107 the status of a request for activation or deactivation of a stored-value card and to communicate any necessary PIN information required by activated stored value cards to the card vendor in order for the card purchaser to be apprised of that information for use of the purchased individual transaction card. As previously discussed, is connectable to the individual card issuers' authorization systems as via a suitable network, such as the PSTN, the Internet, or an independent dedicated network.

The stored value card transaction computer 150 is also configured to communicate with other entities 190 authorized to access the stored value card transaction system and specifically authorized to access the stored value card transaction computer 150. These other entities may comprise third party payment management systems, third party audit systems, card issuer affiliated entities, card vendor affiliated entities, redeeming merchants or redeeming merchant affiliated entities, financial institutions, such as banks and credit unions, or any other entity provided access by the stored value card transaction computer administrator 151.

There may arise situations where an activation, deactivation, or redemption request is received by the stored value card transaction computer 150, but the information in the datastore 180 pertaining to the stored value card identifier received by stored value card transaction computer 150 precludes completion of the request. For example, a card may have been previously activated, returned to the point of sale for a refund, but not deactivated prior to reshelving. In that case, when a subsequent customer purchases that card, and an activation request is communicated to the stored value card transaction computer 150, the datastore 180 file accessed by the stored value card transaction computer 150 will indicate that the card is already activated. In another example, the stored value card identifier received by the stored value card transaction computer 150 may have already been redeemed for the entire amount associated with the stored value card. In these and other similar situations, the stored value card transaction computer 150 will communicate a message to the card vendor that the transaction cannot be completed.

The value added determination component 153 uses information contained within the activation request or redemption request received from the point of sale component 111 as well as information contained in datastore 180 to determine whether the stored value card which the point of sale component 111 is attempted to have activated or redeemed is eligible for a value added award. The activation request from the point of sale component 111 may contain one or more of the following pieces of information: (a) stored value card identification, (b) point of sale terminal identification, (c) amount to be credited to an account associated with the stored value card, (d) the time of the activation request, (e) the date of the activation request, (f) identification of the card issuer for the stored value card, (g) identification of the activating vendor, (h) location of activating vendor, and (i) any combination thereof. The redemption request from the point of sale component 111 may contain one or more of the following pieces of information: (a) stored value card identification, (b) point of sale terminal identification, (c) amount to be debited from the account associated with the stored value card, (d) the time of the redemption request, (e) the date of the redemption request, (f) identification of the card issuer for the stored value card, (g) identification of the redeeming merchant, (h) location of the redeeming merchant, (i) identification of the product(s) and/or service(s) being purchased, (j) and any combination thereof. However, the information contained within the activation and redemption requests is not limited to the enumerated list but may other items in addition to the items enumerated or in place of the items enumerated above.

For an activation request, the value added determination component 153 compares the information received in the activation request to information in the datastore 180 to determine if any of the criteria for adding additional value to the stored value card or discounting the price of the stored value card to be activated are met. For example, the card issuer may have provided that stored value cards purchased during a certain period of time should receive an additional value added to the purchase amount. Alternatively, the card issuer may provide that stored value cards of a certain value or purchased during a specified time period be discounted such that the card selling vendor is only required to obtain an amount less than the face value of the card. For example, the face value of the stored value card may be $50, but the card issuer is running a promotion to encourage customers to purchase its cards by giving a $5 discount such that the purchase amount for the $50 card is only $45, but the card is activated for $50. Such a promotion may encourage a consumer to purchase the card issuer's card or encourage the consumer to purchase the card issuer's card rather than a competitor's card. Alternatively, the vendor selling the card could run a promotion in which cards purchased during a specified period of time receive an additional value added to the purchase amount of the stored value card. The vendor selling the card may not be related to the card issuer. However, by running such a promotion, the vendor selling stored value cards may encourage a consumer to purchase the stored value card from them rather than another vendor. The value added to the stored value card in excess of the purchase amount of the stored value card may be a monetary amount. For example, a $25 gift card purchased for $25 may be activated for $30—$25 purchase amount plus a $5 value added award. Thus, the gift card may be used to purchase items totaling $30 even though the consumer only paid $25 for the gift card. However, the value added to the card need not be a monetary amount, but could be an award of a specific product or service. For example, the value added could be an electronic coupon for a free product or service if the stored value card is redeemed for a specified product or service or is redeemed during a specified period of time or is redeemed with a specified merchant. Furthermore, the value added, whether it be a monetary amount or for a specific product or service, may have an expiration date that is different from the purchased amount of the stored value card. Also, the value added, may be tied to other specific redemption criteria that are different from the redemption criteria of the purchase amount of the stored value card. For example, the value added portion of the stored value card may be required to be redeemed at a specific location(s), specific merchant(s), a specific time(s), or credited toward the purchase of a specific product(s) or service(s) while the remaining portion of the stored value card may have no limitations on redemption or have different limitations on redemption.

For a redemption request, the value added determination component 153 compares the information received in the redemption request to information in the datastore 180 to determine if any of the criteria for adding additional value to the stored value card to be redeemed are met. Depending on the type of value added award specified by the card issuer or redeeming merchant, the value added, if a monetary amount, could be subtracted from the redemption amount requested or, alternatively, could be added to the account associated with the stored value card to be redeemed at a later time during a separate transaction.

The message modification component 154 modifies the messages 106 and 110 to add value added information into the messages. For example, if it is determined by the value added determination component 153 that a stored value card to be activated is eligible for a value added bonus, the activation message 106 received from the point of sale component 111 is modified by the message modification component 154 to include the determined value added bonus and is then forwarded as message 109 to the appropriate card issuers' authorization system 160 for authorizing the activation request for the amount specified in the activation request plus the value added bonus. As another example, if it is determined that the stored value card is eligible to be purchased at a discount, the activation message 106 received from the point of sale component 111 is modified by the message modification component 154 (and forwarded as message 109) to indicate to the appropriate card issuers' authorization system 160 that the stored value card to be activated will be activated for one amount, but that the customer will be charged a lesser amount reflecting the discount associated with the stored value card.

The message modification component 154 also modifies messages 110 from the card issuers' authorization systems 160 intended for the point of sale component 111 to include any information regarding value added to the stored value card that may be printed on the receipt generated for the customer as well as information that may be presented to a cashier on a terminal 101 or 104 that the cashier may communicate to the customer, and such modified messages are forwarded as messages 107 to the point of sale component 111.

The reconciliation component 155 reconciles the accounts of various card issuers, selling vendors, and/or redeeming merchants, to credit and debit appropriate merchants, vendors, the stored value card transaction system administrator, and card issuers with the value of various transactions to reflect which entities received value from which other entities. For example, if a vendor A sells a stored value card issued by card issuer B for a specified amount and receives payment from a customer, then an account associated with the stored value card is credited with the payment amount, the selling vendor receives a percentage (e.g., retains a percentage) of the purchase amount and/or a predetermined amount, the stored value card system administrator receives a percentage of the purchase amount and/or predetermined amount, and the card issuer receives the remainder. If a stored value card issued by card issuer Y is redeemed at merchant X to purchase items, then the amount redeemed is debited to the card issuer Y and credited to the merchant X, sometimes minus a transaction fee collected by the card issuer and/or a transaction fee collected by the stored value card transaction system administrator.

Authorization component 157 is utilized when the stored value card transaction computer 150 is also the authorizing system such that the stored value card transaction computer 150 authorizes activation, deactivation, and redemption requests rather than transmitting the request to the card issuers' authorization systems 160 for authorization. When the authorization component 157 is utilized, the stored value card transaction computer 150 may transmit details of transactions to the card issuers' authorization systems rather than authorization requests. Also, in some embodiments, the card issuer, the authorizing system, and the transaction computer are part of the same entity and, in such an embodiment, there would be no a card issuers' authorization systems 160 or the card issuers' authorization systems 160 would be under common control with the other components of the stored value card transaction computer 150 (for example, a commonly owned and operated computing system, that may be centralized (e.g., part of a centralized data center) and/or distributed within a commonly owned or controlled system or network). Furthermore, it should be noted that although components associated with the stored value card transaction computer 150 (e.g., components 152-157) are depicted as various components within a single data processing system for illustration and conceptual purposes, one or more of components 152-157 could be implemented on separate computers, systems, or servers in a distributed data processing environment.

Figure 2A:
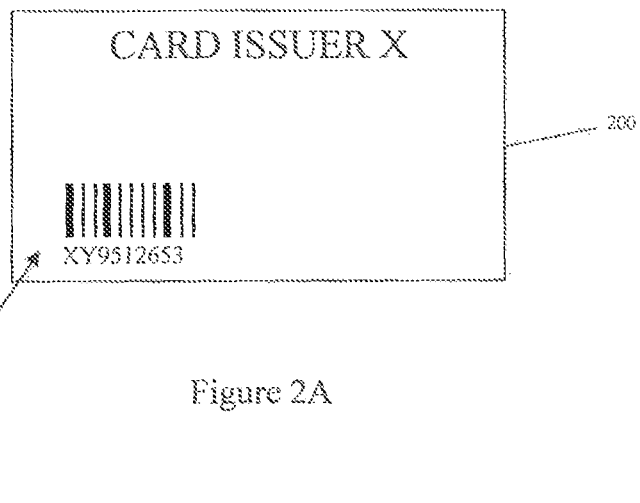
FIGS. 2A and 2B are front perspective views of representative individual stored value cards.
Figure 2B:
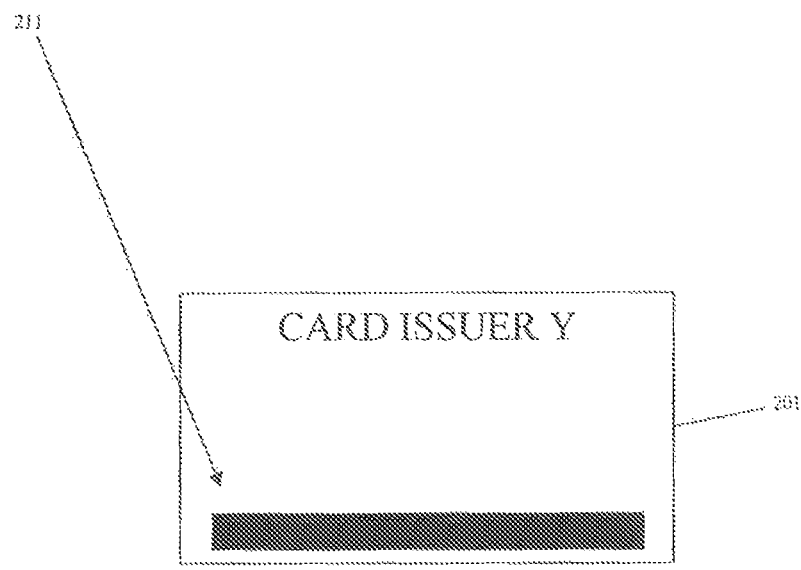

Examples of stored value cards are depicted in FIGS. 2A and 2B. FIG. 2A depicts a stored value card 200 in which the identification 211 is encoded on the card 200 by means of a bar code capable of being read by an optical scanner. FIG. 2B depicts a stored value card 201 in which the card identification 211 is encoded on a magnetic strip located on the card 201. In some embodiments, the stored value card may have a magnetic strip and a bar code (or a plurality of magnetic strips and/or bar codes), and one or more of such may contain the identification 211. The stored value cards 200, 201 are fabricated from a suitable first material, such as plastic, paper, a plastic-coated paper, laminates, or combinations thereof. The stored value cards 200, 201 are typically made in a thickness range of from about 0.005 to about 0.040 inch. The stored value cards 200, 201 each bear an identifier 211. The stored value card identifier 211 is unique to the stored value card and associates the stored value card to a unique account maintained by the card issuer. The stored value card identifier 211 may be encoded in a bar code as depicted in FIG. 2A on stored value card 200, a magnetic strip as depicted in FIG. 2B on stored value card 201, a series of numerals, a series of letters, or a combination thereof. The stored value cards 200, 201 may also be fashioned with personal identification numbers, or PINS, to be entered during the course of the transaction, that correspond to the particular stored value card identifier 211 and allows access and/or use of the stored value card account. The PIN may be encoded in a bar code, a magnetic strip, a series of numeral, a series of letters, or a combination thereof. The PIN may be obscured from view by packaging, by an obscuring material such as a scratch-off strip or peel-off label, or combinations thereof. In some embodiments, the stored value card may comprise a card security code (CSC), a card verification value (CVV or CV2), a card verification value code (CVVC), card verification code (CVC), verification code (V-code or V code), card code verification (CCV), credit card ID (CCID), or combinations thereof.

FIG. 2B depicts a stored value card 201 in which the card identification 211 is encoded on a magnetic strip located on the card 201. The magnetic strip may be made conventional construction, such as one deposited from a slurry, positioned on the card 201 so that it can be scanned in well-known magnetic strip reading equipment. A terminal such as a Tranz 380 made by Verifone is suitable in this application. For additional security, the card identification 211 may also be subjected to an encryption algorithm, many of which are well-known in the art, prior to encoding on the magnetic strip.

In an embodiment of the stored value card identifier 211, the stored value card 200 comprises a bar code of conventional construction, such as a UPC code (e.g., a GS1-128 or UCC/EAN-128), positioned on the stored value card 201 so that it can be scanned by well-known bar code reading equipment. Encoded in the bar code on the stored value card is a representation of the stored value card identifier 211.

In other embodiments of the stored value card identifier, radio frequency identification (RFID) tags, microprocessors, and/or microchips may be placed on the stored value card 200 and 201 to be interpreted by specifically configured devices. The RFID tags, microprocessors, and/or microchips may be used in addition to or in place of the bar code 255 on stored value card 200 and magnetic strip 256 on stored value card 201, or may be used in combination with these or other means of encoding the stored value card identifier on the stored value card.

In further embodiments, series of numerals, series of letters, or combinations thereof, may be placed on the stored value cards 200 and 201 to be read or interpreted by a human or a device, i.e. optical character recognition device, configured to interpret a series of shapes corresponding to the package identifier.

Figure 3A:
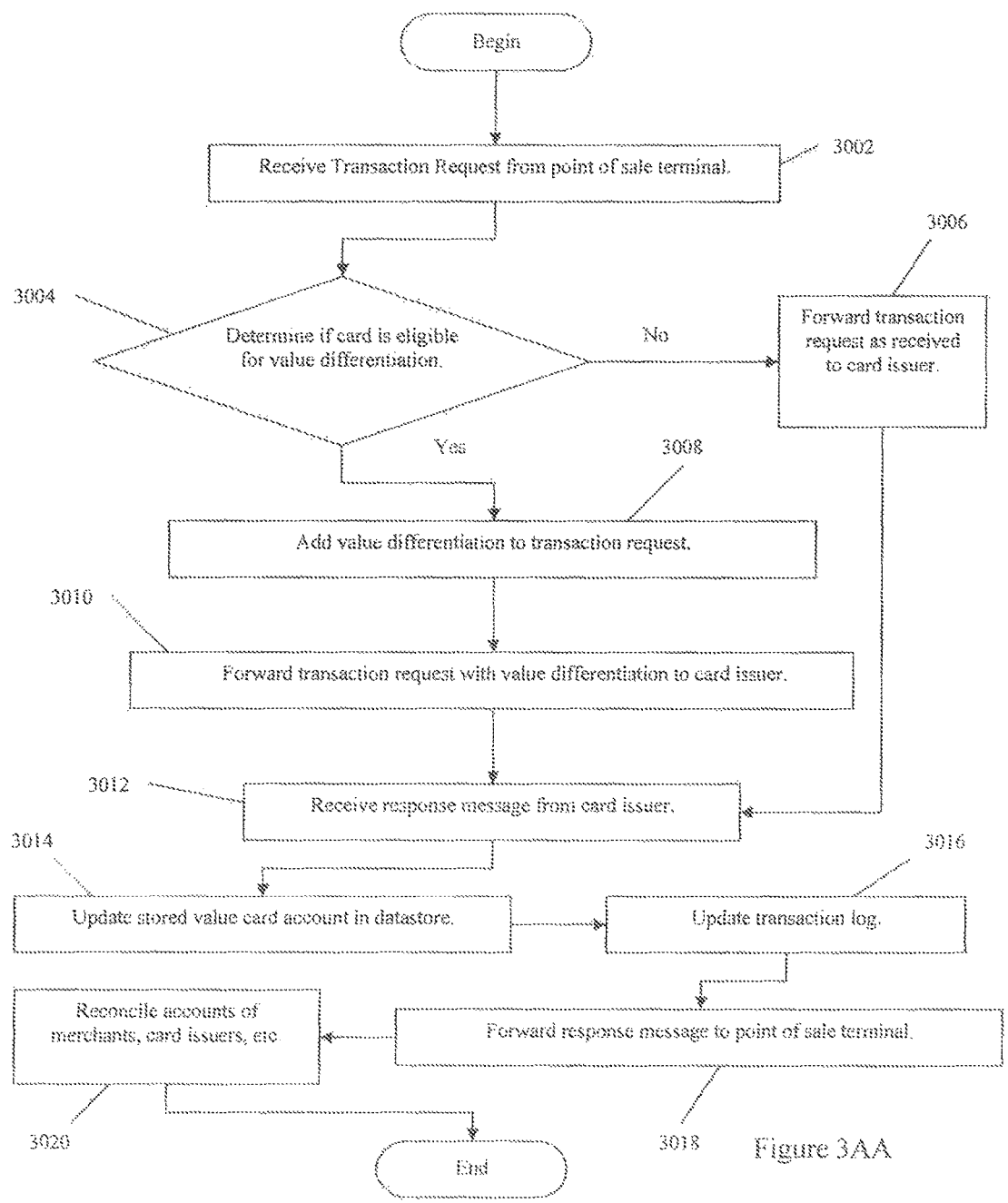
FIG. 3AA is a flowchart depicting an exemplary process utilized by a stored value card transaction computer for processing a stored value card with value differentiation.

An exemplary process utilized by a stored value card transaction computer 150 for activating a stored value card with a value differentiation in accordance with one embodiment of the present invention is depicted in FIG. 3AA. To begin, in block 3002, the stored value card transaction computer 150 receives a transaction request from a point of sale terminal. The transaction request comprises one or more of the following: (a) identity of the terminal, (b) the identity of the stored value card, (c) a request for activation of the stored value card, (d) a request for redemption of the stored value card, (e) an amount of the card activation, (f) an amount of the card redemption, (g) the identity of the stored value card issuer, (h) the identity of the activating vendor, (i) the identity of the requesting location, (j) the time of the transaction request, (k) the date of the transaction request, and (l) any combination thereof. The transaction request may comprise other information in addition to or in place of the above enumerated items. Using information contained within the transaction request received form the point of sale component 111 and on information obtained from datastore 180, in block 3004, the stored value card transaction computer 150 determines whether the card to be transacted is eligible for value differentiation. The value differentiation may be an additional monetary value credited to an account associated with the stored value card (e.g., a monetary redemption value amount) in excess of the purchase price of the stored value card, an award of a specific product(s) or service(s) to the purchaser or redeemer of the stored value card (e.g., a non-monetary redemption value), a discount on the purchase price of the stored value card, or combinations thereof. The value differentiation portion of the transaction may have conditions of use that are different from the primary purchased amount of the stored value card. For example, the value differentiation amount/offering may have an expiration date or specified dates of use that are different from any expiration dates associated with the primary stored value card. Furthermore, the value differentiation amount/offering may specify specific merchants, locations, and/or products that the value differentiation amount/offering may be utilized with which may be different from any conditions associated with the primary purchased amount of the stored value card.

If the stored value card is not eligible for value differentiation, then in block 3006, the stored value card transaction computer 150 forwards the transaction request as received from the point of sale component 111 to the appropriate one of the card issuers' authorization systems 160 without modifying the request to include value differentiation. The transaction request, however, may be modified for other reasons unrelated to the value differentiation decision prior to forwarding to the appropriate one of the card issuers' authorization systems 160. The method proceeds to block 3012 as described in more detail below.

If the stored value card is eligible for value differentiation, then in block 3008, the stored value card transaction computer 150 modifies the transaction request to add the value differentiation amount/offering to the transaction request. In block 3010, the stored value card transaction computer 150 then forwards the modified transaction request with the value differentiation to the appropriate one of the card issuers' authorization systems 160, which receives the modified transaction request and acts upon same, for example authorizing and/or processing the request to activate or redeem the card along with the appropriate value differentiation amount/offering and updating a datastore accordingly. The card issuers' authorization systems 160 sends a response message back to the stored value card transaction computer 150. In an alternative embodiment where the stored value card transaction computer 150 performs the functions of the card issuers' authorization systems 160, the method may proceed directly from block 3004 or 3008 to block 3014.

The stored value card transaction computer 150 receives the response message from the appropriate one of the card issuers' authorization systems 160 in block 3012. At block 3014, the stored value card transaction computer 150 optionally updates an account associated with the stored value card in the datastore to reflect the concomitant changes in the status of the stored value card. For example, the datastore is updated to include any value differentiation amount/offering associated with the stored value card and the conditions for redeeming the stored value card's principal balance as well as for redeeming the value differentiation amount/offereing, if any. In an alternative embodiment, such updates are performed additionally or alternatively by the card issuer's authorization systems 160 and stored in a datastore associated therewith. A transaction log 170 may be updated by the stored value card transaction computer 150 in block 3016 to record the details about the transaction. The account information to be stored in the datastore 180 (or alternatively or additionally in a datastore associated with the card issuer's authorization systems 160) as well as the details of the transaction recorded in the transaction log may include (a) the time and date of the transaction, (b) whether the stored value card was activated, (c) the reason the stored value card was not activated if the activation request was denied, (d) the amount credited to the stored value card account when activated, (e) conditions associated with redeeming the stored value card, (f) the type and amount of any value differentiation, (g) the conditions for redeeming the value differentiation amount/offering, (h) the identity of the activating vendor, (i) the identity of the card issuer, (j) the location of the activating vendor, (k) the identity of the terminal activating the stored value card, (l) the identity of the entity granting the value differentiation amount/offering, (m) the identity of the account to be debited for the value differentiation amount/offering, (n) the requested redemption amount, (o) the reason the stored value card was not redeemed if the transaction request was denied, (p) the amount debited from the stored value card account when redeemed, (q) the identity of the redeeming merchant vendor, (r) the location of the redeeming merchant, (s) the identity of the terminal redeeming the stored value card, and (t) any combination thereof. The transaction log may include other information in addition to or in place of the items enumerated above.

The stored value card transaction computer 150, in block 3018, then forwards the response message to the point of sale component 111. The stored value card transaction computer 150, prior to forwarding the response message to the point of sale component 111, may modify the response message as necessary to include information that may be printed on a receipt for the customer and/or presented on a display to the store clerk operating the point of sale component 111. At block 3020, the stored value card transaction computer 150 reconciles the accounts of the various vendors, merchants, card issuers, the stored value card transaction system administrator, and other entities involved with issuing, selling, redeeming, and marketing the stored value card to debit and credit appropriate accounts and, in some embodiments, initiate funds transfers between appropriate bank accounts belonging to the various entities. Alternatively, reconciliation of accounts may be performed periodically (e.g., daily, weekly, monthly, etc.) rather than after each transaction. In such an embodiment, the information from the transaction log 170 may be utilized to reconcile the various entities involved with the sale or redemption of various stored value cards thus requiring fewer funds transfers to be initiated. In various embodiments, the sequence of events depicted in blocks 3014, 3016, 3018, and 3020 may be varied, and thus may be carried out in any desired order, sequentially or simultaneously. Moreover, the requested transaction may involve multiple stored value cards and multiple value differentiators. In such an scenario, the transaction process proceeds as described above, however the transaction request will comprise multiple sets of transaction information, i.e., information such: (a) identity of the terminal, (b) the identity of the stored value card, (c) a request for activation of the stored value card, (d) a request for redemption of the stored value card, (e) an amount of the card activation, (f) an amount of the card redemption, (g) the identity of the stored value card issuer, (h) the identity of the activating vendor, (i) the identity of the requesting location, (j) the time of the transaction request, (k) the date of the transaction request, and (l) any combination thereof, for each of the multiple of stored value cards comprising the instant transaction request. Further, in the multiple stored value card transaction scenario, any activation amount, redemption amount, or value differentiation amount/offering may be allocated across the multiple stored value cards equally or disproportionately as desired by any of the card transaction interested parties and/or card purchasers/redeemers.

An exemplary process utilized by a stored value card transaction computer 150 for activating a stored value card with a value added bonus in accordance with one embodiment of the present invention is depicted in FIG. 3A. To begin, in block 302, the stored value card transaction computer 150 receives an activation request from a point of sale terminal. The activation request comprises one or more of the following: (a) identity of the terminal, (b) the identity of the stored value card to be activated, (c) the amount of the card activation, (d) the identity of the stored value card issuer, (e) the identity of the activating vendor, (f) the identity of the activating location, (g) the time of the activation request, (h) the date of the activating request, and (i) any combination thereof. The activation request may comprise other information in addition to or in place of the above enumerated items. Using information contained within the activation request received form the point of sale component 111 and on information obtained from datastore 180, in block 304, the stored value card transaction computer 150 determines whether the card to be activated is eligible for a value added bonus. The value added bonus may be an additional monetary value credited to an account associated with the stored value card to be activated, an award of a specific product(s) or service(s), or a discount on the purchase price of the stored value card. The value added portion of the activation may have conditions of use that are different from the primary purchased amount of the stored value card. For example, the value added bonus may have an expiration date or specified dates of use that are different from any expiration dates associated with the primary stored value card. Furthermore, the value added bonus may specify specific merchants, locations, and/or products that the value added bonus may be utilized with which may be different from any conditions associated with the primary purchased amount of the stored value card.

If the stored value card is not eligible for a value added bonus, then in block 306, the stored value card transaction computer 150 forwards the activation request as received from the point of sale component 111 to the appropriate one of the card issuers' authorization systems 160 without modifying the request to include a value added bonus. The activation request, however, may be modified for other reasons unrelated to the value added bonus decision prior to forwarding to the appropriate one of the card issuers' authorization systems 160. The method proceeds to block 312 as described in more detail below.

If the stored value card is eligible for a value added bonus, then in block 308, the stored value card transaction computer 150 modifies the activation request to add the additional value added bonus to the activation request. In block 310, the stored value card transaction computer 150 then forwards the modified activation request with the value added bonus to the appropriate one of the card issuers' authorization systems 160, which receives the modified activation request and acts upon same, for example authorizing and/or processing the request to activate the card along with the appropriate value added bonus and updating a datastore accordingly. The card issuers' authorization systems 160 sends a response message back to the stored value card transaction computer 150. In an alternative embodiment where the stored value card transaction computer 150 performs the functions of the card issuers' authorization systems 160, the method may proceed directly from block 304 or 308 to block 314.

The stored value card transaction computer 150 receives the activation message from the appropriate one of the card issuers' authorization systems 160 in block 312. At block 314, the stored value card transaction computer 150 optionally updates an account associated with the stored value card in the datastore to reflect that the stored value card is activated and the amount for which the stored value card is activated. Additionally, the datastore is updated to include any value added bonus awarded to the stored value card and the conditions for redeeming the stored value card's principal balance as well as for redeeming the value added bonus, if any. In an alternative embodiment, such updates are performed additionally or alternatively by the card issuer's authorization systems 160 and stored in a datastore associated therewith. A transaction log 170 may be updated by the stored value card transaction computer 150 in block 316 to record the details about the activation transaction. The account information to be stored in the datastore 180 (or alternatively or additionally in a datastore associated with the card issuer's authorization systems 160) as well as the details of the transaction recorded in the transaction log may include (a) the time and date of the activation, (b) whether the stored value card was activated, (c) the reason the stored value card was not activated if the activation request was denied, (d) the amount credited to the stored value card account when activated, (e) conditions associated with redeeming the stored value card, (f) the type and amount of any value added bonus, (g) the conditions for redeeming the value added bonus, (h) the identity of the activating vendor, (i) the identity of the card issuer, (j) the location of the activating vendor, (k) the identity of the terminal activating the stored value card, (l) the identity of the entity granting the value added bonus, (m) the identity of the account to be debited for the value added bonus, and (n) any combination thereof. The transaction log may include other information in addition to or in place of the items enumerated above.

The stored value card transaction computer 150, in block 318, then forwards the activation message to the point of sale component 111. The stored value card transaction computer 150, prior to forwarding the activation message to the point of sale component 111, may modify the activation message as necessary to include information that may be printed on a receipt for the customer and/or presented on a display to the store clerk operating the point of sale component 111. At block 320, the stored value card transaction computer 150 reconciles the accounts of the various vendors, merchants, card issuers, the stored value card transaction system administrator, and other entities involved with issuing, selling, and marketing the stored value card to debit and credit appropriate accounts and, in some embodiments, initiate funds transfers between appropriate bank accounts belonging to the various entities. Alternatively, reconciliation of accounts may be performed periodically (e.g., daily, weekly, monthly, etc.) rather than after each transaction. In such an embodiment, the information from the transaction log 170 may be utilized to reconcile the various entities involved with the sale or redemption of various stored value cards thus requiring fewer funds transfers to be initiated. In various embodiments, the sequence of events depicted in blocks 314, 316, 318, and 320 may be varied, and thus may be carried out in any desired order, sequentially or simultaneously. Moreover, the requested transaction may involve multiple stored value cards and multiple value added awards. In such an scenario, the transaction process proceeds as described above, however the transaction request will comprise multiple sets of transaction information, i.e., information such: (a) identity of the terminal, (b) the identity of the stored value card, (c) a request for activation of the stored value card, (d) a request for redemption of the stored value card, (e) an amount of the card activation, (f) an amount of the card redemption, (g) the identity of the stored value card issuer, (h) the identity of the activating vendor, (i) the identity of the requesting location, (j) the time of the transaction request, (k) the date of the transaction request, and (l) any combination thereof, for each of the multiple of stored value cards comprising the instant transaction request. Further, in the multiple stored value card transaction scenario, any activation amount, redemption amount, or value added awards may be allocated across the multiple stored value cards equally or disproportionately as desired by any of the card transaction interested parties and/or card purchasers/redeemers.

An exemplary process utilized by a stored value card transaction computer for activating a stored value card with a value added bonus in accordance with another embodiment of the present invention is depicted in FIG. 3B. In the example depicted in FIG. 3B, the stored value card transaction computer 150 also serves to authorize activation. The process begins in block 352 with the receipt of an activation request by the stored value card transaction computer 150 from the point of sale component 111. In block 354, the stored value card transaction computer 150 determines whether to activate the card based on the information contained in the activation request as compared to information stored in datastore 180. If the stored value card transaction computer 150 determines that the activation is denied, an activation denied (or rejected) response message is generated in block 356. The activation denied response is then transmitted to the point of sale component 111 in block 366 and the datastore and transaction log are updated to reflect the details of the transaction in block 368. The stored value card transaction computer 150 then notifies the card issuer of the details of the transaction in block 370 and, if necessary, reconciles the various accounts among the appropriate vendors, merchants, card issuers, stored value card transaction system administrator, and other entities involved in block 372.

If the stored value card transaction computer 150 determines that the card should be activated based upon the information received in the activation request, then the stored value card transaction computer 150 determines whether the card is eligible for a value added bonus in block 358. If the card is not eligible for a value added bonus, then, in block 360, the stored value card transaction computer 150 generates an activation approval response message and transmits this activation approval message back to the point of sale component 111 in block 366. The account associated with the stored data card in the datastore and the transaction log are updated by the stored value card transaction computer 150 in block 368 and the card issuer is notified of the transaction details in block 370. At block 370, the stored value card transaction computer 150 reconciles the various accounts among the appropriate vendors, merchants, card issuers, stored value card transaction system administrator, and other entities involved with issuing, selling, and marketing the stored value card to debit and credit appropriate accounts and, in some embodiments, initiate funds transfers between appropriate bank accounts. Alternatively, reconciliation of accounts may be performed periodically (e.g., daily, weekly, monthly, etc.) rather than after each transaction. In such an embodiment, the information from the transaction log 170 may be utilized to reconcile the various entities involved with the sale or redemption of various stored value cards thus requiring fewer funds transfers to be initiated.

If the stored value card transaction computer 150 determines in block 358 that the stored value card is eligible for a value added bonus, then the appropriate bonus is determined in block 362. An activation approval message including the value added bonus information is generated in block 364. The activation approval message may include information to be printed onto the customer's receipt at the point of sale component 111 that provides the details of the value added bonus that has been added to the stored value card and the redemption details for redeeming the value added bonus. The activation approval response is then transmitted to the point of sale component 111 by the stored value card transaction computer 150 in block 366. In block 368, the account associated with the stored value card that has been activated is updated in datastore 180 as well as the transaction log is updated to reflect the details of the transaction. The account information to be stored in the datastore 180 as well as the details of the transaction recorded in the transaction log may include (a) the time and date of the activation, (b) whether the stored value card was activated, (c) the reason the stored value card was not activated if the activation request was denied, (d) the amount credited to the stored value card account when activated, (e) conditions associated with redeeming the stored value card, (f) the type and amount of any value added bonus, (g) the conditions for redeeming the value added bonus, (h) the identity of the activating vendor, (i) the identity of the card issuer, (j) the location of the activating vendor, (k) the identity of the terminal activating the stored value card, (l) the identity of the entity granting the value added bonus, (m) the identity of the account to be debited for the value added bonus, and (n) any combination thereof. The account associated with the stored value card and the transaction log may include other information in addition to or in place of the items enumerated above. In various embodiments, the sequence of events depicted in blocks 366, 368, 370, and 372 may be varied, and thus may be carried out in any desired order, sequentially or simultaneously.

Figure 4A:
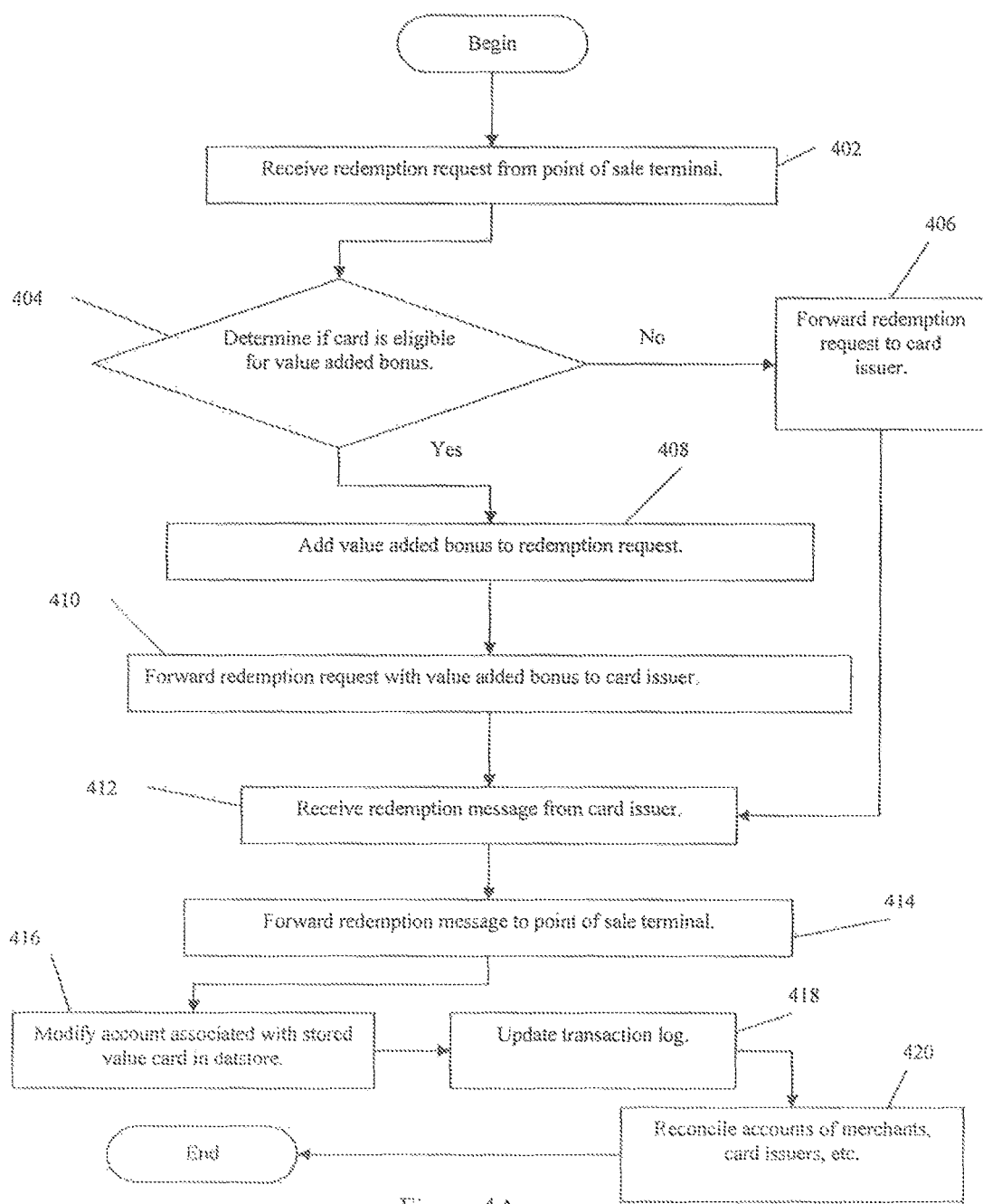
FIGS. 4A and 4B are flowcharts depicting exemplary processes utilized by a stored value card transaction computer for redeeming a stored value card and awarding a value added bonus during the redemption process.

An exemplary process utilized by a stored value card transaction computer for adding a value added bonus to a stored value card during a redemption request in accordance with one embodiment of the present invention is depicted in FIG. 4A. To begin, in block 402, the stored value card transaction computer 150 receives a redemption request from a point of sale component 111. The redemption request includes at least one of the following items of information: (a) an amount to be deducted from the stored value card toward the purchase, (b) an identity of the redeeming terminal, (c) an identity of the redeeming merchant, (d) an identity of the location of the redeeming merchant, (e) an indication of the identity of the item(s) to be purchased with the stored value card, (f) a stored value card identification, (g) the identity of the stored value card issuer, (h) the date of the redemption request, (i) the time of the redemption request, and (j) any combination thereof. Using the information contained in the redemption request as well as information obtained from datastore 180, the stored value card transaction computer 150, in block 404, determines whether the stored value card is eligible for a value added bonus. The value added bonus may be an award of additional cash value to be added to the stored value card, a reduction in the amount to be debited to the account associated with the stored value card, and/or an award of a specific product (s) or service(s).

If the card is not eligible for a value added bonus, then in block 406, the stored value card transaction computer 150 forwards the redemption request (e.g., forwards an unmodified redemption request) to the appropriate card issuers' authorization system 160 for authorization to redeem the card. The redemption request, however, may be modified for other reasons unrelated to the value added bonus decision prior to forwarding to the appropriate one of the card issuers' authorization systems 160. The method proceeds to block 412 as described in more detail below.

If the stored value card is eligible for a value added bonus, then in block 408, the stored value card transaction computer 150 modifies the redemption request to add the additional value added bonus to the redemption request. In block 410, the stored value card transaction computer 150 then forwards the modified redemption request with the value added bonus to the appropriate one of the card issuers' authorization systems 160, which receives the modified redemption request and acts upon same, for example authorizing and/or processing the request to redeem the card along with the appropriate value added bonus and updating a datastore accordingly. The card issuers' authorization systems 160 sends a response message back to the stored value card transaction computer 150. In an alternative embodiment where the stored value card transaction computer 150 performs the functions of the card issuers' authorization systems 160, the method may proceed directly from block 404 or 408 to block 414.

The stored value card transaction computer 150 then receives a redemption message from the card issuer either authorizing redemption or denying redemption in block 412. The redemption message is then forwarded to the point of sale component 111 by the stored value card transaction computer 150 in block 414. The stored value card transaction computer 150, prior to forwarding the redemption message to the point of sale component 111, may modify the redemption message as necessary to include information that may be printed on a receipt for the customer and/or presented on a display to the store clerk operating the point of sale component 111. At block 416, the stored value card transaction computer 150 optionally updates an account in datastore 180 associated with the stored value card to be redeemed to include the details of the redemption approval or denial. In an alternative embodiment, such account updates are performed additionally or alternatively by the card issuer's authorization systems 160 and stored in a datastore associated therewith. The transaction log is also updated to include appropriate details in block 418. The account information to be stored in the datastore 180 as well as the details of the transaction recorded in the transaction log may include (a) the time and date of the redemption, (b) whether the stored value card was redeemed, (c) the reason the stored value card was not redeemed if the redemption request was denied, (d) the amount debited to the stored value card account when redeemed, (e) conditions associated with redeeming the stored value card, (f) the type and amount of any value added bonus, (g) the conditions for redeeming the value added bonus, (h) the identity of the redeeming merchant, (i) the identity of the card issuer, (j) the location of the redeeming merchant, (k) the identity of the terminal redeeming the stored value card, (l) the identity of the entity granting the value added bonus, (m) the identity of the account to be debited for the value added bonus, and (n) any combination thereof. The account associated with the stored value card and the transaction log may include other information in addition to or in place of the items enumerated above. The stored value card transaction computer 150 at block 420 then reconciles the various accounts among the appropriate vendors, merchants, card issuers, stored value card transaction system administrator, and other entities involved in selling, issuing, or redeeming the stored value card (collectively "card transaction interested parties") and may initiate funds transfers between bank accounts belonging to the various vendors, merchants, card issuers, stored value card transaction system administrator, and other involved entities as appropriate. In various embodiments, the sequence of events depicted in blocks 414, 416, 418, and 420 may be varied, and thus may be carried out in any desired order, sequentially or simultaneously.

Figure 4B:
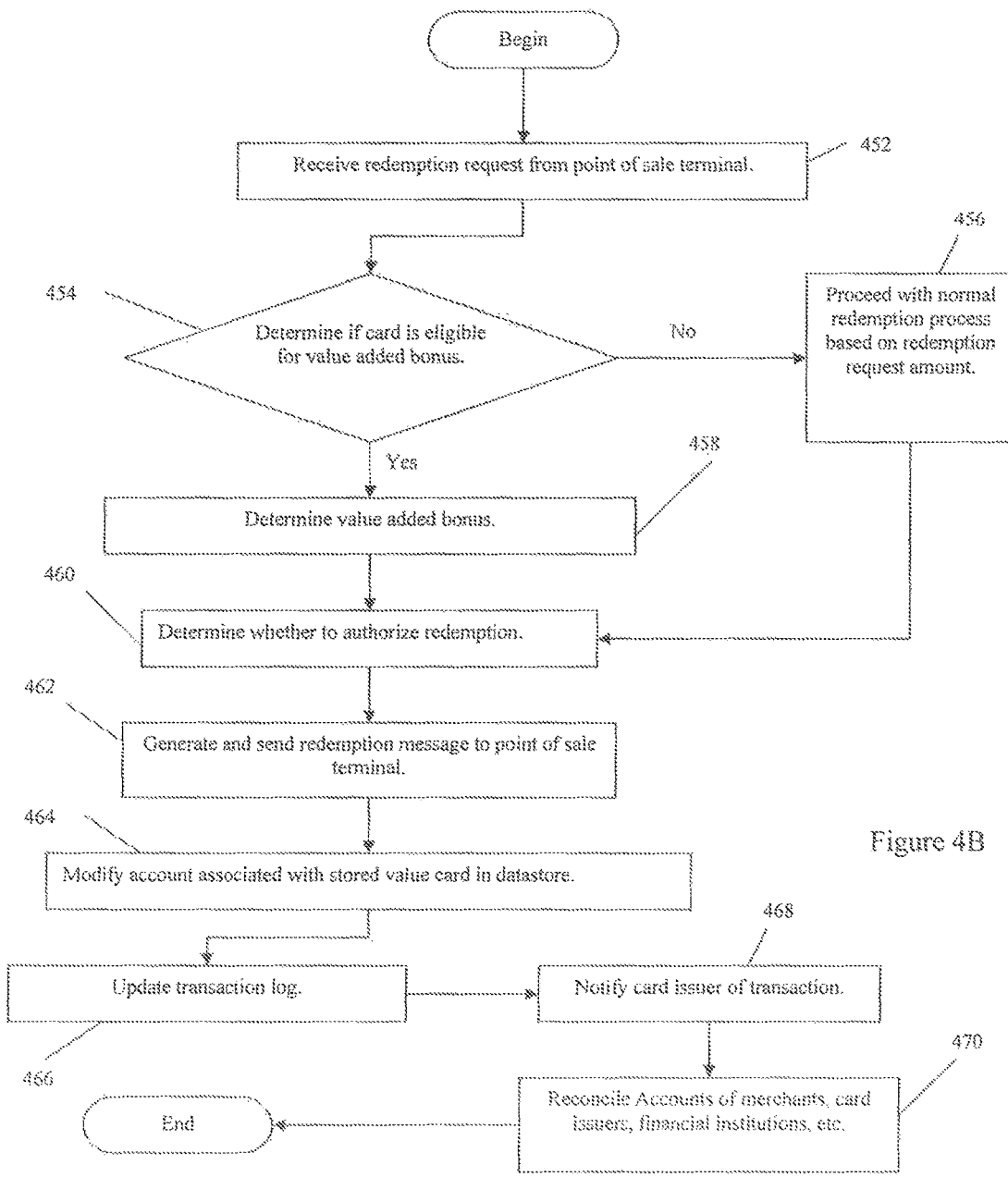

In an alternative embodiment, an exemplary process utilized by a stored value card transaction computer for adding a value added bonus to a stored value card during an activation request in which the stored value card transaction computer also makes the authorization determination in accordance with the method shown in FIG. 4B, with the understanding that each reference to redemption within the method is generally replaced with a corresponding reference to activation.

An exemplary process utilized by a stored value card transaction computer for adding a value added bonus to a stored value card during a redemption request in which the stored value card transaction computer also makes the authorization determination in accordance with another embodiment of the present invention is depicted in FIG. 4B. The process begins in block 452 with the receipt of a redemption request from a point of sale component 111 by the stored value card transaction computer 150. The stored value card transaction computer 150 determines if the card is eligible for a value added bonus in block 454 and, if not, proceeds with a normal redemption process based on the redemption request amount in block 456, followed by block 460. The stored value card transaction computer 150 then determines whether to authorize redemption in the amount requested in block 460 and generates and sends a redemption message to the point of sale terminal either authorizing or denying the redemption request in block 462. The stored value card transaction computer 150 then modifies the account information associated with the stored value card in the datastore 180 to reflect the details of the redemption request and response in block 464. If the redemption request was approved, then the account associated with the stored value card is debited by the amount of the activation request. The stored value card transaction computer 150 notifies the card issuer of the details of the transaction in block 468. In block 470, the stored value card transaction computer 150 reconciles the accounts of the various vendors, merchants, card issuers, stored value card transaction system administrator, financial institutions, and other entities that were involved in the issuing, selling, or redeeming of the stored value card to credit and debit the appropriate accounts. The stored value card transaction computer 150 may initiate funds transfers between bank accounts belonging to the various vendors, merchants, card issuers, stored value card transaction system administrator, and other entities as appropriate.

If the stored value card transaction computer 150 determines that the stored value card is eligible for a value added bonus at block 454, then the stored value card transaction computer 150 determines the specific value added bonus to be applied to the stored value card in block 458. The value added bonus may be an additional monetary value credited to an account associated with the stored value card to be activated, an award of a specific product(s) or service(s), or reduce the amount to be debited to the account associated with the stored value card by a specified amount during the redemption process. For example, if the stored value card is used to purchase items totaling $50, but is eligible for a $5 discount, then the purchase is approved, but the account associated with the stored value card is only debited by $45 rather than the entire $50 of the purchase. Depending on the entity granting the bonus award, the merchant with which the stored value card is used to purchase items may receive the difference between the amount debited from the stored value card and the actual amount of the purchase from the entity granting the bonus award. If the entity granting the bonus award is also the merchant whose product(s) and/or service(s) are being purchased using the stored value card, then the transaction may merely require reconciliation of various accounting books without a transfer of funds between entities.

It should also be noted that the value added portion of the activation may have conditions of use that are different from the primary purchased amount of the stored value card. For example, the value added bonus may have an expiration date or specified dates of use that are different from any expiration dates associated with the primary stored value card. Furthermore, the value added bonus may specify specific merchants, locations, and/or products that the value added bonus may be utilized with which may be different from any conditions associated with the primary purchased amount of the stored value card.

The process then proceeds with determining whether to authorize redemption in block 460, and generating and sending a redemption message to the point of sale component 111 in block 462. The redemption message may include information indicating the amount and/or type of value added bonus that the customer is receiving to be printed on the customer's receipt. The redemption message may also include the conditions associated with redeeming the value added bonus if the value added bonus was not used during the current redemption process. For example, the value added bonus may be a coupon for a free item during a subsequent visit by the customer to the merchant. In block 464, the stored value card transaction computer 150 then modifies the account information associated with the stored value card in datastore 180 to debit the account by the appropriate amount in cases where the transaction was approved and to store other information associated with the transaction. The stored value card transaction computer 150 also updates the transaction log in block 466 with the details of the transaction. The account information to be stored in the datastore 180 as well as the details of the transaction recorded in the transaction log may include (a) the time and date of the redemption, (b) whether the stored value card was redeemed, (c) the reason the stored value card was not redeemed if the redemption request was denied, (d) the amount debited to the stored value card account when redeemed, (e) conditions associated with redeeming the stored value card, (f) the type and amount of any value added bonus, (g) the conditions for redeeming the value added bonus, (h) the identity of the redeeming merchant, (i) the identity of the card issuer, (j) the location of the redeeming merchant, (k) the identity of the terminal redeeming the stored value card, (l) the identity of the entity granting the value added bonus, (m) the identity of the account to be debited for the value added bonus, and (n) any combination thereof. The account associated with the stored value card and the transaction log may include other information in addition to or in place of the items enumerated above. The stored value card transaction computer 150 then reconciles the various accounts among the appropriate vendors, merchants, card issuers, stored value card transaction system administrator, and other entities involved in selling, issuing, or redeeming the stored value card and may initiate funds transfers between bank accounts belonging to the various vendors, merchants, card issuers, stored value card transaction system administrator, and other entities as appropriate in block 470. In various embodiments, the sequence of events depicted in blocks 462, 464, 466, 468, and 470 may be varied, and thus may be carried out in any desired order, sequentially or simultaneously.

In an alternative embodiment, an exemplary process utilized by a stored value card transaction computer for adding a value added bonus to a stored value card during a redemption request in which the stored value card transaction computer also makes the authorization determination in accordance with the method shown in FIG. 3B, with the understanding that each reference to activation within the method is generally replaced with a corresponding reference to redemption.

Figure 5:
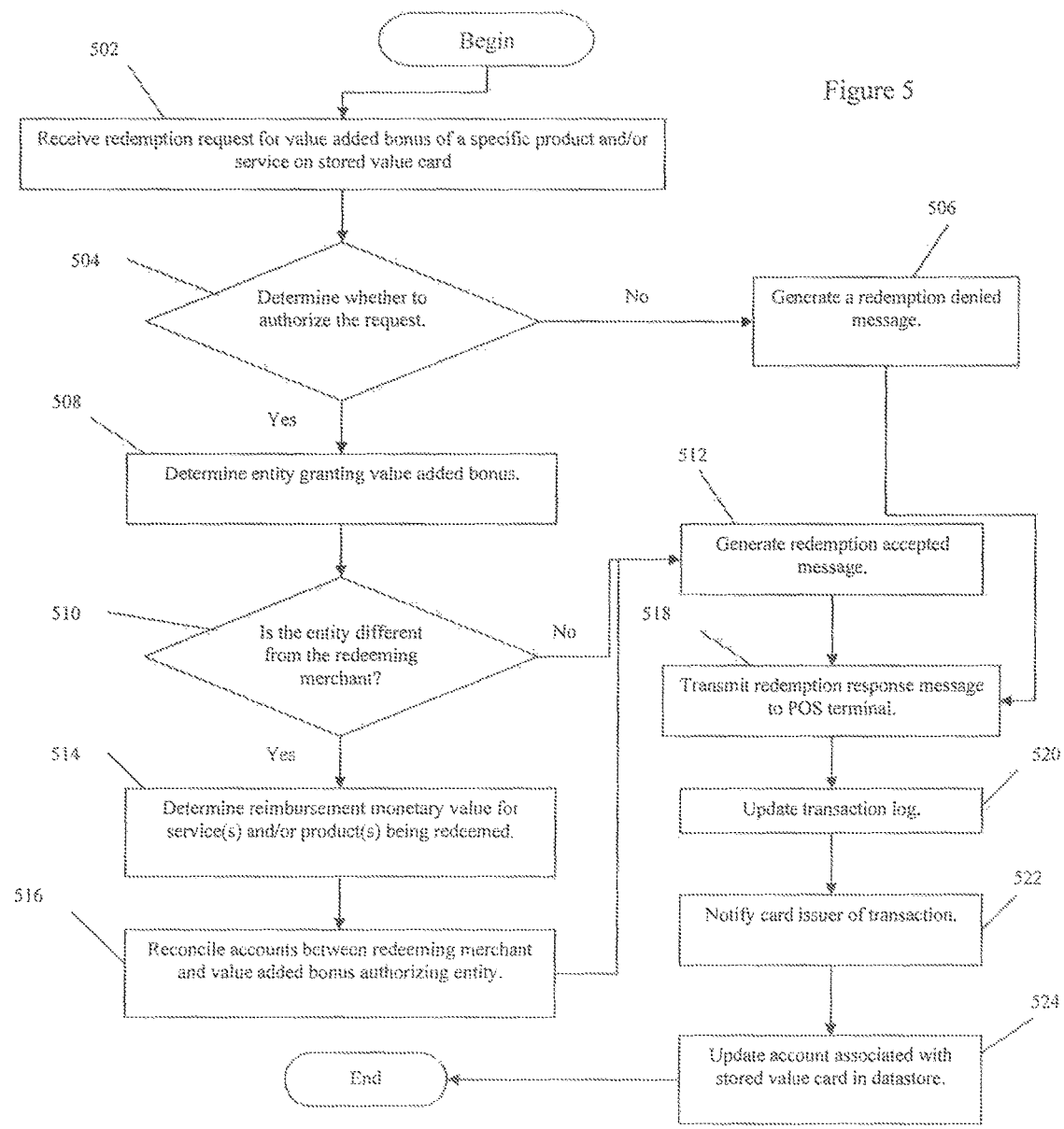
FIG. 5 is a flowchart depicting an exemplary process for redeeming a specific product and/or service that has been awarded to a stored value card.
Figure 6:
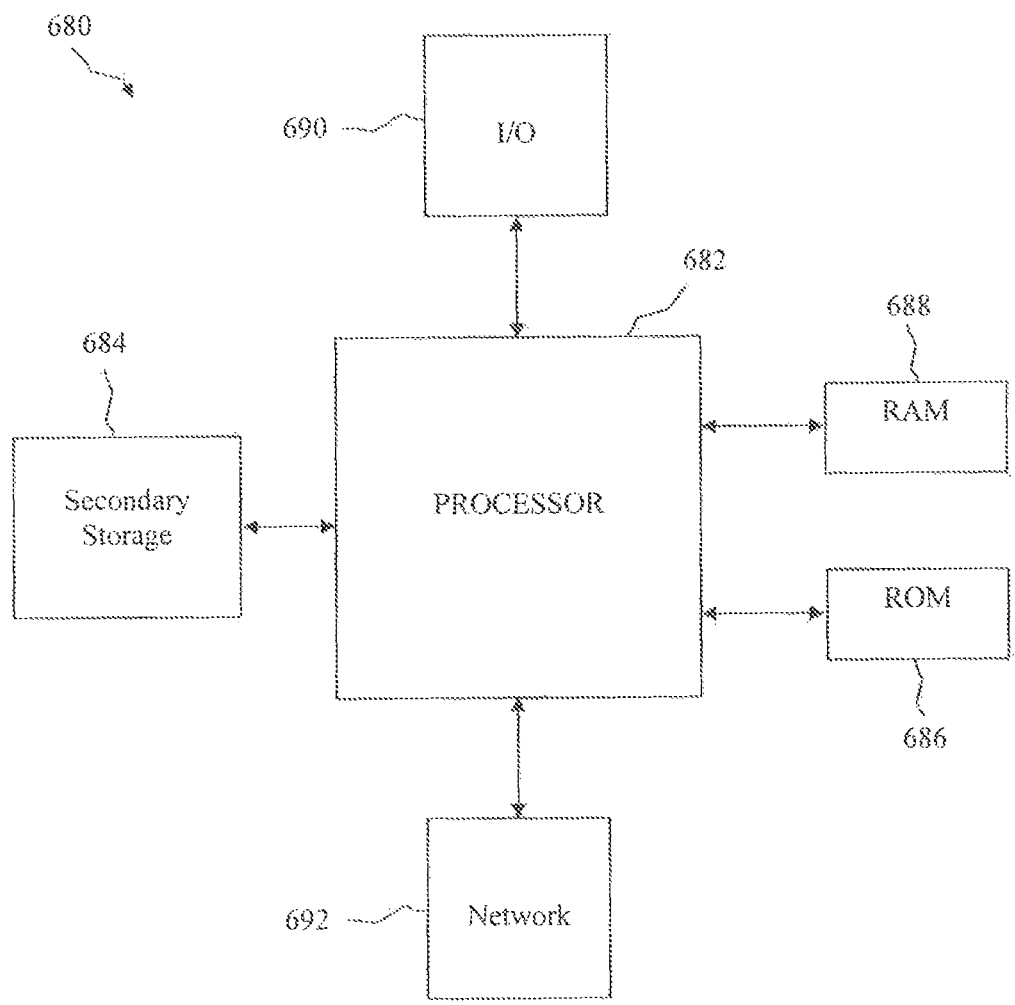
FIG. 6 illustrates an exemplary general purpose computer system suitable for implementing the several embodiments of the disclosure.

An exemplary process utilized by a stored value card transaction computer for redeeming a stored value card for a specific product or service that has been awarded to the stored value card in accordance with one embodiment of the present invention is depicted in FIG. 5. To begin, in block 502, the stored value card transaction computer 150 receives a redemption request for a value added bonus of a specific product and/or service for a stored value card from a point of sale component 111. In block 504, the stored value card transaction computer 150 determines whether to authorize the request. If it is determined that the request should be denied, then the stored value card transaction computer 150 generated a redemption denied message in block 506 and transmits the redemption denied message to the point of sale component 111 in block 518. The redemption denied message may include a reason for denying the redemption request. Reasons for denial of the redemption request may include one or more of: (a) the specific items has already been redeemed previously, (b) the time and/or date that the bonus is attempted to be redeemed fall outside the date and time windows specified for redemption of the bonus, (c) the item attempted to be redeemed using the bonus differs from the item associated with the bonus, (d) the location and/or identity of the merchant does not correspond to the location and/or identity of the merchant required for redemption of the bonus award, (e) the account associated with the stored value card in datastore 180 does not contain the requested bonus award; and (f) any combination thereof. The method continues at block 520 as described in more detail below.

If the stored value card transaction computer 150 determines that the redemption request is to be authorized in block 504, then the stored value transaction computer 150 determines the identity of the entity granting the value added bonus in block 508. The stored value card transaction computer 150 then determines if the entity granting the value added bonus is different from the redeeming merchant in block 510. If the entity granting the value added bonus is the same as the redeeming merchant, the method proceeds to block 512 et seq. as described herein. If the entity granting the value added bonus is different from the redeeming merchant, then the stored value card transaction computer 150 determines a reimbursement monetary value for service(s) and/or product(s) being redeemed with the value added bonus on the stored value card in block 514. The stored value card transaction computer 150 then reconciles the accounts between the redeeming merchant and the value added bonus authorizing entity to credit the redeeming merchant with the monetary amount associated with the redemption and debit the value added bonus authorizing entity in block 516. The stored value card transaction computer 150 may also initiate a transfer of funds between an account associated with the value added bonus authorizing entity and the redeeming merchant for the appropriate amount. Alternatively, funds transfers may be the responsibility of other entities or may be performed periodically (e.g., daily, weekly, monthly) using information from the transaction log in order to minimize the number of funds transfers between entities.

The stored value card transaction computer 150 then generates a redemption accepted message in block 512 and transmits this response message to the point of sale terminal 101, 104 in block 518. The stored value card transaction computer 150 then updates the transaction log with the details of the redemption transaction in block 520, notifies the card issuer of the details of the transaction in block 522, and, in block 524, updates the account associated with the stored value card in the datastore 180 to reflect the details of the transaction and indicate that the specific value added bonus has been redeemed. The account information to be stored in the datastore 180 as well as the details of the transaction recorded in the transaction log may include (a) the time and date of the redemption, (b) whether the stored value card was redeemed, (c) the reason the stored value card was not redeemed if the redemption request was denied, (d) the product(s) and/or services redeemed with the stored value card account when redeemed, (e) the identity of the redeeming merchant, (f) the identity of the entity granting the value added bonus, (g) the identity of the card issuer, (h) the location of the redeeming merchant, (i) the identity of the terminal redeeming the stored value card, (k) the identity of the account to be debited for the value added bonus, and (l) any combination thereof. The account associated with the stored value card and the transaction log may include other information in addition to or in place of the items enumerated above. In various embodiments, the sequence of events depicted in blocks 512, 518, 520, 522, and 524 may be varied, and thus may be carried out in any desired order, sequentially or simultaneously.

In an alternative embodiment, an exemplary process utilized by a stored value card transaction computer for activating a stored value card for a specific product or service that has been awarded to the stored value card in accordance with the method shown in FIG. 5, with the understanding that each reference to redemption within the method is generally replaced with a corresponding reference to activation.

An exemplary process utilized by a stored value card transaction computer for activating a stored value card for a specific product or service that has been awarded to the stored value card in accordance with one embodiment The stored value card transaction computer 150 above may be implemented on any general-purpose computer with sufficient processing power, memory resources, and network throughput capability to handle the necessary workload placed upon it. FIG. 5 illustrates a typical, general-purpose computer system suitable for implementing one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) 590 devices, and network connectivity devices 592. The processor may be implemented as one or more CPU chips.

It is understood that by programming and/or loading executable instructions onto the computer system 580, at least one of the CPU 582, the RAM 588, and the ROM 586 are changed, transforming the computer system 580 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage. The RAM 588 is used to store volatile data and perhaps to store instructions. Access to both ROM 586 and RAM 588 is typically faster than to secondary storage 584.

I/O 590 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 592 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 592 devices may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity 592 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592.

Figure 10:
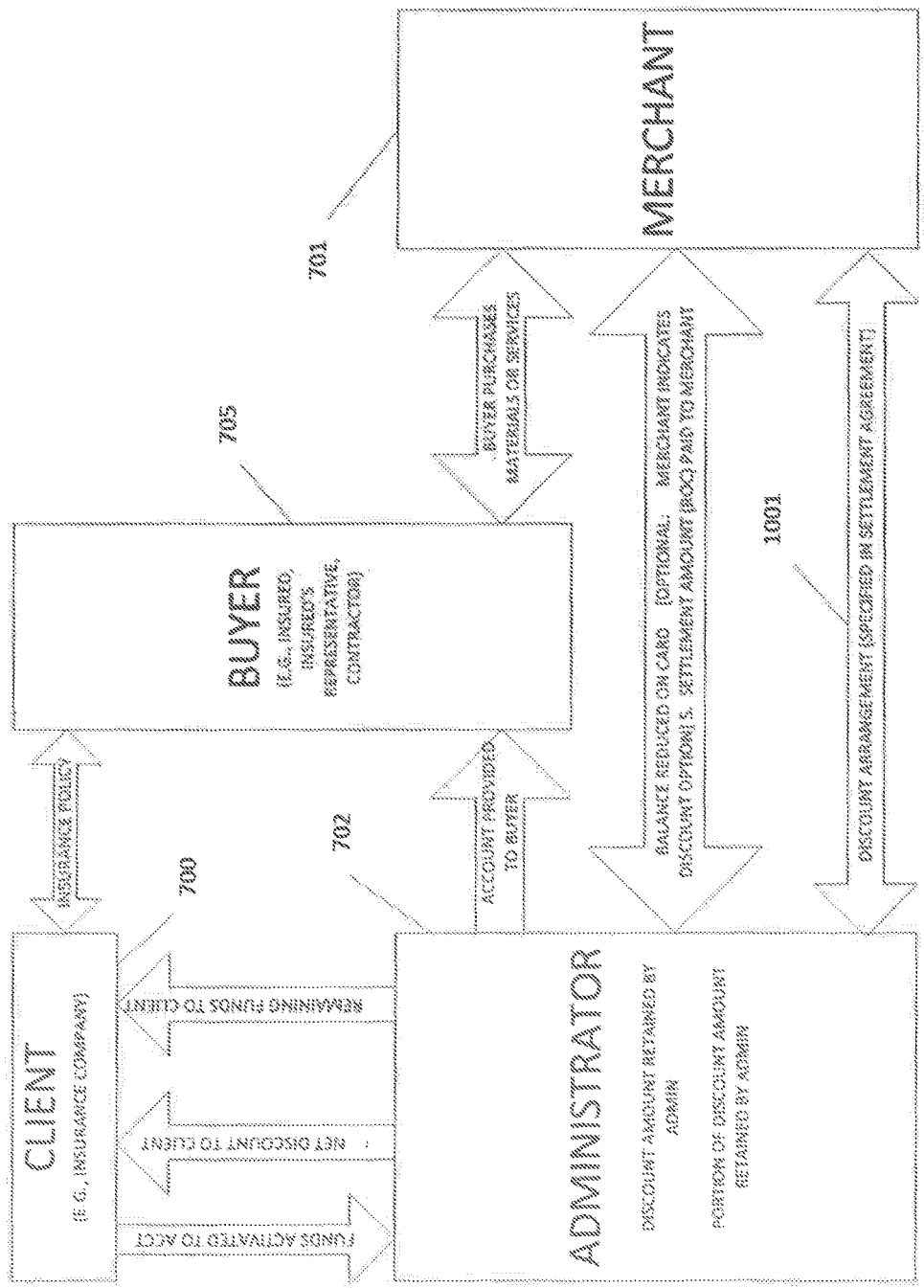
FIG. 10 is a block diagram of a system illustrating the various interactions between components of the system.

In other embodiments systems, methods and tangible computer readable storage mediums apply discounts at a point of sale by a merchant 700, that can be shared by a client 700, an administrator 702 and/or the merchant 701 (see FIG. 10). The shared amount is based on a discount or value differentiation arrangement 1001 in place between the administrator 702 and the merchant 701. For example, an insurance company as the client 700 can use such systems, methods, and instructions to reduce the cost of services or materials purchased as part of an insurance claim by an insured. The insured or their representative, as a buyer 705, is provided with an account from the account administrator 702 to purchase goods or services to fulfill the claim. Preferably, the account is a merchant-filtered account and is only usable at certain merchants 701 (although this aspect may be optional), wherein such certain merchants 701 have agreed to discounts or value differentiation arrangements 1001 with the administrator 702. In another embodiment, some merchants 701 have a discount or value differentiation arrangement 1001 with the administrator 702 while others do not and an incentive, such as a customer or buyer targeted discount or value differentiation, may be provided to the buyer 705 related to such certain merchants 701 or a subset thereof.

In one embodiment, when the buyer 705 uses the account for a purchase, the full purchase price is initially charged to the account and the discount is subsequently taken. Thus, the discount is hidden from the buyer 705 and the transaction appears to the buyer 705 to be a standard transaction. However, the settlement of the transaction results in a discount provided by the merchant 701 which can be shared by the merchant 701, the client 702 and/or the administrator 700. In one form, the merchant 701 is willing to provide such a discount because of the likelihood of increased sales volume since the merchant is one of a select few merchants (or possibly the only merchant) authorized to accept the account (e.g., the account is a merchant filtered account). The administrator 702 can implement the account so that it is only approved when involving the selected merchants 701 which have a discount arrangement 1001 with the administrator 702.

In another embodiment, when the buyer 705 uses the account for a purchase, the purchase price reflects a customer or buyer targeted discount or value differentiation, including reward points that can be used for the merchant or for a group of merchants such as the certain merchants 701 and an additional client/administrator targeted discount or value differentiation is subsequently taken. Thus, a portion of the total discount or value differentiation is realized amongst the buyer or customer 705, the client 702 and the administrator 702. Such an approach can incentivize all parties involved in the purchase, the buyer, the client, the administrator, and the certain merchants that stand to gain an increased use from buyers or customers. Herein, where an embodiment describes only a client/administrator targeted discount or value differentiation, another embodiment would include a buyer/customer targeted discount or value differentiation as described above.

In general, after a user account has been properly activated, the value associated with the account may be used to facilitate a transaction. In an exemplary transaction, the account (or a proxy for the account such as a stored value card) may be presented at a point of sale (POS) to effectuate the transaction. For example, the card may be swiped at the POS system of a merchant to initiate a card-based transaction, e.g., the swiping of the card's magnetic stripe to convey card transaction information to the POS, in alternative embodiments the card's transaction information may be conveyed to the POS via mnemonic transfer, QR code, barcode, NFC chip, or combinations thereof) via a keypad, keyboard, voice recognition device, scanning device, swiping device, NFC communication device, Bluetooth communication device, Wi-Fi, or combinations thereof. In alternative embodiments, the point of sale may be located at a vendor and/or redeeming merchant or retailer, but alternatively located at a kiosk or at a user's home, office, or other public/private areas where a personal computer, or other electronic device, is configured to act as a point of sale, for example during an on-line transaction. In alternative embodiments the card may be a physical card or a virtual card, wherein the virtual card is an electronic representation of the card and may be stored on a cardholder's personal electronic devices, e.g., home computer, portable computer, tablet computer, smart phone, or other similar devices. In additional embodiments, the virtual card may be stored in a cardholder's electronic wallet. The following descriptions of the Figures illustrate some exemplary scenarios implementing the above described concepts along with additional activities and functions pertinent to the instantly disclosed methods and systems.

Figure 7:
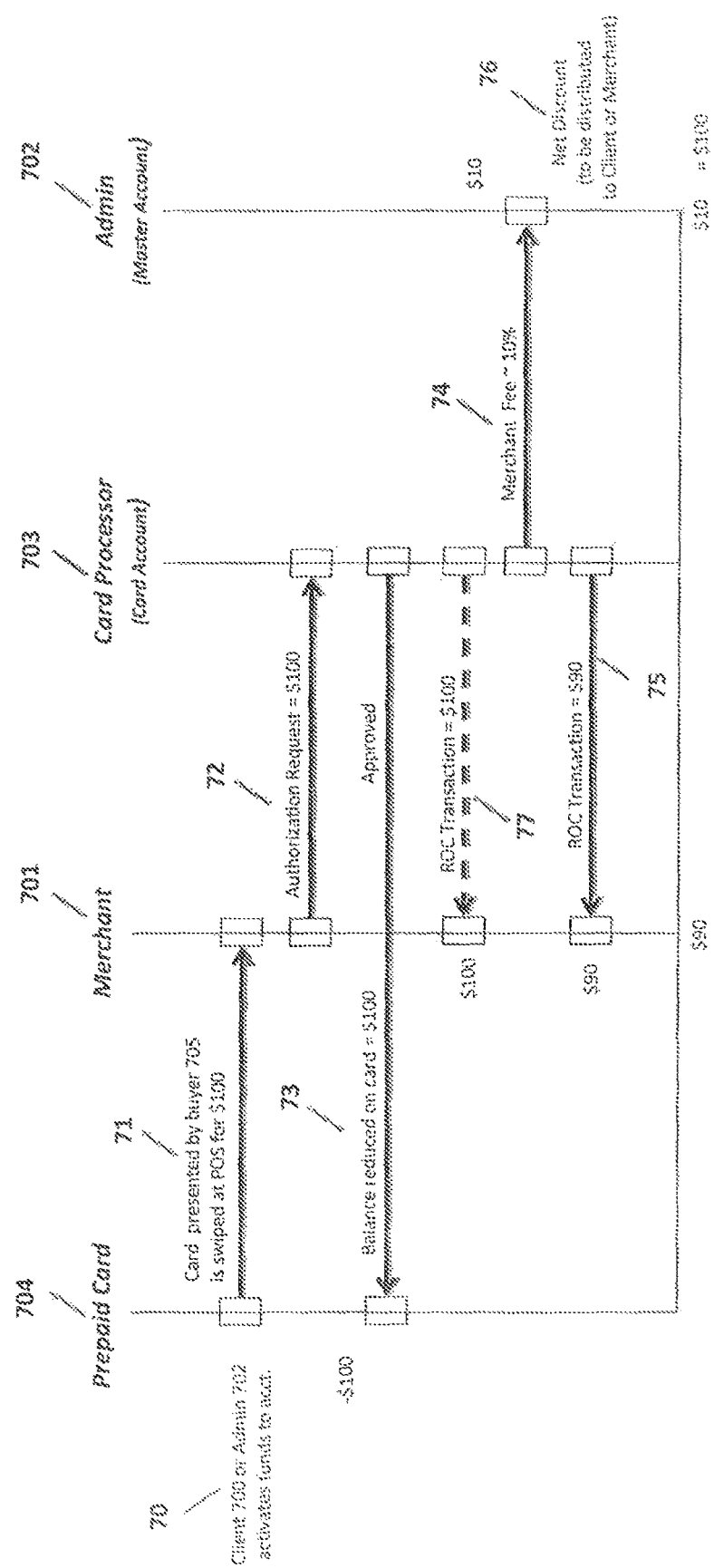
FIG. 7 is a sequence diagram illustrating a net discount of 10% distributed between a merchant and a corporate client.

FIG. 7 illustrates an exemplary transaction flow in accordance with one embodiment of the present invention. After activation by the client at 70, the card 704 is swiped at the POS (Point of Sale) system at 71 (the POS operator performs the transaction as any other purchase procedure) of the merchant 701 or used t the merchant online website to initiate a card-based transaction, e.g., the swiping of the card's magnetic stripe to convey card transaction information to the POS. The merchant's POS system sends an authorization request to the network (via their acquirer and the card processor) at 72. The card processor authorizes the transaction if the merchant 701 is one of the select, authorized merchants, and reduces the funds on the card accordingly at 73. Steps 70 through 73 reflect a typical payment network example. The dashed line 77 indicates a traditional payment sequence; the systems, methods, and instructions herein replace the dashed line 77 for merchants 701 which have a discount arrangement 1001 with the administrator 702. In some implementations, transactions involving merchants who do not have a discount arrangement 1001 with the administrator 702 are rejected by the card processor 703.

Continuing with FIG. 7, at 74, the merchant discount fee (which is maintained by an ancillary system) is deducted from the authorization amount and stored in a master account (separate from the cardholder account). At 75, the daily settlement (ROC-record of charge) is reduced by the merchant fee (commission) as determined at 74. At 75, the settlement amount (ROC) paid to the merchant 701 (e.g., merchant fee are maintained in an ancillary system with a unique commission/fee rate for each participating merchant.

The discount amount (commission-fee, e.g., $10) is in the control of the administrator 702 (e.g., issuer) and can then be re-distributed to the supply chain per the individual discount arrangements 1001 in the applicable, various settlement agreements between the administrator 702, the client 700 and/or each merchant 701 (see FIG. 10).

The settlement and the commission may be netted daily. This eliminates the need to invoice the fees from the card issuer (i.e., administrator 702 as the program manager) and eliminates the need to pay the invoice by the merchant 701. The systems, methods, and instructions expedite cash flow and reduce risks of bad debt by eliminating accounts receivables from the merchant 701 to the administrator 702.

Where a customer/buyer discount or value differentiation is included in the transaction, the discount or value may be provided by the merchant through its online website or at the point of sale. One example is that the customer/buyer, upon using the payment card, which includes stored value cards and electronic stored value cards, may be provided a discount code to use for that or subsequent purchases which may be by customer election. Such discount or value differentiation may apply automatically to the transaction or may be credited to an applicable customer/buyer account, such as an electronic wallet.

Figure 8:
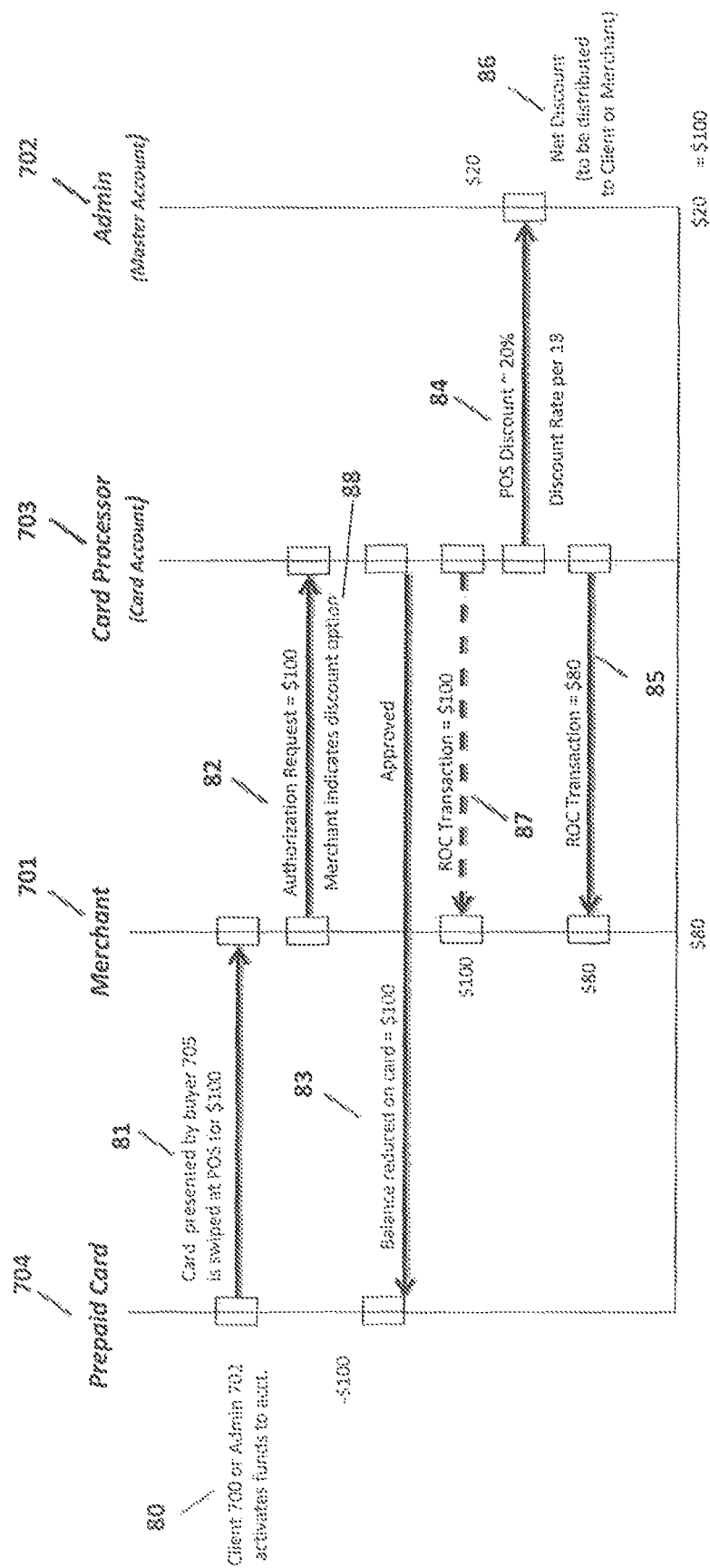
FIG. 8 is a sequence diagram illustrating a net discount of 20% distributed between a merchant and a corporate client wherein the discount is based on an option selected by the merchant at the POS.

FIG. 8 illustrates an exemplary transaction flow in accordance with another embodiment of the present invention wherein the point of sale discount offered by merchants 701 to program participating cardholders. The volume discount is not intended for the cardholder (buyer 705) as it is to be distributed to one or more clients 700 in the supply chain.

After a client 700 activates funds to an account at 80, the card 704 is swiped at the POS (Point of Sale) system 81 of the merchant 701. Optionally, the POS operator selects an appropriate discount level (e.g. level 3) at 88 based upon the program parameters. The merchant's POS system sends an authorization request to the network (via their acquirer and the card processor) at 82.

At 83, the card processor 703 authorizes the transaction and reduces the funds on the card accordingly. Steps 80 through 83 reflect a typical payment network example. The dashed line 87 indicates a traditional payment sequence; the systems, methods, and instructions herein replace the dashed line 87 for merchants 701 which have a discount arrangement 1001 with the administrator 702. In some implementations, transactions involving merchants who do not have a discount arrangement 1001 with the administrator 702 are rejected by the card processor 703.

At 84, the merchant discount fee (which is maintained by an ancillary system) is deducted from the authorization amount and stored in a master account (separate from the cardholder account). The daily settlement (ROC-record of charge) at 85 is reduced by the merchant fee (commission) as determined at 84.

The discount amount (commission-fee, e.g., $20) may triggered at the POS by the merchant 701 in accordance with contracted volume discounts. The discount amount is in the control of the administrator 702 and can then be re-distributed to the supply chain per the individual discount arrangements 1001 in the applicable, various settlement agreements between the administrator 702 and each merchant 701 (see FIG. 10).

As shown in FIG. 8, program managers are allowed to aggregate like-type purchases and drive similar buyers (cardholders) to the merchant for volume discounts, etc. The settlement and the commission may be netted daily. This eliminates the need to invoice the fees from the card issuer (program manager) and eliminates the need to pay the invoice by the merchant. The systems, methods, and instructions expedite cash flow and reduce risks of bad debt by eliminating accounts receivables from the merchant to the card issuer (program manager).

Figure 9:
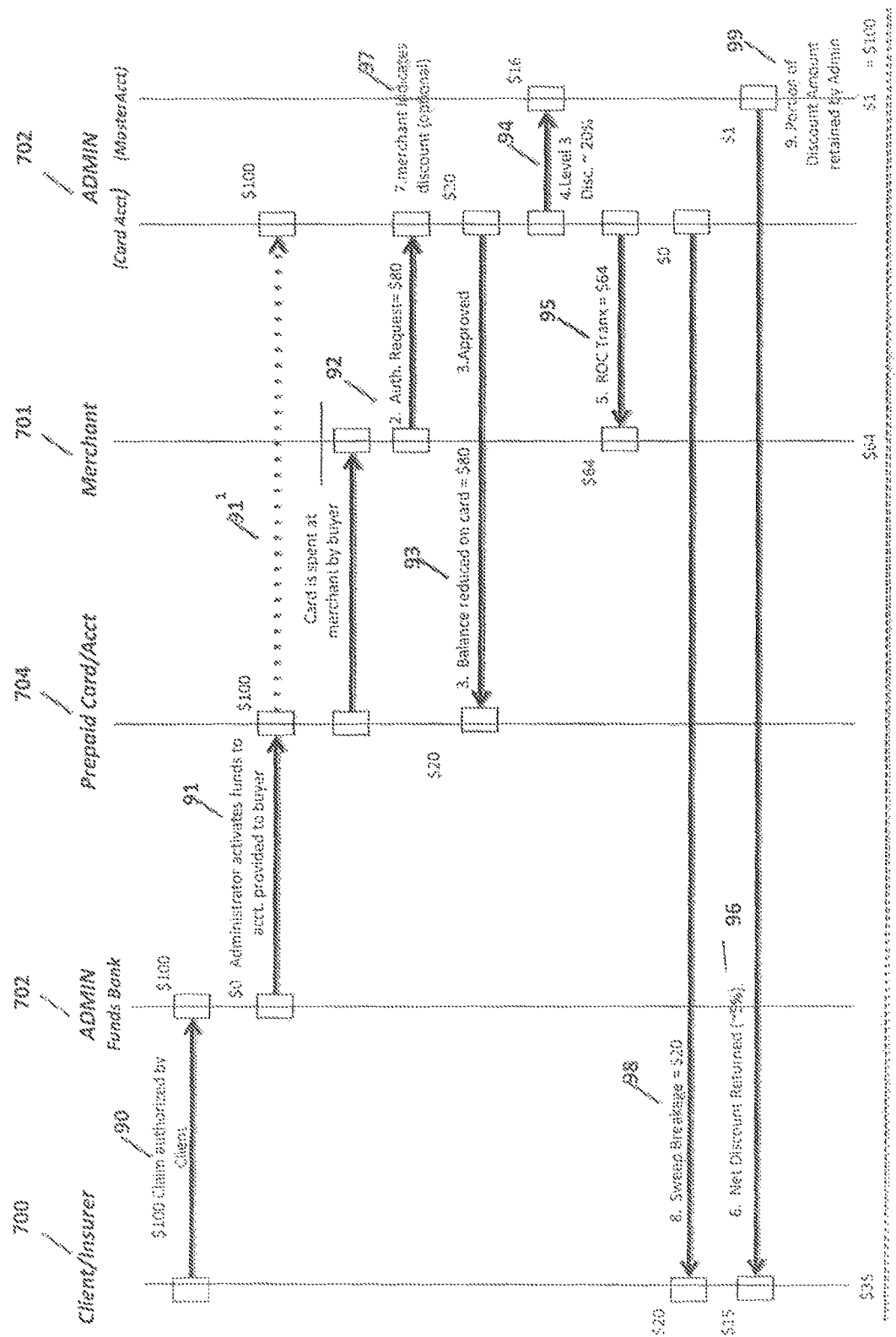
FIG. 9 is a sequence diagram illustrating a net discount of 20% distributed between an administrator and a corporate client.

FIG. 9 illustrates a sequence diagram implementing a net discount of 20% distributed between an administrator 702 and a corporate client 700. FIG. 4 is a block diagram of a system illustrating the various interactions between components of the system. In one form, the client 700, the card administrator 702 and the merchant 701 illustrated in FIG. 10 can be a processor or server providing electronic communication there between, although some of the communication as indicated by the arrows may be implemented by verbal or written correspondence. In various embodiments and as described previously, a card can be a physical credit or debit card, a smart card, an NFC (near field communication) chip account on an mobile device or a virtual card which is essentially an account number or account. Similarly, as used herein, an account can be any of an account for a physical credit or debit card, a smart card or an NFC chip account on a mobile device. In some implementations, transactions involving merchants who do not have a discount arrangement 1001 with the administrator 702 are rejected by the card processor.

The system as illustrated is for use by a client 700 to implement transactions between a buyer 705 and merchants 701 providing a discount to the client 700. In this scenario, the transactions are funded by the client 700. As noted, the blocks in FIG. 10 may each be implemented as one or more processors for executing computer executable instructions stored on a tangible computer readable storage medium. The executed instructions implement the following.

Referring to FIGS. 9 and 10, at 91, responsive to input from the client 700 at 90 providing instructions to activate an account with funds for use in transactions on behalf of the client 700. At 92, responsive to receiving an authorization request from a merchant 701 for a particular transaction for a particular purchase amount using the activated account, instructions approve the particular transaction when the merchant 701 is an authorized merchant and when the particular purchase amount is less than or equal to the remaining funds in the activated account. At 93, responsive to the approved particular transaction, instructions reduce the funds of the activated account by the particular purchase amount of the particular transaction. The dashed line 991 indicates a traditional payment sequence; the systems, methods, and instructions herein replace the dashed line 991 for merchants 701 which have a discount arrangement 1001 with the administrator 702. At 94, responsive to the approved particular transaction, instructions transfer a discount amount of the funds in the activated account to an administrator 702 of the account. At 95, responsive to the approved particular transaction, instructions transfer a settlement amount (ROC) of the funds in the activated account to the merchant 701. At 96, responsive to the approved particular transaction, instructions transfer a net discount of the discount amount to an account of the client 700, the administrator 702 and/or the merchant 701.

In one form, the client 700 is an insurer and the buyer 700 is an insured of the insurer or a representative of the insured.

In one form, responsive to receiving an indication from the merchant 701 for a particular discount or value differentiation option to be applied to the transaction, the instructions transfer a discount amount at 97. In particular, the instructions transfer a discount amount corresponding to the indicated discount option indicated by the merchant 701.

In one form, instructions a 98 transfer to the client 700 any remaining funds in the activated account after a preset period of time.

In one form, at 99, a portion of the discount amount transferred to the administrator is retained by the administrator as an administrative fee.

In one form, the instructions transferring the net discount of the discount amount are executed in real-time at the time of the transaction.

In one form, the system includes a plurality of clients 700, a plurality of buyers 705 and a plurality of merchants 701. Each of the merchants 701 has a unique settlement agreement specifying a unique discount arrangement 1001 with the administrator 702. The settlement amount (ROC) of the funds in the activated account is paid to the merchant 701 in accordance with the unique settlement agreement of each merchant 701.

The discount (commission-fee, e.g., $10) is in the control of the administrator 702 (e.g., issuer) and can then be re-distributed back to the supply chain per the discount arrangements 1001 in the applicable settlement agreements.

The following is a non-exhaustive list of some examples of payments types of the systems, methods, and instructions herein: Prepaid Debit Account (open loop cards with transactions over networks such as American Express, Discover, MasterCard and Visa); Debit Account (open loop cards with transactions over networks such as American Express, Discover, MasterCard and Visa); Credit Card Account (open loop cards with transactions over networks such as American Express, Discover, MasterCard and Visa), Closed Loop Accounts (filtered gift cards, universal gift cards, proxy cards). The foregoing are exemplary as other types are contemplated and known in the art.

The following is a non-exhaustive list of some examples of payments form factors of the systems, methods, and instructions herein: Traditional Plastic Card—one or more cards may be associated with an account; Virtual Card (eSVC or Card not present)—an account for an open loop (prepaid, debit or credit) may be used for an on-line transaction; Mobile Card—a contactless, EMV or any mobile device with appropriate account credentials that are validated at the POS. The foregoing are exemplary as other types are contemplated and known in the art.

In another form, the client 700 can be an employer and the buyer 705 can be an employee or agent of the buyer 705 purchasing on behalf of the employer or purchasing for the employee's or agent's use. Thus, systems, methods and instructions as noted herein can also be used in an employer/employee relationship. In another form, a coupon situation can be implemented; the sequence is similar: a coupon is in effect a discount off an item. This allows for real-time value of moving funds rather than waiting for days or even a month for the settlement process to occur.

The embodiments herein can be implemented in real-time by a merchant-filtered card or account, such as described in U.S. Pat. No. 5,689,100, incorporated herein by reference in its entirety, and does not require settlement of monthly invoicing back to each merchant.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented. Moreover, one or more of the embodiments disclosed herein may be combined with one or more of the other embodiments disclosed herein to reflect the needs, desires and preferences of the entity or entities implementing the methods and systems disclosed herein.

The ordering of steps in the various processes, data flows, and flowcharts presented are for illustration purposes and do not necessarily reflect the order that various steps must be performed. The steps may be rearranged in different orders in different embodiments to reflect the needs, desires and preferences of the entity implementing the systems. Furthermore, many steps may be performed simultaneously with other steps in some embodiments.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and methods without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

There has been described herein a stored value card transaction system that allows stored value card vendors to add additional value to a card at the time the card is purchased or redeemed in order to provide incentives to customers to purchase or redeem a particular card or provide discounts to clients whom authorize funding of a stored value card. It will be apparent to those skilled in the art that modifications may be made without departing from the spirit and scope of the invention. The embodiments described are representative only, and are not intended to be limiting. Many variations, combinations, and modifications of the applications disclosed herein are possible and are within the scope of the invention. Accordingly, the scope of protection is not limited by the description set out above, but is defined by the claims which follow, that scope including all equivalents of the subject matter of the claims.

Reference is further made to the following specific embodiments:

1. A computer implemented method for conducting a stored value card transaction comprising:
   receiving in a stored value card transaction computer a transaction request for a stored value card from a point of sale terminal, wherein the transaction request comprises at least one of a card identification, a point of sale terminal identification, a vendor identification, a merchant identification, and a time of activation;
   comparing at least one of the card identification, the point of sale terminal identification, the vendor identification, the merchant identification, and the time of activation to stored data in a stored value card datastore to determine if the stored value card is eligible for a value differentiation;
   determining the value differentiation to be attributed to an account associated with the stored value card when the stored value card is determined to be eligible for the value differentiation;
   transmitting the transaction request to the card issuer authorization system;
   receiving a response from the card issuer authorization system; and
   transmitting the response to the point of sale terminal.

2. The computer implemented method for conducting a stored value card transaction of embodiment 1, wherein the transaction request further comprises an activation request.

3. The computer implemented method for conducting a stored value card transaction of embodiment 1, wherein the transaction request further comprises a redemption request.

4. The computer implemented method for conducting a stored value card transaction of embodiment 1, 2, or 3 further comprising:
   modifying the transaction request to include the value differentiation when the stored value card is determined to be eligible for the value differentiation; and
   transmitting a modified transaction request to the card issuer authorization system.

5. The computer implemented method for conducting a stored value card transaction of embodiment 1, 2, 3, or 4, wherein the response comprises a reference to the value differentiation.

6. The computer implemented method for conducting a stored value card transaction of embodiment 1, 2, 3, 4, or 5, wherein the value differentiation comprises a monetary redemption value amount for the stored value card that differs from a purchase price of the stored value card.

7. The computer implemented method for conducting a stored value card transaction of embodiment 6, wherein the monetary redemption value amount for the stored value card exceeds the purchase price of the stored value card.

8. The computer implemented method for conducting a stored value card transaction of embodiment 6, wherein the purchase price of the stored value card is less than the monetary redemption value for the stored value card.

9. The computer implemented method for conducting a stored value card transaction of embodiment 1, 2, 3, 4, 5, 6, 7, or 8, wherein the value differentiation comprises a non-monetary redemption value.

10. The computer implemented method for conducting a stored value card transaction of embodiment 1, 2, 3, 4, 5, 6, 7, 8, or 9, further comprising reconciling accounts of card transaction interested parties.

11. The computer implemented method for conducting a stored value card transaction of embodiment 10, wherein the card transaction interested parties comprise card vendors, card merchants, card issuers, a stored value card transaction system administrator, and combinations thereof.

12. A computer implemented method for conducting a stored value card transaction comprising:

receiving in a stored value card transaction computer a transaction request for a stored value card from a point of sale terminal, wherein the transaction request comprises at least one of a card identification, a point of sale terminal identification, a vendor identification, a merchant identification, and a time of activation;

comparing at least one of the card identification, the point of sale terminal identification, the vendor identification, the merchant identification, and the time of activation to stored data in a stored value card datastore to determine if the stored value card is eligible for a value added award;

determining the value added award to be attributed to an account associated with the stored value card when the stored value card is determined to be eligible for the value added award;

transmitting the transaction request to the card issuer authorization system; receiving a response from the card issuer authorization system; and transmitting the response to the point of sale terminal.

13. The computer implemented method for conducting a stored value card transaction of embodiment 12, wherein the transaction request further comprises an activation request.

14. The computer implemented method for conducting a stored value card transaction of embodiment 12, wherein the transaction request further comprises a redemption request.

15. The computer implemented method for conducting a stored value card transaction of embodiment 12, 13, or 14 further comprising:

modifying the transaction request to include the value added award when the stored value card is determined to be eligible for the value added award; and transmitting a modified transaction request to the card issuer authorization system.

16. The computer implemented method for conducting a stored value card transaction of embodiment 12, 13, 14, or 15, wherein the response comprises a reference to the value added award.

17. The computer implemented method for conducting a stored value card transaction of embodiment 12, 13, 14, 15, or 16, wherein the value added award comprises a monetary redemption value amount for the stored value card that differs from a purchase price of the stored value card.

18. The computer implemented method for conducting a stored value card transaction of embodiment 17, wherein the monetary redemption value amount for the stored value card exceeds the purchase price of the stored value card.

19. The computer implemented method for conducting a stored value card transaction of embodiment 17, wherein the purchase price of the stored value card is less than the monetary redemption value for the stored value card.

20. The computer implemented method for conducting a stored value card transaction of embodiment 12, 13, 14, 15, 16, 17, 18, or 19, wherein the value added award comprises a non-monetary redemption value.

21. The computer implemented method for conducting a stored value card transaction of embodiment 12, 13, 14, 15, 16, 17, 18, 19, or 20, further comprising reconciling accounts of card transaction interested parties.

22. The computer implemented method for conducting a stored value card transaction of embodiment 21, wherein the card transaction interested parties comprise card vendors, card merchants, card issuers, a stored value card transaction system administrator, and combinations thereof.

23. A stored value card transaction system comprising:

a datastore maintaining account information for a plurality of stored value cards, conditions for receiving a value differentiation, and conditions for redeeming the value differentiation;

a point of sale interface for receiving and transmitting a transaction message with a point of sale terminal;

a value added determination component to determine whether a stored value card is eligible for value differentiation and a type of value differentiation to be awarded to an account associated with a stored value card when the stored value card is eligible for the value differentiation;

a card issuer system interface for transmitting the transaction message to, and receiving a response to the transaction message from, the card issuer system;

an authorization component for authorizing the stored value card transaction.

24. The stored value card transaction system of embodiment 23, wherein the transaction message comprises an activation request.

25. The stored value card transaction system of embodiment 23, wherein the transaction message comprises a redemption request.

26. The stored value card transaction system of embodiment 23, 24, or 25 further comprising a message modification component for modifying messages to at least one of the point of sale terminal and the card issuer system to indicate information about the value differentiation associated with a stored value card transaction.

27. The stored value card transaction system of embodiment 23, 24, 25, or 26, wherein the response comprises a reference to the value differentiation.

28. The stored value card transaction system of embodiment 23, 24, 25, 26, or 27, wherein the value differentiation comprises a monetary redemption value amount for the stored value card that differs from a purchase price of the stored value card.

29. The stored value card transaction system of embodiment 28, wherein the monetary redemption value amount for the stored value card exceeds the purchase price of the stored value card.

30. The stored value card transaction system of embodiment 28, wherein the purchase price of the stored value card is less than the monetary redemption value for the stored value card.

31. The stored value card transaction system of embodiment 23, 24, 25, 26, 27, 28, 29, or 30, wherein the value differentiation comprises, and when applicable further comprises, a non-monetary redemption value.

32. The stored value card transaction system of embodiment 23, 24, 25, 26, 27, 28, 29, 30, or 31, further comprising a reconciliation component for reconciling accounts of card transaction interested parties.

33. The stored value card transaction system of embodiment 32, wherein the card transaction interested parties comprise card vendors, card merchants, card issuers, a stored value card transaction system administrator, and combinations thereof.

34. A stored value card transaction system comprising:
a datastore maintaining account information for a plurality of stored value cards, conditions for receiving a value added award, and conditions for redeeming the value added award;
a point of sale interface for receiving and transmitting a transaction message with a point of sale terminal;
a value added determination component to determine whether a stored value card is eligible for the value added award and a type of value added award to be awarded to an account associated with a stored value card when the stored value card is eligible for the value added award;
a card issuer system interface for transmitting the transaction message to, and receiving a response to the transaction message from, the card issuer system;
an authorization component for authorizing the stored value card transaction.

35. The stored value card transaction system of embodiment 34, wherein the transaction message comprises an activation request.

36. The stored value card transaction system of embodiment 34, wherein the transaction message comprises a redemption request.

37. The stored value card transaction system of embodiment 34, 35, or 36 further comprising a message modification component for modifying messages to at least one of the point of sale terminal and the card issuer system to indicate information about the value added award associated with a stored value card transaction.

38. The stored value card transaction system of embodiment 34, 35, 36, or 37, wherein the response comprises a reference to the value added award.

39. The stored value card transaction system of embodiment 34, 35, 36, 37, or 38, wherein the value added award comprises a monetary redemption value amount for the stored value card that differs from a purchase price of the stored value card.

40. The stored value card transaction system of embodiment 39, wherein the monetary redemption value amount for the stored value card exceeds the purchase price of the stored value card.

41. The stored value card transaction system of embodiment 39, wherein the purchase price of the stored value card is less than the monetary redemption value for the stored value card.

42. The stored value card transaction system of embodiment 34, 35, 36, 37, 38, 39, 40, or 41, wherein the value added award comprises, and when applicable further comprises, a non-monetary redemption value.

43. The stored value card transaction system of embodiment 34, 35, 36, 37, 38, 39, 40, 41, or 42, further comprising a reconciliation component for reconciling accounts of card transaction interested parties.

44. The stored value card transaction system of embodiment 43, wherein the card transaction interested parties comprise card vendors, card merchants, card issuers, a stored value card transaction system administrator, and combinations thereof.

45. A computer implemented method for conducting the stored value card transaction of embodiment 1, 2, 3, 4, 5, 6, 7, 8, 9, 10, 11, 12, 13, 14, 15, 16, 17, 18, 19, 20, 21, or 22, wherein the stored value card transaction request further comprises transaction information for at least two stored value cards.

46. The computer implemented method for conducting the stored value card transaction of embodiment 45, wherein the value differentiation, when present, is allocated equally between the at least two stored value cards.

47. The computer implemented method for conducting the stored value card transaction of embodiment 45, wherein the value differentiation, when present, is allocated disproportionately between the at least two stored value cards.

48. The computer implemented method for conducting the stored value card transaction of embodiment 46 or 47, wherein value differentiation allocation, when performed, is directed by card transaction interested parties, card purchasers, card redeemers, or a combination thereof.

49. The computer implemented method for conducting the stored value card transaction of embodiment 45, wherein the value added award, when present, is allocated equally between the at least two stored value cards.

50. The computer implemented method for conducting the stored value card transaction of embodiment 45, wherein the value added award, when present, is allocated disproportionately between the at least two stored value cards.

51. The computer implemented method for conducting the stored value card transaction of embodiment 46 or 47, wherein value added award allocation, when performed, is directed by card transaction interested parties, card purchasers, card redeemers, or a combination thereof.

52. The stored value card transaction system of embodiment 23, 24, 25, 26, 27, 28, 29, 30, 31, 32, 33, 34, 35, 36, 37, 38, 39, 40, 41, 42, 43, or 44, wherein the stored value card transaction system comprises a component for allocating, when present, an activation amount, a redemption amount, the value added award, the value differentiation, or combinations thereof across multiple stored value cards.

53. A computer implemented method for adding value to a stored value card in excess of the purchase price for the stored value card, comprising:
receiving in a stored value card transaction processor an activation request for a stored value card from a point of sale terminal, wherein the activation request comprises an activation amount and at least one of a card identification, a point of sale terminal identification, a vendor identification, a merchant identification, and a time of activation;
comparing at least one of the card identification, the point of sale terminal identification, the vendor identification, the merchant identification, and the time of activation to stored data in a stored value card datastore to determine if the stored value card to be activated is eligible for a value added award, wherein the stored value card datastore comprises a computer readable media;
determining the value added award to be added to an account associated with the stored value card to be activated when the stored value card is determined to be eligible for the value added award;
modifying the activation request to include the value added award when the stored value card is determined to be eligible for the value added award;
transmitting the modified activation request to the card issuer authorization system;
receiving an activation response from the card issuer authorization system; and
transmitting the activation response to the point of sale terminal.

54. A stored value card transaction system for activating and redeeming stored value cards with value added bonuses, comprising:

a datastore maintaining account information for a plurality of stored value cards, conditions for receiving a value added bonus, and conditions for redeeming a value added bonus;

a point of sale interface for receiving and transmitting activation and redemption messages with a point of sale terminal;

a value added determination component to determine whether a stored value card is eligible for a value added bonus and the type of value added bonus to be awarded to an account associated with a stored value card when the stored value card is eligible for a value added bonus;

a card issuer system interface for transmitting and receiving messages with a card issuer system;

a message modification component for modifying messages to one of the point of sale terminal and the card issuer system to indicate information about a value added bonus associated with one of an activation and a redemption of the stored value card; and an authorization component for authorizing at least one of the awarding of a value added bonus, the redemption of a value added bonus, the activating of the stored value card, and the redemption of the stored value card.

55. A system for use by a client to implement transactions between a buyer and merchants providing a discount to the client, wherein the transactions are funded by the client, said system comprising:

one or more processors for executing computer executable instructions stored on a tangible computer readable storage medium, said instructions comprising:

responsive to input from the client, instructions for activating an account with funds for use in transactions for the client;

responsive to receiving an authorization request from a merchant for a particular transaction for a particular purchase amount using the activated account, instructions for approving the particular transaction when the merchant is an authorized merchant and when the particular purchase amount is less than or equal to the remaining funds in the activated account;

responsive to the approved particular transaction, instructions for reducing the funds of the activated account by the particular purchase amount of the particular transaction;

responsive to the approved particular transaction, instructions for transferring a discount amount of the funds in the activated account to an administrator of the account;

responsive to the approved particular transaction, instructions for transferring a settlement amount (ROC) of the funds in the activated account to the merchant; and responsive to the approved particular transaction, instructions for transferring a net discount of the discount amount to an account of the client or the merchant.

56. The system of embodiment 55 wherein the client is an insurer and the buyer is an insured of the insurer.

57. The system of embodiment 55 wherein responsive to receiving an indication from the merchant for a particular discount option to be applied to the transaction, the instructions for transferring a discount amount comprise instructions for transferring a discount amount corresponding to the indicated discount option indicated by the merchant.

58. The system of embodiment 55 further comprising instructions for transferred to the client any remaining funds in the activated account after a preset period of time.

59. The system of embodiment 55 wherein a portion of the discount amount transferred to the administrator is retained by the administrator as an administrative fee.

60. The system of embodiment 55 wherein the instructions for transferring the net discount of the discount amount are executed in real-time at the time of the transaction.

61. The system of embodiment 55 wherein there a plurality of clients, a plurality of buyers and a plurality of merchants, wherein each of the merchants has a unique settlement agreement specifying a unique discount arrangement with the administrator, and wherein the settlement amount (ROC) of the funds in the activated account are paid to the merchant in accordance with the unique settlement agreement of the merchant.

62. A method for use by a client to implement transactions between a buyer and merchants providing a discount to the client, wherein the transactions are funded by the client, said method comprising computer-executable instructions executed by a processor, said instructions comprising:

responsive to input from the client, instructions for activating an account with funds for use in transactions for the client;

responsive to receiving an authorization request from a merchant for a particular transaction for a particular purchase amount using the activated account, instructions for approving the particular transaction when the merchant is an authorized merchant and when the particular purchase amount is less than or equal to the remaining funds in the activated account;

responsive to the approved particular transaction, instructions for reducing the funds of the activated account by the particular purchase amount of the particular transaction;

responsive to the approved particular transaction, instructions for transferring a discount amount of the funds in the activated account to an administrator of the account;

responsive to the approved particular transaction, instructions for transferring a settlement amount (ROC) of the funds in the activated account to the merchant; and responsive to the approved particular transaction, instructions for transferring a net discount of the discount amount to an account of the client or the merchant.

63. The method of embodiment 62 wherein the client is an insurer and the buyer is an insured of the insurer.

64. The method of embodiment 62 wherein responsive to receiving an indication from the merchant for a particular discount option to be applied to the transaction, the instructions for transferring a discount amount comprise instructions for transferring a discount amount corresponding to the indicated discount option indicated by the merchant.

65. The method of embodiment 62 further comprising instructions for transferred to the client any remaining funds in the activated account after a preset period of time.

66. The method of embodiment 62 wherein a portion 8f the discount amount transferred to the administrator is retained by the administrator as an administrative fee.

67. The method of claim 8 wherein the instructions for transferring the net discount of the discount amount are executed in real-time at the time of the transaction.

68. The method of embodiment 62 wherein there a plurality of clients, a plurality of buyers and a plurality of merchants, wherein each of the merchants has a unique settlement agreement specifying a unique discount arrangement with the administrator, and wherein the settlement amount (ROC)

of the funds in the activated account are paid to the merchant in accordance with the unique settlement agreement of the merchant.

69. A tangible computer readable storage medium for use by a client to implement transactions between a buyer and merchants providing a discount to the client, wherein the transactions are funded by the client, said tangible computer readable storage medium comprising computer executable instructions executable by a processor, said instructions comprising:
- responsive to input from the client, instructions for activating an account with funds for use in transactions for the client;
- responsive to receiving an authorization request from a merchant for a particular transaction for a particular purchase amount using the activated account, instructions for approving the particular transaction when the merchant is an authorized merchant and when the particular purchase amount is less than or equal to the remaining funds in the activated account;
- responsive to the approved particular transaction, instructions for reducing the funds of the activated account by the particular purchase amount of the particular transaction;
- responsive to the approved particular transaction, instructions for transferring a discount amount of the funds in the activated account to an administrator of the account;
- responsive to the approved particular transaction, instructions for transferring a settlement amount (ROC) of the funds in the activated account to the merchant; and
- responsive to the approved particular transaction, instructions for transferring a net discount of the discount amount to an account of the client or the merchant.

70. The tangible computer readable storage medium of embodiment 69 wherein the client is an insurer and the buyer is an insured of the insurer.

71. The tangible computer readable storage medium of embodiment 69 wherein responsive to receiving an indication from the merchant for a particular discount option to be applied to the transaction, the instructions for transferring a discount amount comprise instructions for transferring a discount amount corresponding to the indicated discount option indicated by the merchant.

72. The tangible computer readable storage medium of embodiment 69 further comprising instructions for transferred to the client any remaining funds in the activated account after a preset period of time.

73. The tangible computer readable storage medium of embodiment 69 wherein a portion of the discount amount transferred to the administrator is retained by the administrator as an administrative fee.

74. The tangible computer readable storage medium of embodiment 69 wherein the instructions for transferring the net discount of the discount amount are executed in real-time at the time of the transaction.

75. The tangible computer readable storage medium of embodiment 69 wherein there a plurality of clients, a plurality of buyers and a plurality of merchants, wherein each of the merchants has a unique settlement agreement specifying a unique discount arrangement with the administrator, and wherein the settlement amount (ROC) of the funds in the activated account are paid to the merchant in accordance with the unique settlement agreement of the merchant.

76. The embodiments described above wherein such embodiments include a customer/buyer discount or value differentiation that may be an additional discount or value differentiation determined by the unique settlement agreements of the merchants or alternatively may be provided by administrator as a portion of the client/administrator discount.

What is claimed is:

1. A computer implemented method for conducting a stored value card transaction, performed by a stored value card transaction computer comprising one or more processors and programming instructions encoded on a non-transitory computer-readable medium which, when the program instructions are executed by the one or more processors, transforms the stored value card transaction computer into a particular machine and causes the particular machine to perform the method comprising:
- receiving, by the stored value card transaction computer, in a stored value card transaction computer a transaction request for a stored value card from a point of sale terminal, wherein the transaction request comprises at least one of a card identification, a point of sale terminal identification, a vendor identification, a merchant identification, and a time of activation;
- comparing, by the stored value card transaction computer, at least one of the card identification, the point of sale terminal identification, the vendor identification, the merchant identification, and the time of activation to stored data in a stored value card datastore to determine if the stored value card is eligible for a value differentiation, wherein the stored value card datastore is only accessible by the stored value card transaction computer and a datastore administrator;
- determining, by the stored value card transaction computer using stored value card datastore information, the value differentiation to be attributed to a stored value card account when the stored value card is determined to be eligible for the value differentiation, wherein the value differentiation has use conditions which are different from use conditions of the stored value card;
- modifying, by the stored value card transaction computer, the transaction request to include the value differentiation when the stored value card is determined to be eligible for the value differentiation;
- transmitting, by the stored value card transaction computer, a modified transaction request to a card issuer authorization system;
- receiving, by the stored value card transaction computer, a response from the card issuer authorization system; and
- transmitting, by the stored value card transaction computer, the response to the point of sale terminal.

2. The computer implemented method for conducting a stored value card transaction of claim 1, wherein the transaction request further comprises an activation request.

3. The computer implemented method for conducting a stored value card transaction of claim 1, wherein the transaction request further comprises a redemption request.

4. The computer implemented method for conducting a stored value card transaction of claim 1, wherein the response comprises a reference to the value differentiation.

5. The computer implemented method for conducting a stored value card transaction of claim 1, wherein the value differentiation comprises a monetary redemption value amount for the stored value card which is greater than a face value of the stored value card.

6. The computer implemented method for conducting a stored value card transaction of claim 5, wherein the monetary redemption value amount for the stored value card exceeds a purchase price of the stored value card.

7. The computer implemented method for conducting a stored value card transaction of claim 5, wherein a purchase price of the stored value card is less than the monetary redemption value for the stored value card.

8. The computer implemented method for conducting a stored value card transaction of claim 1, wherein the value differentiation comprises a non-monetary redemption value.

9. The computer implemented method for conducting a stored value card transaction of claim 1, further comprising reconciling accounts of card transaction interested parties.

10. The computer implemented method for conducting a stored value card transaction of claim 9, wherein the card transaction interested parties comprise card vendors, card merchants, card issuers, a stored value card transaction system administrator, and combinations thereof.

11. A stored value card transaction system comprising:
a stored value card transaction computer comprising a processor for executing computer executable instructions stored on a tangible computer readable storage medium, wherein the executable instructions transform the stored value card transaction computer into a particular machine comprising the following elements and cause the elements to perform associated functions;
a stored value card datastore maintaining account information corresponding to a plurality of cards, conditions for receiving a value differentiation, and conditions for redeeming the value differentiation, wherein the stored value card datastore is only accessible by the stored value card transaction computer and a datastore administrator;
an interface for receiving and transmitting a transaction message;
a value added determination component to determine, using stored value card datastore information, whether a card is eligible for value differentiation and a type of value differentiation to be awarded to a card account when the card is eligible for the value differentiation, wherein the value differentiation has use conditions which are different from use conditions of the card;
a card issuer system interface for transmitting the transaction message to, and receiving a response to the transaction message from, a card issuer system;
an authorization component for authorizing a stored value card transaction; and
a message modification component for modifying at least one of a message from the card issuer system and a message from a point of sale terminal to indicate information about the value differentiation associated with the stored value card transaction.

12. The stored value card transaction system of claim 11, wherein the executable instructions comprise:
responsive to receiving a transaction message from a merchant for a particular transaction for a particular purchase amount using a card, instructions for approving the particular transaction when the merchant is an authorized merchant and when the particular purchase amount is less than or equal to funds remaining in the card;
responsive to the approved particular transaction, instructions for reducing the funds by the particular purchase amount of the particular transaction;
responsive to the approved particular transaction, instructions for transferring a discount amount of the funds to an administrator of an account associated with the card;
responsive to the approved particular transaction, instructions for transferring a settlement amount (ROC) of the funds to the merchant; and
responsive to the approved particular transaction, instructions for transferring a net discount of the discount amount to an account of a client or the merchant.

13. The stored value card transaction system of claim 11, wherein the transaction message comprises a redemption request.

14. The stored value card transaction system of claim 11, wherein the response comprises a reference to the value differentiation.

15. The stored value card transaction system of claim 11, wherein the value differentiation comprises a monetary redemption value amount for the stored value card which is greater than a face value of the stored value card.

16. The stored value card transaction system of claim 15, wherein the monetary redemption value amount for the stored value card exceeds a purchase price of the stored value card.

17. The stored value card transaction system of claim 15, wherein a purchase price of the stored value card is less than the monetary redemption value for the stored value card.

* * * * *